(12) United States Patent  (10) Patent No.: US 6,470,169 B2
Nakazato                    (45) Date of Patent:    Oct. 22, 2002

(54) IMAGE FORMING APPARATUS AND METHOD, A PRINTER, A COPYING MACHINE, A FACSIMILE DEVICE SET, AND COMPLEX MACHINE

(75) Inventor: Yasushi Nakazato, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 09/765,358

(22) Filed: Jan. 22, 2001

(65) Prior Publication Data

US 2001/0031161 A1 Oct. 18, 2001

(30) Foreign Application Priority Data

Jan. 20, 2000 (JP) .................................. 2000-012297
Jul. 31, 2000 (JP) .................................. 2000-230153
Dec. 27, 2000 (JP) .................................. 2000-396638
Dec. 27, 2000 (JP) .................................. 2000-398225

(51) Int. Cl.$^7$ ............................................. G03G 15/00
(52) U.S. Cl. ..................... 399/388; 399/401; 399/402
(58) Field of Search ........................... 399/98, 341, 342, 399/388, 390, 394, 395, 396, 401, 402, 407, 397, 406; 271/3.03

(56) References Cited

U.S. PATENT DOCUMENTS

| 4,131,360 | A | * | 12/1978 | O'Brien ........................ 399/402 |
| 4,849,786 | A | * | 7/1989 | Murakami .................... 399/402 |
| 4,855,754 | A | | 8/1989 | Tanaka et al. |
| 4,876,606 | A | | 10/1989 | Banno et al. |
| 4,924,320 | A | | 5/1990 | Tanaka et al. |
| 4,947,345 | A | * | 8/1990 | Paradise et al. |
| 4,956,678 | A | | 9/1990 | Kiya et al. |
| 5,089,857 | A | * | 2/1992 | Xydias ........................ 399/401 |
| 5,095,371 | A | | 3/1992 | Tanaka et al. |
| 5,464,200 | A | | 11/1995 | Nakazato et al. |
| 5,482,265 | A | | 1/1996 | Nakazato et al. |
| 5,822,671 | A | * | 10/1998 | Takama ........................ 399/342 |
| 5,857,138 | A | * | 1/1999 | Iida et al. .................... 399/402 |
| 5,905,934 | A | * | 5/1999 | Koshimizu ................... 399/396 |
| 5,926,684 | A | * | 7/1999 | Horiuchi et al. ............. 399/402 |

FOREIGN PATENT DOCUMENTS

| JP | 3-13463 | 1/1991 |
| JP | 4-116570 | 4/1992 |
| JP | 9-110313 | 4/1997 |
| JP | 11-334966 | 12/1999 |
| JP | 2000-86017 | 3/2000 |

* cited by examiner

Primary Examiner—Sandra Brase
(74) Attorney, Agent, or Firm—Oblon, Spivak, McClelland, Maier & Neustadt, P.C.

(57) ABSTRACT

An image forming apparatus of an electrophotographic type including a paper feeding device for separating and feeding piled recording paper, an image forming device for forming the image in order on the fed recording paper, a paper turning-over device for switching back the recording paper and turning over the front and rear tip ends of the recording paper, and a paper re-feeding device for re-feeding the recording paper having the image on one-side surface. In such an apparatus, the both-surfaces image formation can be practiced at the same paper distance, keeping the image forming apparatus small in size and low cost. Furthermore, a conveying roller for switching back the paper and sending out the paper to a printer engine is provided such that the rear tip end of the paper accommodated in the switching-back path becomes the front tip end thereof, and a jogger for performing compensation of lateral registration for the paper is provided in the switch-back path. In a configuration, the paper feeding device is controlled such that the sent-out preceding paper and a next paper just subsequent thereto to be accommodated in the switch-back path are at least partially superposed on each other in the switch-back path.

80 Claims, 58 Drawing Sheets

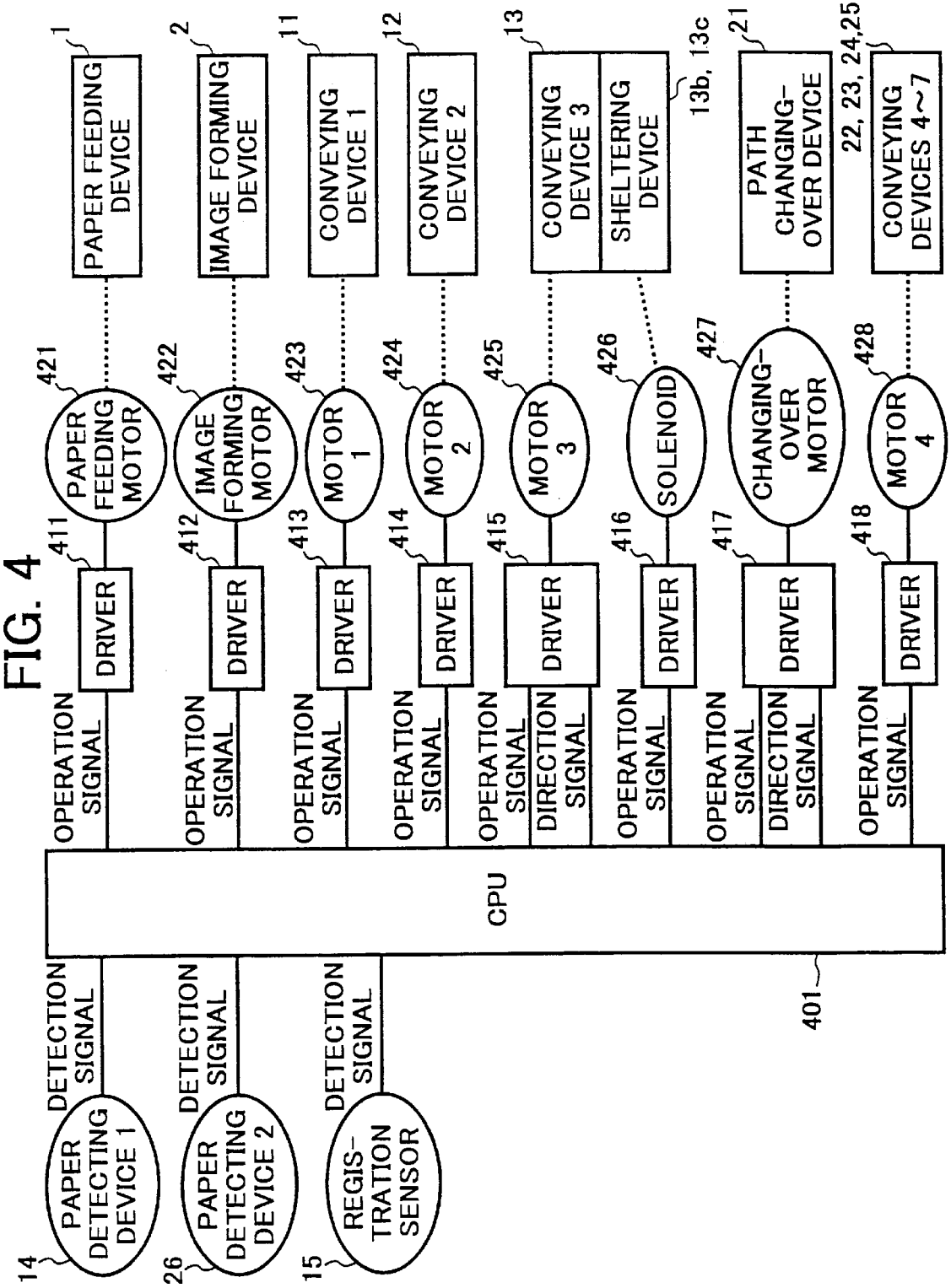

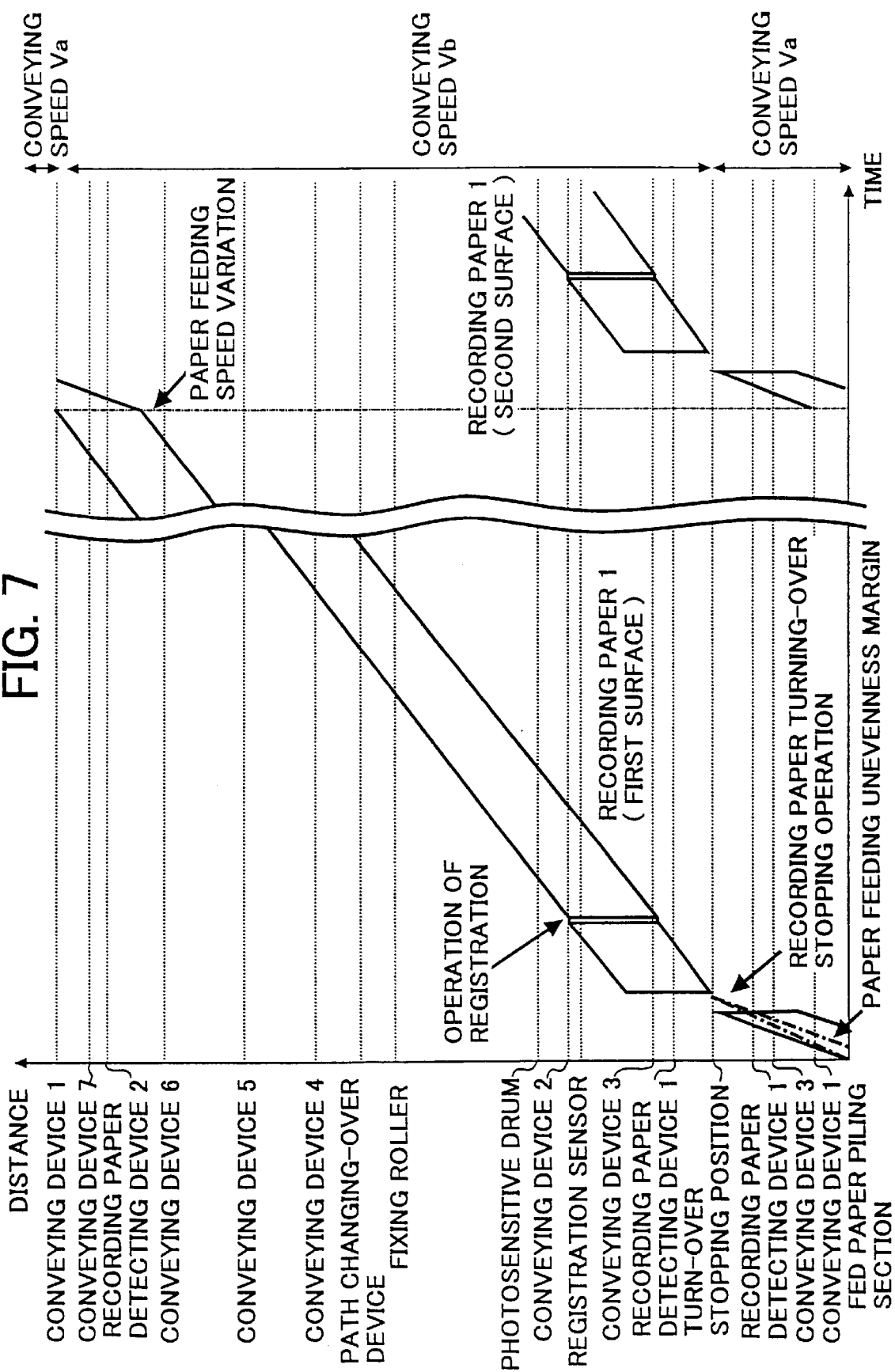

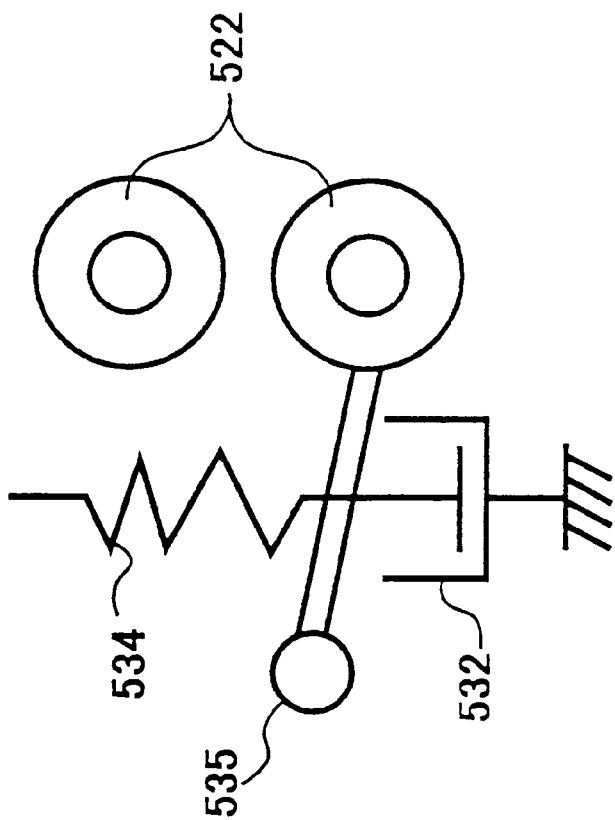
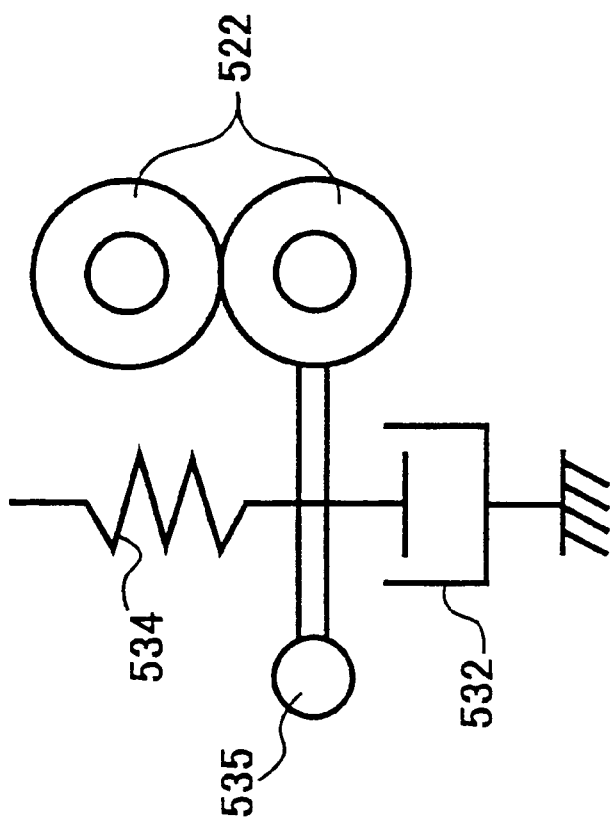

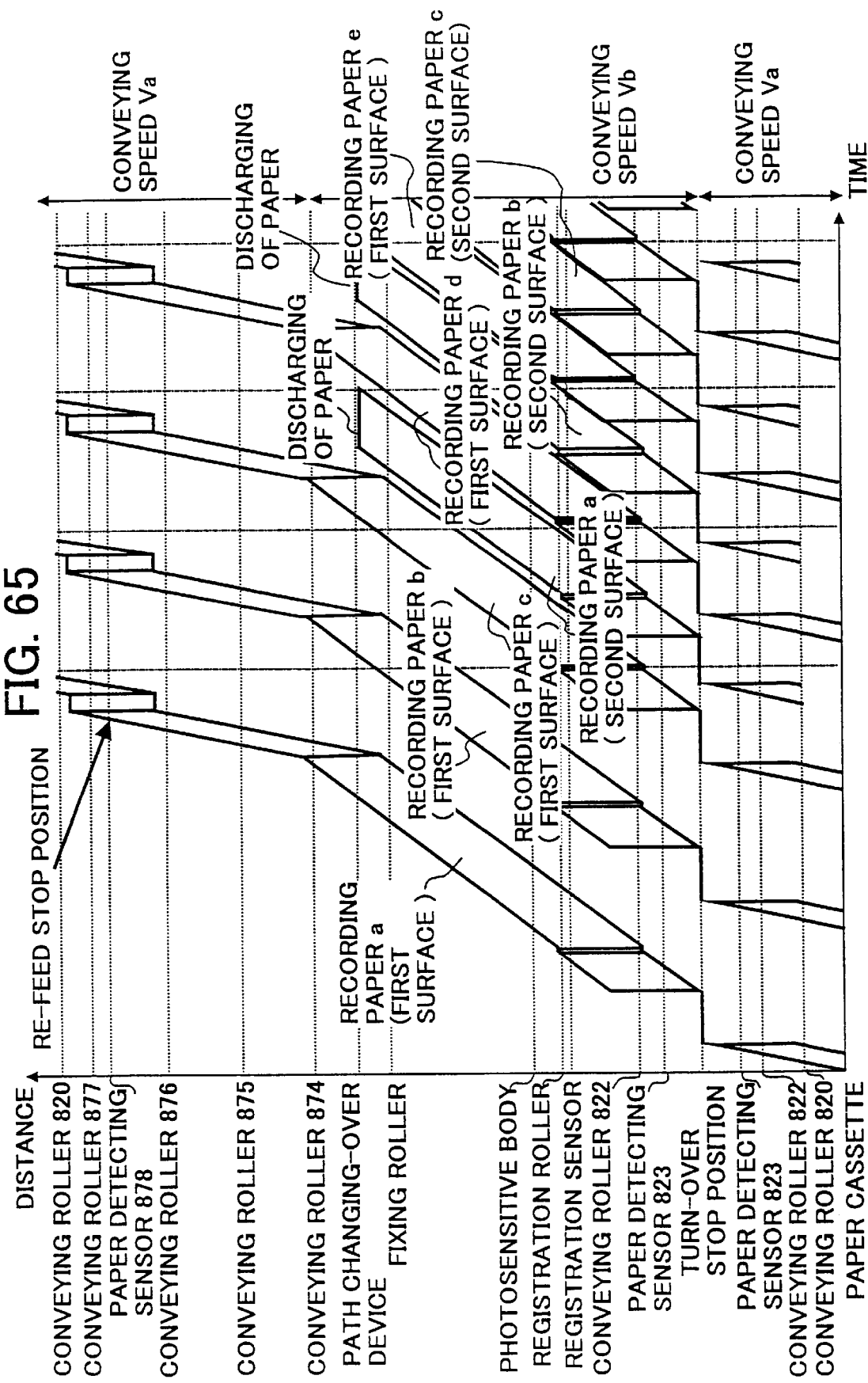

IMAGE FORMING APPARATUS AND METHOD, A PRINTER, A COPYING MACHINE, A FACSIMILE DEVICE SET, AND COMPLEX MACHINE

CROSS-REFERENCE TO RELATED DOCUMENTS

This document claims benefit of priority under 35 U.S.C. §119 to Japanese Patent Application Nos. 2000-012297, 2000-230153, 2000-398225, and 2000-396638, respectively filed in the Japanese Patent Office, on Jan. 20, Jul. 31, Dec. 27, and Dec. 27, 2000, the entire contents of each of which are hereby incorporated herein by reference.

BACKGROUND OF THE INVENTION

1. Field of the Invention

The present invention relates to an image forming apparatus, such as a printer, copying machine, facsimile device, etc., provided with a paper turning-over section in the paper conveying path extended from the paper feeding section to the image forming section, and in particular, an image forming apparatus provided with an image forming section of the electrophotographic type or digital electrophotographic type capable of conveying recording paper with high speed, or an image forming apparatus having a function of paper binding.

The present invention further relates to an image forming apparatus having a function of accommodating the recording paper from the front tip end thereof in a temporary paper accommodating section, switching back the recording paper such that the rear tip end of the recording paper becomes the front tip end thereof, and conveying the recording paper thus switched back to the printer engine.

The present invention further relates to an image forming apparatus capable of sufficiently shortening the distance between the preceding recording paper and the recording paper just subsequent thereto, in particular, at the time of the both-surfaces printing, or otherwise capable of at least partially superposing the preceding recording paper and the just subsequent recording paper on each other in the temporary paper accommodating section.

The present invention further relates to a printer, copying machine, facsimile device set, and complex machine, all provided with the above-mentioned image forming apparatus.

2. Discussion of the Background

Regarding such the sorts of technology, the inventions described in the published specifications of Japanese Laid-open Patent Publication Nos. 5-289453 and 8-259045 are well known.

Among those Japanese Laid-open Patents, the former Laid-open Patent (5-289453) discloses the sheet feeding section of an image forming apparatus capable of shortening the positional distance between the recording papers having the image formed thereon by the image forming section by conveying the recording paper with an increased conveying speed during a constant time period. If the paper distance is intended to be shortened with the increased conveying speed, when the paper conveying path from the paper feeding section to the position where the conveying speed starts to be increased is long, all of the recording papers existing in the conveying path have to be conveyed with the same increased conveying speed. For this reason, the control of changing the paper conveying speed inevitably becomes large-scaled, and that results in the occurrence of troublesome matters to be solved, such as the increase of cost, the increase of noise, etc., on some occasions. In such a situation, the background-art technology has enabled to successively convey the recording paper fed with a constant conveying speed/paper distance in the past, with the necessary paper conveying speed and with the very shortened paper distance, without transiently accelerating the recording paper to be conveyed by use of the method of shortening the paper distance utilizing the switch-back path.

Furthermore, the published specification of Japanese Laid-open Patent Publication No. 8-259045 discloses a paper re-feeding apparatus in an image forming apparatus, that is, a both-surfaces copying apparatus capable of turning over the recording paper having the image formed on the one-side surface thereof and re-feeding the recording paper thus turned over, in which two sheets of paper can be conveyed at the same time on the switch-back path in the paper turning-over device. The same specification further discloses the registration operation at the time of sending out the recording paper.

However, according to the above background art, since the advancing and sending-out operations are performed with three rollers successively brought into contact with each other so as to equalize the conveying speeds before and behind the recording paper turning-over apparatus, the paper distance cannot be largely shortened. Furthermore, the position where the registration operation is performed is largely shifted from the image forming device. Therefore, the image position is probably shifted therefrom due to the conveyance error occurring during the time period of conveying the recording paper on the path. For this reason, the functional effect is limited only to skewing function compensating.

Otherwise, as the related technology, the sheet-state material (e.g. paper) turning-over apparatus and the image as disclosed in the published specification of Japanese Laid-open Patent Publication No. 8-20106 and the sheet turning-over apparatus as disclosed in the published specification of Japanese Laid-open Patent Publication No. 5-97305 are well known. However, in both of them, the driving roller provided on the switch-back path can be parted therefrom and the advancing and sending-out operations for the recording paper can be performed at the same time in the both-surfaces copying machine same as that of the background art as disclosed in the aforementioned Japanese Laid-open Patent Publication No. 8-259045.

Here, the image forming apparatus provided with a paper turning-over device on the paper conveying path extending from the paper feeding stage to the image forming apparatus as proposed by the present inventor, et al. is described hereinafter.

FIG. 12 illustrates an example of an electrophotographic-type image forming device and an image forming apparatus provided with a paper turning-over device. In FIG. 12, the recording papers piled and accommodated in a paper feeding device 1 are separated and fed sheet by sheet from the uppermost position thereof. The recording paper thus separated and fed advances to the switch-back path by the action of the first conveying device 11 and the third conveying device 13 constructing the switch-back path. After stopping temporarily, the third conveying device 13 and the second conveying device 12 practice the registration operation. Thereafter, the recording paper is fed to the image forming device 2. After forming and fixing the image on the recording paper, the recording paper having the image formed thereon is discharged to the paper discharging device 6.

FIGS. 13 through 15 illustrate the registration operation at the time of forming the image on the recording paper in the image forming apparatus as shown in FIG. 12. As is apparent from the illustration of FIGS. 13–15, the leading tip end of the recording paper sent out from the switch-back path is detected by a registration sensor 15, and the sending-out operation of the third conveying device 13 is continued until a predetermined time period elapses. Thereafter, the operation of the third conveying device 13 is stopped. In such a state, the leading tip end of the recording paper impinges on the second conveying device 12 in a state of a little bending as shown in FIG. 14. By creating such a state, the leading tip end of the recording paper is caused to go forward along the nip portion of the second conveying device 12, and in such a state, the improvement of the accuracy in the skew compensation and the paper sending-out timing can be realized. The above operation is called "a registration operation".

Here, among the advancing path for the recording paper and the other path of sending out the recording paper, the commonly-used paper conveying path is called "a switch-back path 13a", and the position where the recording paper is stopped by the switch-back device is called "a turning-over stop position" (B position described later). During the time period of practicing the registration operation, the third conveying device 13 has to be stopped. If the conveying device 13 is not stopped, the just subsequent recording paper cannot be conveyed to the turning-over stop position B. In particular, the problem may become very serious when the stopping state continues for a long time, due to the paper feeding (conveying) timing compensation performed subsequently to the registration operation. Here, in order to solve or eliminate such a problem, the apparatus is constructed such that the second conveying device 12 is stopped again for compensating the paper conveying timing after the rear tip end Pr of the recording paper is parted from the third conveying device 13, as shown in FIG. 15. Thereby, since the just subsequent recording paper can be stopped after finishing the conveyance of the paper to the turning-over stop position B, the image formation can be done with an optional timing. Therefore, it may be preferable to largely shorten the distance between the recording papers and successively form the image. If the rear tip end of the recording paper cannot be parted from the third conveying device 13, sheltering devices 13b and 13c are provided in order not to obstruct the leading tip end Pf of the advancing recording paper.

FIGS. 18 and 19 are conveyance diagrams for illustrating the state of conveying the recording paper including the aforementioned switch-back operation. As shown in FIG. 18, the paper to be fed is conveyed to the turning-over stop position B with the conveying speed $V_a$, and thereafter the paper is stopped temporarily. The time period of stopping the recording paper is previously set with a margin capable of absorbing the unevenness of the recording paper arrival time caused by slip occurring on the conveying roller of the paper feeding device, the slow-down of the conveying speed due to the time-elapsing frictional wearing, and the unevenness of the paper piling position. The unevenness of the recording paper arrival time is shown by a dot-and-dash line. Regarding such unevenness, in the image forming apparatus of the FRR type in which the lower-side roller of a pair of up-and-down rollers as shown in the present example is driven with a constant torque in an opposite direction to that of the paper conveying and thereby the recording paper is separated by the action of the so-called wiping operation, the conveying force overcoming the paper load generated by the paper feeding device is required for the conveying roller and the registration roller. Such a paper load is apt to be generated due to slipping and/or friction. Furthermore, when the conveying speed is changed halfway in the paper feeding or the paper feeding is stopped temporarily, the state of the dynamic friction varies. As a result, the unevenness is enlarged or the roller mark due to the roller friction or the roller rubbing (wearing-out) occurs on some occasions. It is necessary to pay attention to the above-mentioned problem. Since the paper turning-over device is provided in the present structure, there arises a merit that such a problem does not occur at all, compared with the case that the apparatus not provided with the paper turning-over device temporarily stops the paper feeding by use of the paper feeding device at the time of operating the registration.

Furthermore, in the case of feeding the paper successively, since the paper-feed stopping time is provided so as to previously absorb the unevenness on the turning-over stopping position, it is not necessary to prepare the comparatively long stopping time for absorbing the unevenness in the state of fitting to the registration operation. Consequently, it may be very advantageous in the fact that the positional distance between the recording papers is largely extended due to the unevenness absorption.

Furthermore, in the background-art structure, the conveying speed for the recording paper 2 after the registration operation is increased for the purpose of shortening the paper distance, and thereby the paper distance can be shortened. However, when the paper conveying speed is increased, it is necessary to construct the apparatus such that the speed of all the registration roller, the conveying roller, and the paper-feeding device can be increased. Therefore, it is not necessary to solve the newly-arizen problem. That is a very advantageous structure in those points mentioned heretofore.

Furthermore, in the electrophotographic system, since a charger, a writing device, a developing unit, a transferring unit, and a cleaning unit are arranged around the surface of the photosensitive drum, and the respective processes are practiced successively, the operation of temporarily stopping the photosensitive body by a paper distance cannot be performed. Regarding the life span of the image forming device represented by the photosensitive body, the photosensitive body idly rotates wastefully by the loss of the paper distance. Therefore, the photosensitive body may have to be replaced more often, and that results in an increase in maintenance costs.

Furthermore, in the digital electrophotographic system, the writing device of the laser beam scanner system is generally used. However, if the rotation number of the polygon motor exceeds 30,000 r.p.m., an expensive air bearing technology is required. The similar high-cost technology of scanning the plural laser beam at the same time is required, in order to avoid such problems as mentioned above. Therefore, it has been difficult to improve the image forming speed according to the general technology. Furthermore, owing to the level-up of the requirement of the image quality in the recent years, the improvement of the resolution is advancing year by year. However, it is necessary to largely increase the rotation number of the polygon motor. That is a large subject matter to be solved, for realizing the image forming apparatus of high image quality and high speed.

FIG. 19 is a conveying diagram for illustrating the state of performing the stopping operation, in which, after operating the registration, when a comparatively long stopping time period occurs for the timing compensation, the just subsequent recording paper(s) can be conveyed to the turning-over stopping position and the paper conveying is stopped also for timing compensation.

As to the additional background arts, the published specifications of Japanese Laid-open Patent Publications Nos. 9-12198, 8-259045, 8-20106, and 5-97305 disclose technologies, in which, after forming the image on one surface of the recording paper by use of the printer engine, the recording paper is guided to a switching back path and switched back on the path and the recording paper thus switched back is returned to the printer engine, and an image can be formed on the rear surface of the recording paper in such a way.

However, according to the technologies as disclosed in the above background-art documents, the switching-back image formation of the piled recording paper in the cassette or the tray cannot be attained. To state concretely, according to the above technologies, after performing the image formation on the one surface of the recording paper with the printer engine, the recording paper is switched back. in order to turn over the recording paper and return it again to the printer engine. However, in all of the above-mentioned background arts, when the recording papers piled and accommodated in the paper stock section such as a paper feeding cassette or tray are directly conveyed to the printer engine, the recording paper cannot be switched back and supplied to the printer engine.

SUMMARY OF THE INVENTION

Heretofore, the background arts regarding the image forming apparatus of the electrophotographic type have been described. However, according to such background arts, for instance the arts disclosed in the background-arts documents, e.g., the published specifications of Japanese Laid-open Patent Publication Nos. 5-289453, 8-259045, 8-20106, and 5-97305 and other relevant documents relating to the other image forming apparatus, there exists no advantageous functional effect for improving the above-mentioned image forming apparatus.

The present invention has been made in view of the above-discussed and other problems to address the above-mentioned defects and troublesome matters of the background arts. To state in more detail, a primary object of the present invention is to provide a novel image forming apparatus for improving the defects and troublesome matters of the background arts.

Namely, including the aforementioned well-known examples, in the image forming apparatus for separating and feeding the recording paper by use of the paper feeding device and performing the registration operation of matching the recording paper onto the image position just before the image forming device, the image formation is generally performed on the recording paper with the paper distance of at least several tens mm with the factors such as the unevenness of the recording paper tip end position at the time of separating the recording paper, the time-elapsing and environmental variation of the recording paper conveying speed, and the stopping time period for performing the registration. It has not previously been possible to shorten the above-mentioned paper. Furthermore, in order to shorten the paper distance, although it can be thought that the photosensitive body is stopped in the position corresponding to the area between the recording papers, it may be impossible in practice to perform the control operation in such a way.

Consequently, the distance between the recording papers to have an image formed thereon, that is, the so-called paper distance, requires the aforementioned paper distance of at least several tens mm. The largeness of the distance between the recording papers exerts an influence upon the efficiency of the image formation.

The present invention was made in consideration of such technical background. Thus, one object of the invention is to maintain the small size and low cost and to enable practicing the both-surfaces image formation with the same paper distance.

The present invention further intends to realize a novel image forming apparatus capable of accommodating the recording paper from the front tip end thereof in a temporary paper accommodating section, switching back the recording paper such that the rear tip end of the recording paper becomes the front tip end thereof, and conveying the recording paper thus switched back to the printer engine. The present invention further realizes a printer, a copying machine, a facsimile device set, and a complex machine, all having the above image forming apparatus.

In such an image forming apparatus, when the recording paper piled and accommodated in the paper stock section such as a paper feeding cassette or tray is directly conveyed to the printer engine, various sorts of further effective processings can be performed by switching back the recording paper, compared with the case of feeding the recording paper directly to the printer engine without performing such switching-back. The present inventor has already found the above fact.

The present invention aims at performing various sorts of effective operations and treatment to the recording paper for the purpose of image formation, compensating the traverse registration of the recording paper with a simple compensation device, and further compensating precisely the traverse registration thereof.

The present invention further aims at improving the visible appearance of a stamp shadow and enabling to easily supply ink to the stamping device at the time of stamping the recording paper.

The present invention still further aims at reducing the number of parts, enhancing the effect of the paper processing treatment, performing effective curling compensation and effective heating and cooling for the recording paper, and thereby realizing a small-sized apparatus, improvement in reliability, and low cost.

The present invention still further aims at easily realizing temperature adjustment.

The present invention still further aims at reducing the number of parts, improving image quality by sufficiently removing dirt or dust such as paper powder, improving the flatness or smoothness and the brilliance of the recording paper by sufficiently pressing the surface thereof, and uniformly and sufficiently performing coating with a coating agent, and thereby realizing a small-sized apparatus, improvement in reliability, and low-cost.

The present invention still further aims at reducing manufacturing cost by realizing a small-sized apparatus and parts number reduction for an image forming apparatus capable of printing an image on both surfaces of the recording paper.

The present invention still further aims at enabling the positions of the images formed on the both (front and rear) surfaces of the recording paper to stably coincide with each other, for the both-surfaces printing image forming apparatus. The present invention still further aims at realizing a novel image forming apparatus for performing image formation with an ordinary electrophotographic method and digital electrophotographic method, both capable of attaining the above-mentioned respective objects of the present invention.

The present invention still further aims at realizing a printer, copying machine, facsimile device set, and complex machine, all capable of attaining the above-mentioned respective objects of the present invention.

In the aforementioned background art, assuming that, only after the preceding recording paper is switched back in the paper switch-back path and sent out to the photosensitive body, the just subsequent recording paper is sent to the switch-back path, the distance between the preceding paper and the just subsequent paper cannot be sufficiently shortened. As a result, the high-speed successive paper feeding cannot be realized.

In order to solve such the troublesome matter, the present invention still further aims at providing a novel image forming apparatus capable of sufficiently shortening the distance between the preceding recording paper and the just subsequent recording paper and thereby realizing high-speed successive paper feeding. In particular, the invention aims at sufficiently shortening the distance therebetween at the time of performing the both-surfaces printing in order to realize high-speed successive paper feeding. Furthermore, the present invention aims at providing an apparatus which does not require a special device for prescribing the movement path for the preceding paper and the just subsequent paper intersecting therewith. Thereby, it is possible to simplify and keep a small-size apparatus, and the cost of manufacturing the apparatus can be largely reduced.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein:

FIG. 4 is a block diagram illustrating the electrical structure in the image forming apparatus of the first embodiment according to the present invention;

FIG. 7 is a conveying diagram illustrating the conveying process in the case of performing the paper re-feeding conveyance in the image forming device with the conveying speed $V_b$;

FIGS. 21A and 21B are outlined diagrams illustrating the mechanism of the conveying roller provided in the switch-back path of the image forming apparatus;

FIG. 65 is still another diagram illustrating the paper conveyance in the image forming apparatus.

DETAILED DESCRIPTION OF THE PREFERRED EMBODIMENTS

Figure 1:
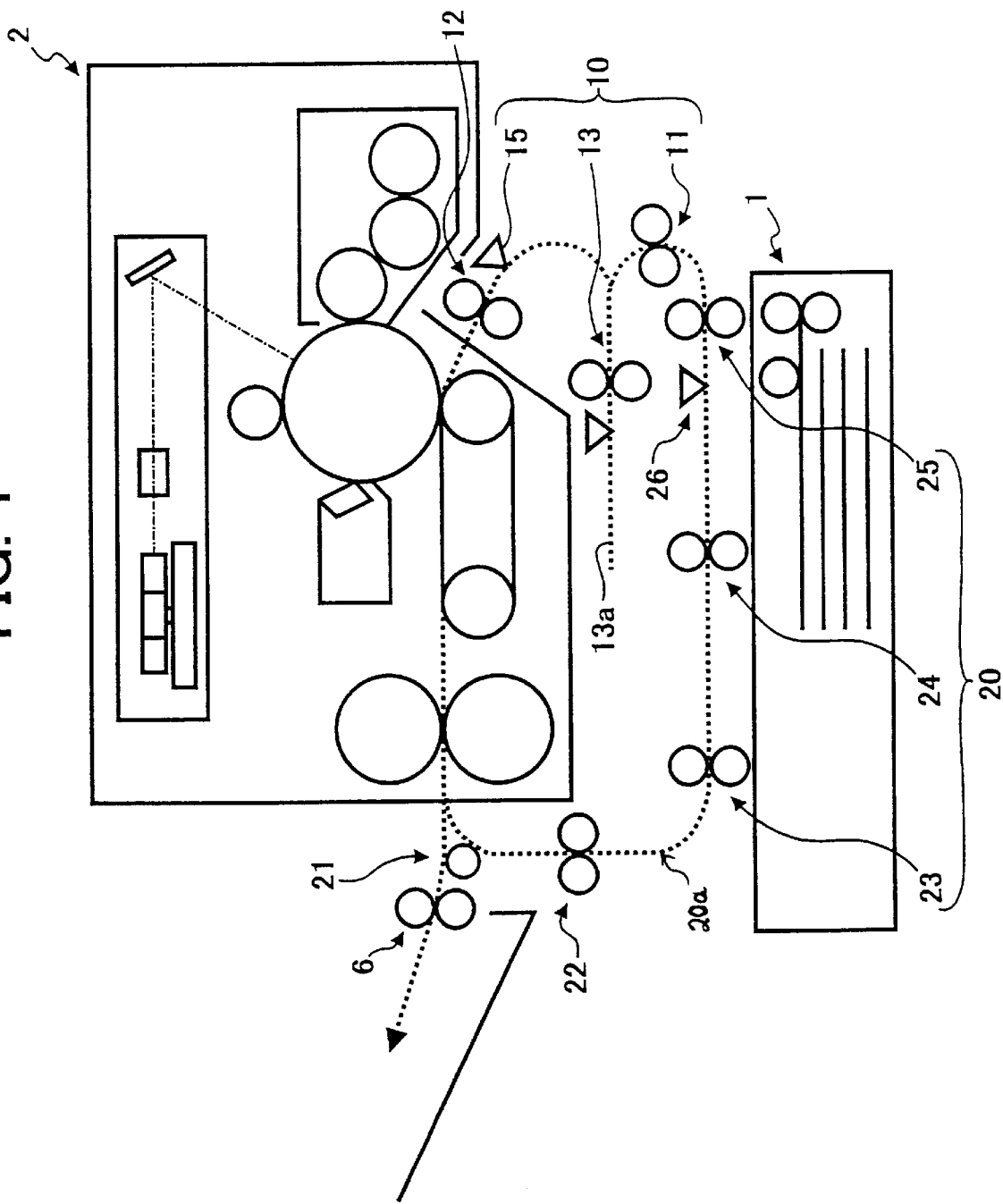
FIG. 1 is an outlined structural diagram illustrating the image forming apparatus of the first embodiment according to the present invention.

In describing the preferred embodiments of the present invention illustrated in the accompanying drawings, specific terminology is employed for the sake of clarity. However, the present invention is not intended to be limited to the specific terminology so selected and it is to be understood that each specific element includes all technical equivalents which operate in a similar manner.

Referring now to the accompanying drawings, wherein like reference numerals designate identical or corresponding parts throughout the several views or diagrams, and more particularly to FIGS. 1 through 11, there is illustrated an image forming apparatus according to the present invention including a paper feeding device, an image forming device, a paper turning-over device, and a paper re-feeding device.

In order to attain the aforementioned objects of the present invention, the first aspect of the invention provides an image forming apparatus of an electrophotographic type comprising: a paper feeding device for separating and feeding piled recording paper; an image forming device for forming image in order on the fed recording paper; a paper turning-over device for switching back the recording paper on a paper conveying path extending from the paper feeding device to the image forming device and turning over a front tip end of the recording paper and a rear tip end of the recording paper; and a paper re-feeding device for re-feeding the recording paper having the image formed on one-side surface thereof by the image forming device to the paper re-feeding device. In such the image forming apparatus, the recording paper is turned over from the paper re-feeding device to the image forming device and fed again to the image forming device. Therefore, the image can be formed on the both surfaces of the recording paper keeping the small size and the low cost, only by additionally preparing the paper re-feeding device.

The second aspect of the invention provides the image forming apparatus in connection with the first aspect, in which the conveying speed of the paper re-feeding device is higher than the conveying speed of the image forming section. In such the apparatus, the image can be formed at very short paper distance even at the time of forming the image on the both surfaces of the recording paper.

The third aspect of the invention provides the image forming apparatus in connection with the first aspect, in which the paper conveying speed of the paper re-feeding device is almost equal to the conveying speed of the paper feeding device. In such the apparatus, it is not necessary to control the paper re-feeding device so as to change the paper conveying speed thereof.

The fourth aspect of the invention provides the image forming apparatus in connection with the first aspect, in which, after practicing the image formation on plural pages of the one surface of the recording paper, the recording paper re-fed from the paper re-feeding device and the recording paper fed from the paper feeding device are set so as to alternately advance. In such the apparatus, it is not necessary to provide the intermediate tray for piling and storing the recording paper in the paper re-feeding device.

The fifth aspect of the invention provides the image forming apparatus in connection with the first aspect, in which the paper re-feed stopping position is provided in order to temporarily stop re-feeding the recording paper to the paper re-feeding device, and the timing is controlled so as to cause the recording paper to advance to the paper turning-over device from the paper re-feeding path.

The image forming device of the other aspect(s) in connection with the first through fifth aspects is preferably constructed with the electrophotographic-type image forming device or the digital electrophotographic-type image forming device provided with the digital writing-in device. In the background art, the wearing deterioration of the image forming device occurs to the same extent as that at the time of the image forming operation even for the paper distance of the high rate compared with the entire length of the recording paper. On the contrary, in the present invention, the wearing of the image forming device occurring at the paper distance at the time of successively forming the image on the both surfaces of the recording paper can be largely improved (reduced).

Furthermore, in the image forming apparatus of the digital electrophotographic type in which the laser beam writing-in device is generally used, the productivity can be improved (raised), without causing the increase of the laser beam writing-in frequency and the increase of the rotation number of the polygon scanning motor.

Furthermore, according to the other aspect of the invention in the image forming apparatus, since the preceding recording paper and the other recording paper just subsequent thereto are superposed on each other in the temporary paper accommodating section, the distance between the preceding paper and the just subsequent paper can be sufficiently shortened.

Moreover, by switching back the recording paper in the temporary paper accommodating section, various treatments and processing are performed for the image formation on the recording paper.

Furthermore, the image forming apparatus is constructed such that the paper feeding apparatus and the return conveying apparatus for performing the both-surfaces image formation are commonly employed as the temporary paper accommodating section.

In addition, the just subsequent paper advancing to the temporary paper accommodating section is guided so as to go along the preceding paper, it is not necessary to specially provide the device for prescribing the movement path of the just subsequent paper intersecting with the preceding paper in the temporary paper accommodating section.

Or otherwise, the distance between the rear tip end of the preceding paper and that of the just subsequent paper (coinciding the former with the latter) is nullified.

First Embodiment

Figure 12:
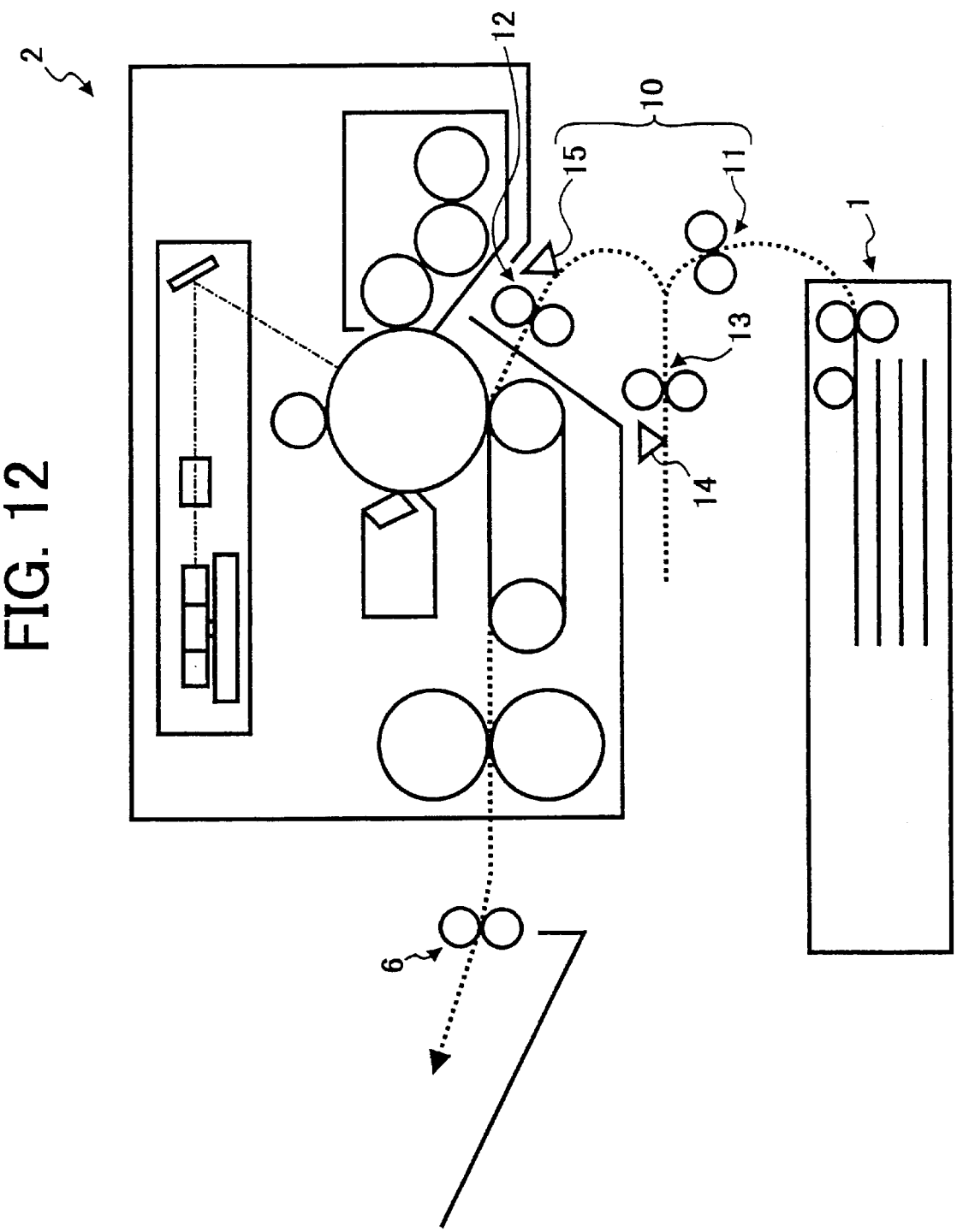
FIG. 12 is an outlined structural view of the image forming apparatus provided with a turning-over paper feeding device.
Figure 13:
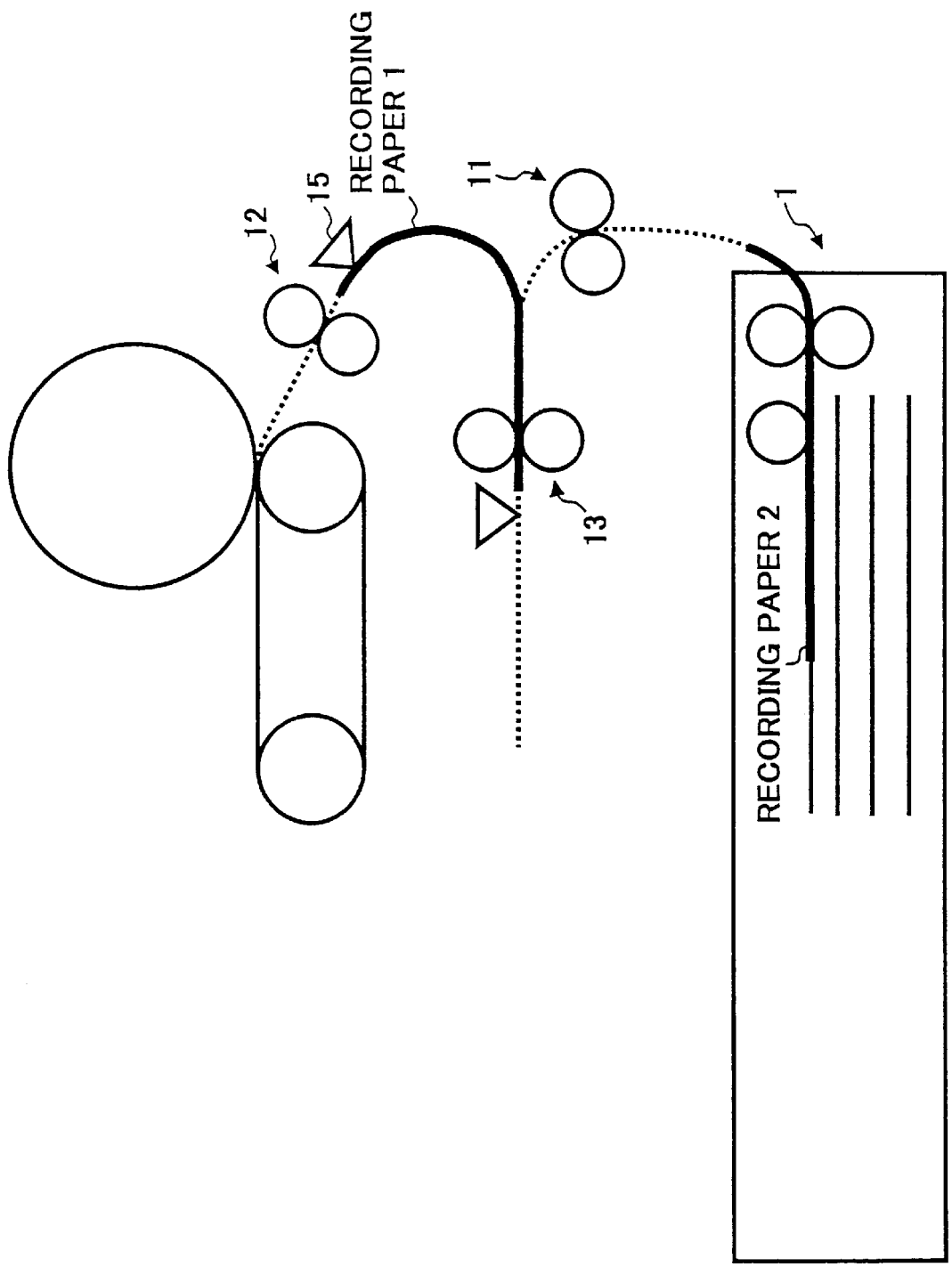
FIG. 13 is an explanatory diagram illustrating the initial state of performing the registration operation at the time of forming the image on the recording paper in the image forming apparatus shown in FIG. 12.
Figure 14:
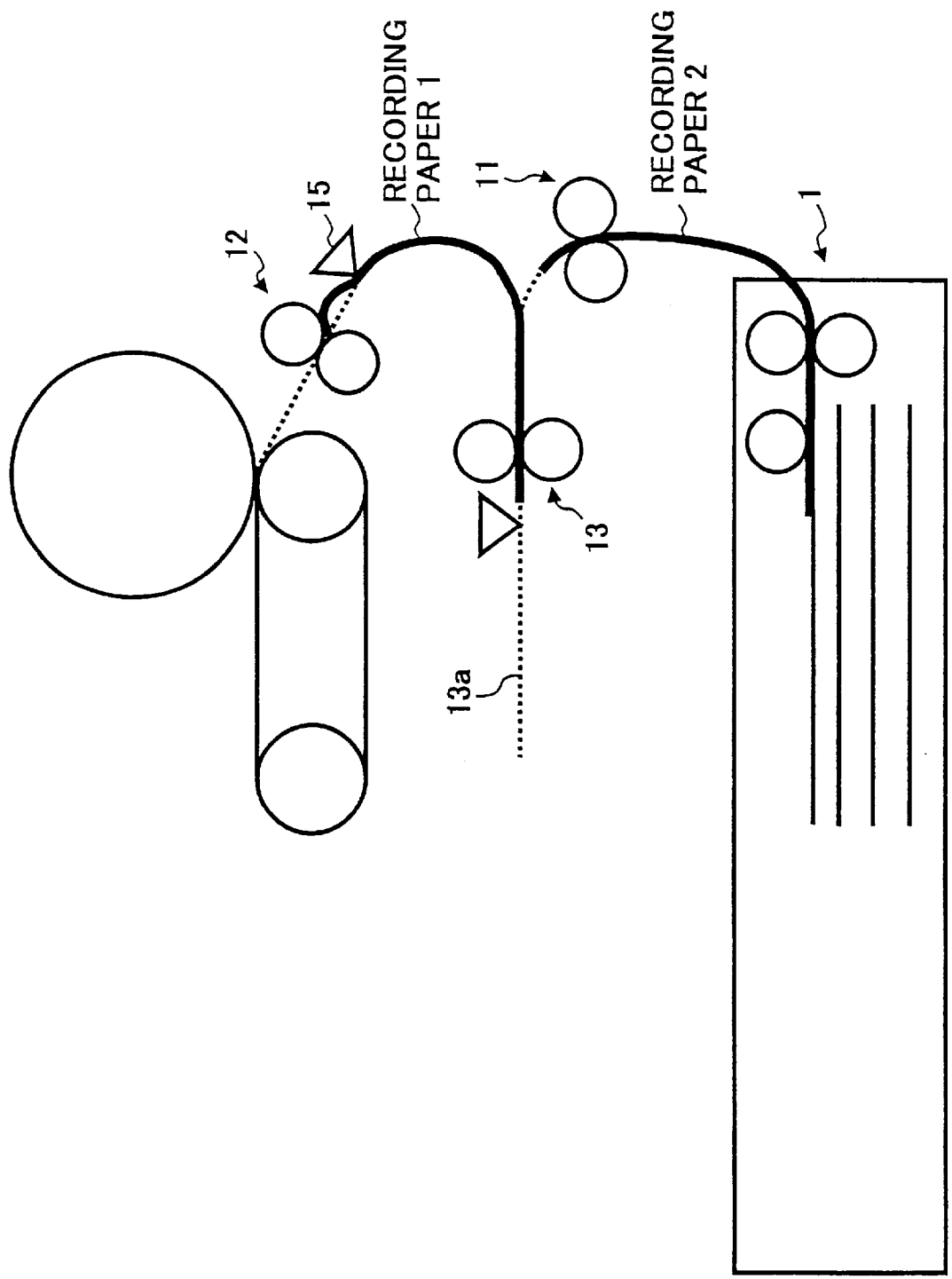
FIG. 14 is an explanatory diagram illustrating the registration state of performing the registration operation at the time of forming the image on the recording paper in the image forming apparatus shown in FIG. 12.
Figure 15:
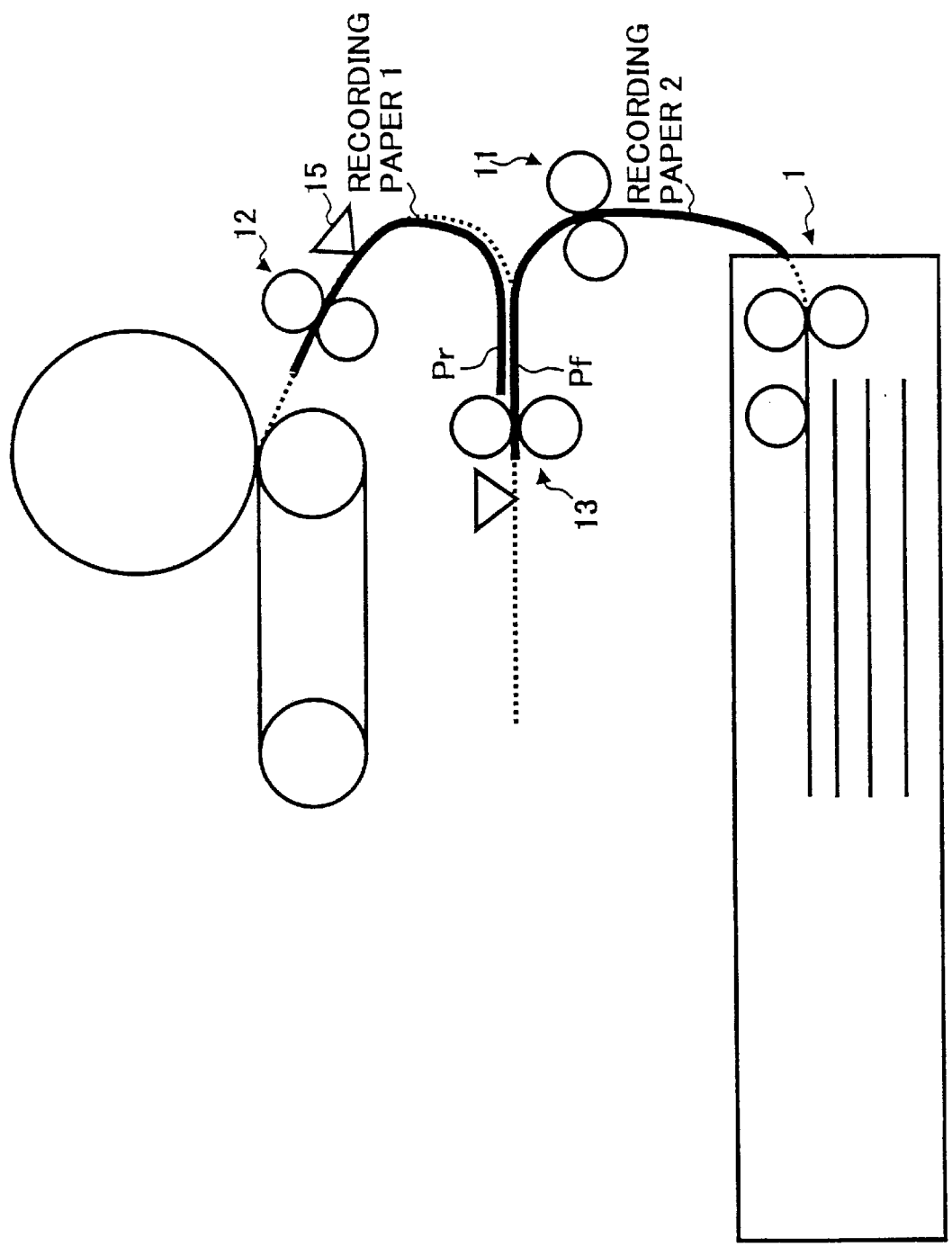
FIG. 15 is an explanatory diagram illustrating the registration release state of performing the registration operation at the time of forming the image on the recording paper in the image forming apparatus shown in FIG. 12.
Figure 16A:
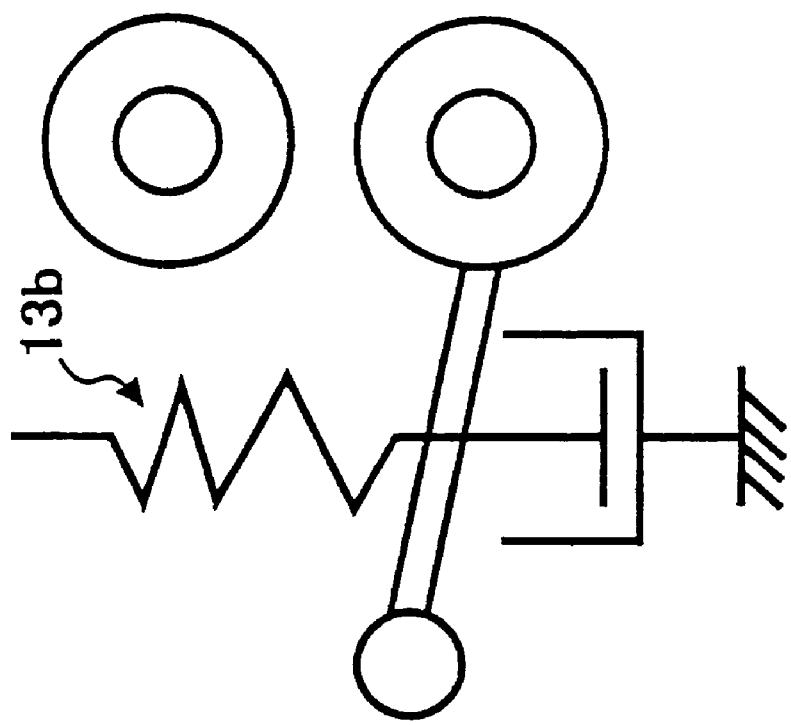
FIGS. 16A and 16B are explanatory diagrams illustrating an example of a sheltering device provided so as not to hinder the advancement of the recording paper tip end in the structure shown in FIGS. 13 through 15.
Figure 16B:
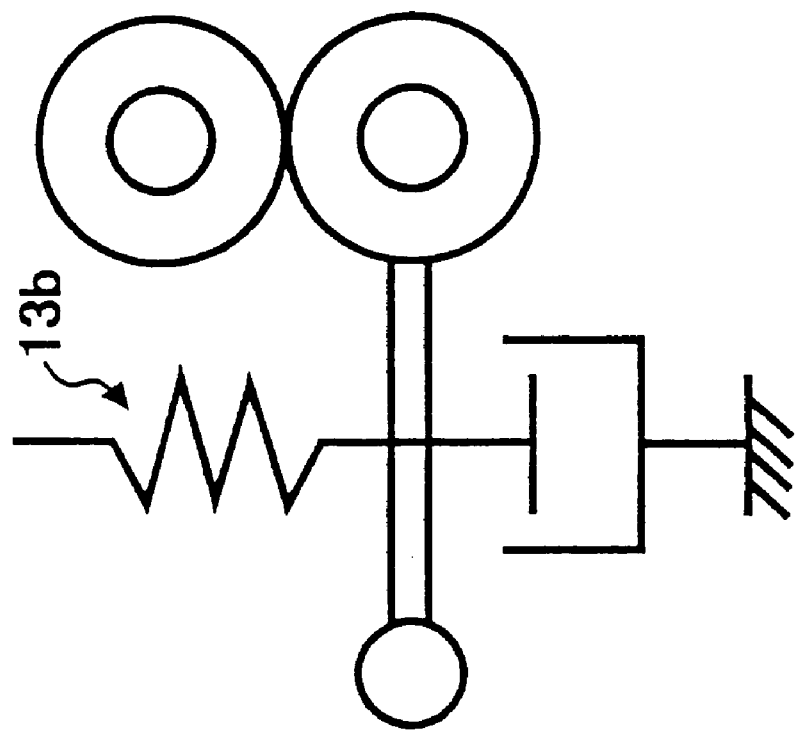
Figure 17:
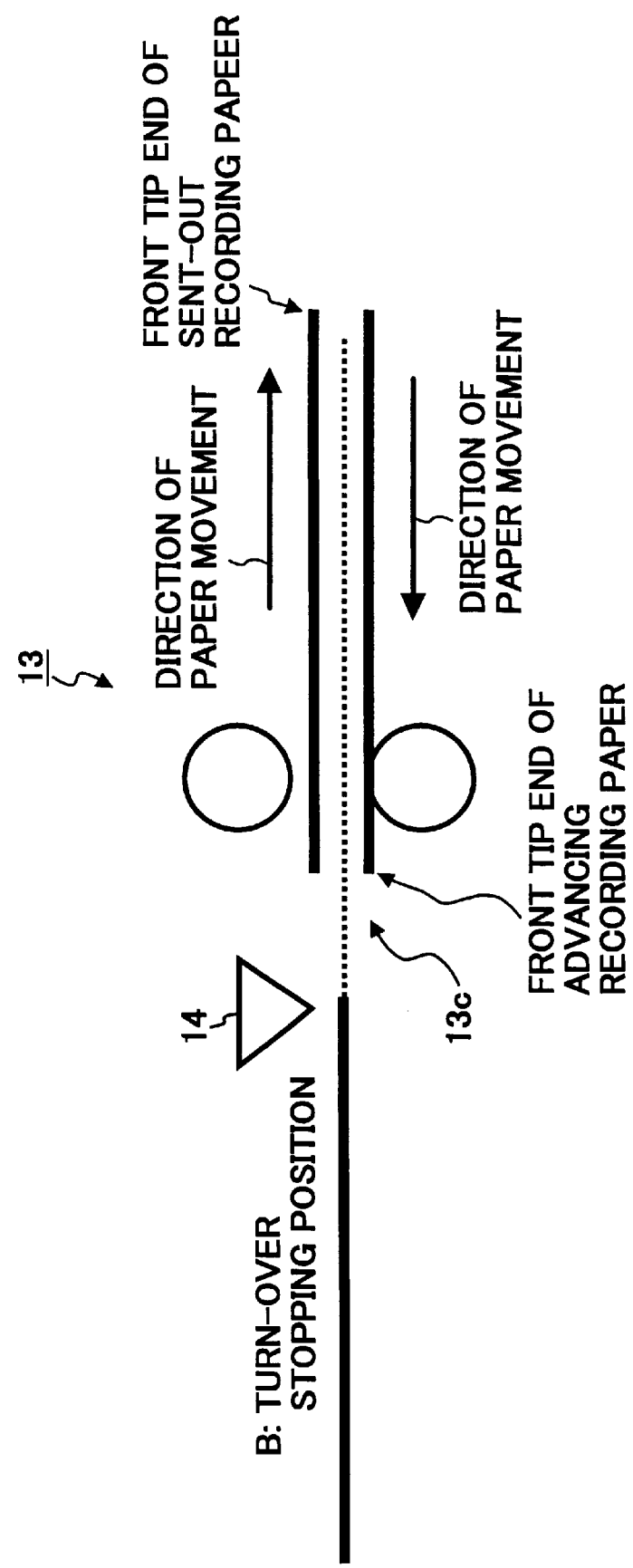
FIG. 17 is an explanatory diagram illustrating another example of a sheltering device provided so as not to hinder the advancement of the recording paper tip end in the same structure.
Figure 18:
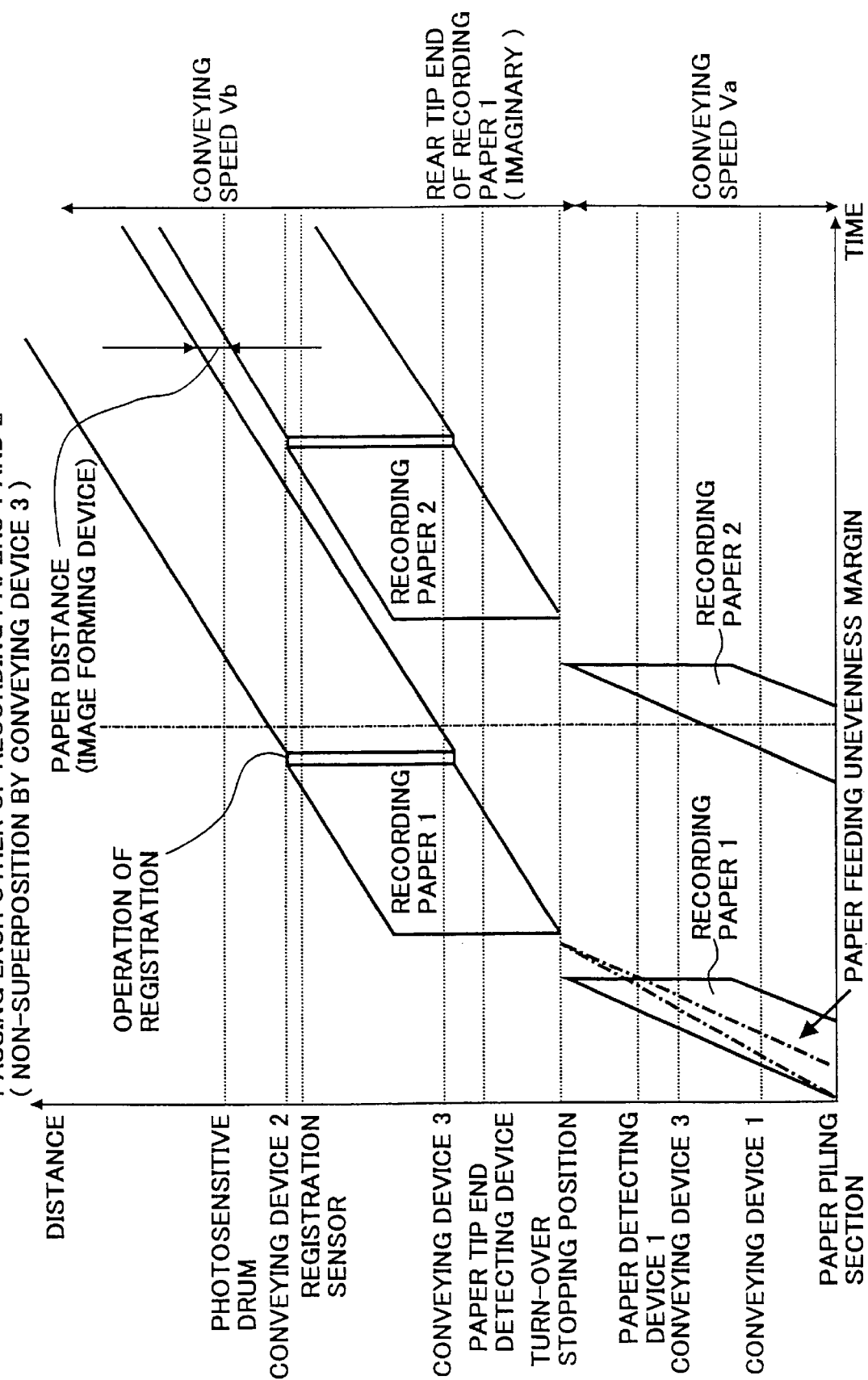
FIG. 18 is a conveying diagram illustrating a state of the operation of conveying the paper including the switch-back operation.
Figure 19:
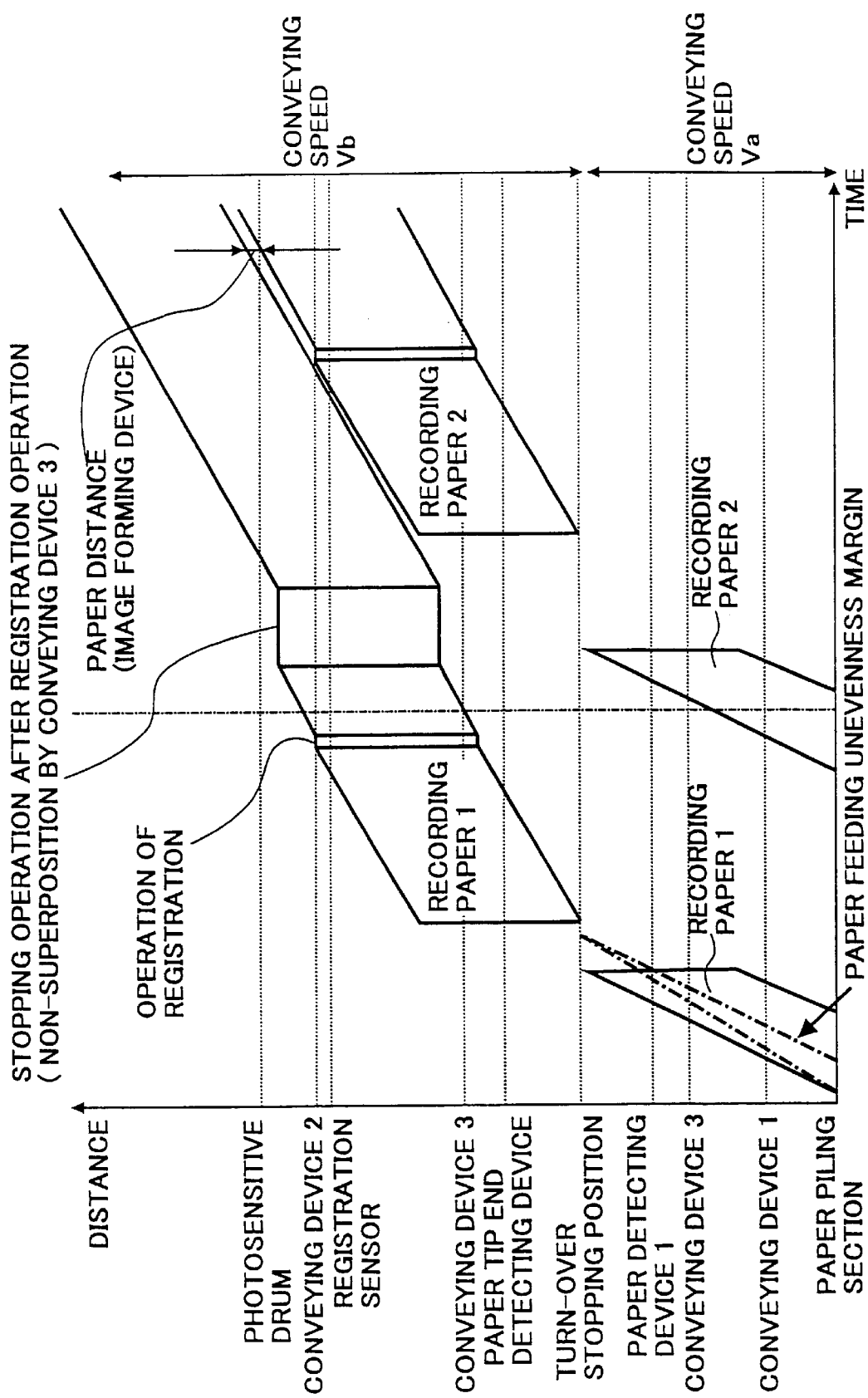
FIG. 19 is a conveying diagram illustrating another state of the operation of conveying the paper including the switch-back operation.

The first embodiment according to the present invention is described hereinafter, referring to the accompanying drawings. FIG. 1 is an outlined structural diagram illustrating an example of the image forming apparatus relating to the first embodiment of the present invention. In the embodiment, a re-feeding device 20 for guiding the recording paper having the image formed on the one-side surface thereof to the aforementioned switch-back path 13a between the conveying path 13d at the upstream side in the paper conveying direction of the third paper conveying device corresponding to the switch-back path of the background art shown in FIG. 12 and the other conveying path 6a at the upstream side of the paper discharging device 6. Furthermore, the apparatus of the embodiment according to the present invention is constructed such that, by the changing-over action of the path changing-over device 21 provided on the path 6a for guiding the recording paper to the side of the paper discharging device 6, the path of discharging the paper to the side of the paper discharging device and the other path of discharging the paper to the side of the paper re-feeding device 20 can be selected. Otherwise, in the present embodiment, the respective portions not described in particular are constructed in the same way as that of the aforementioned background art shown in FIG. 12.

In such a structure, the recording paper sent out from the image forming device 2 is selectively changed over by the path changing-over device 21 to the path guided to the paper discharging device 6 or to the other path guided again to the paper turning-over device 10 through the re-feeding path 20a. To state concretely, it is preferable to realize a structure capable of promptly changing over the leading tip end of the recording paper by rotating the brush roller in the normal and reverse rotative direction in order to precisely change over the tip end thereof even though the paper distance is very short. As a matter of course, it may be allowable to use a guiding claw instead of the path changing-over device 21.

The recording paper guided to the re-feeding path 20a is further guided to the first conveying device 11 by the conveying roller pairs 22–25 provided along the paper re-feeding path 20a. At that time, if the second paper detecting apparatus 26 is disposed on the aforementioned paper re-feeding path 20a just before the first paper conveying device 11 extending from the paper feeding device 1 to the switch-back path 13a, for the purpose of detecting the timing when the recording paper approaches to the first paper conveying device 11, such a structure is effective for the control accuracy improvement and the jamming detection.

Figure 2:
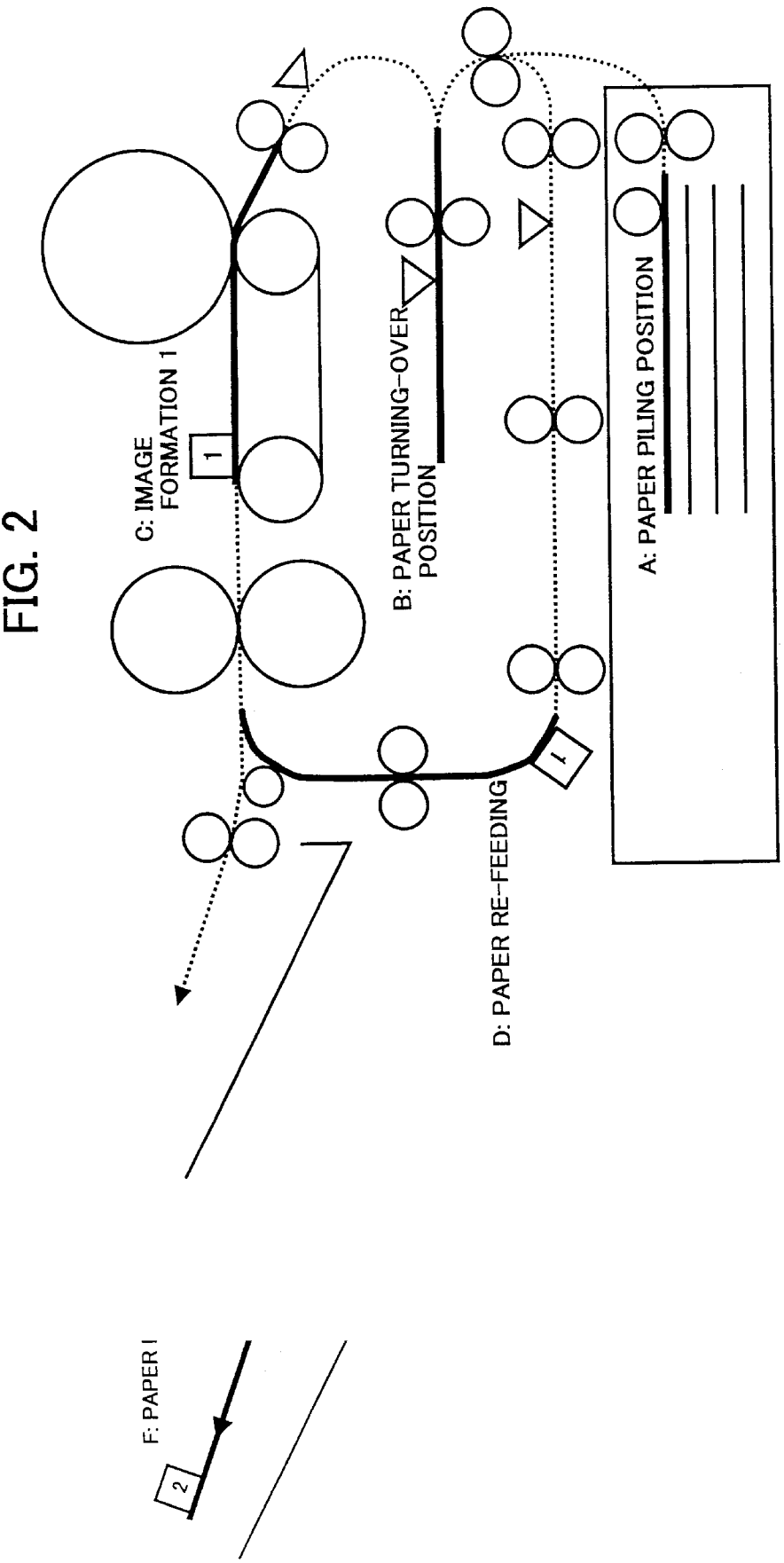
FIG. 2 is an explanatory diagram illustrating the first-half portion of the paper conveying process at the time of forming the both-surfaces image in the image forming apparatus shown in FIG. 1.
Figure 3:
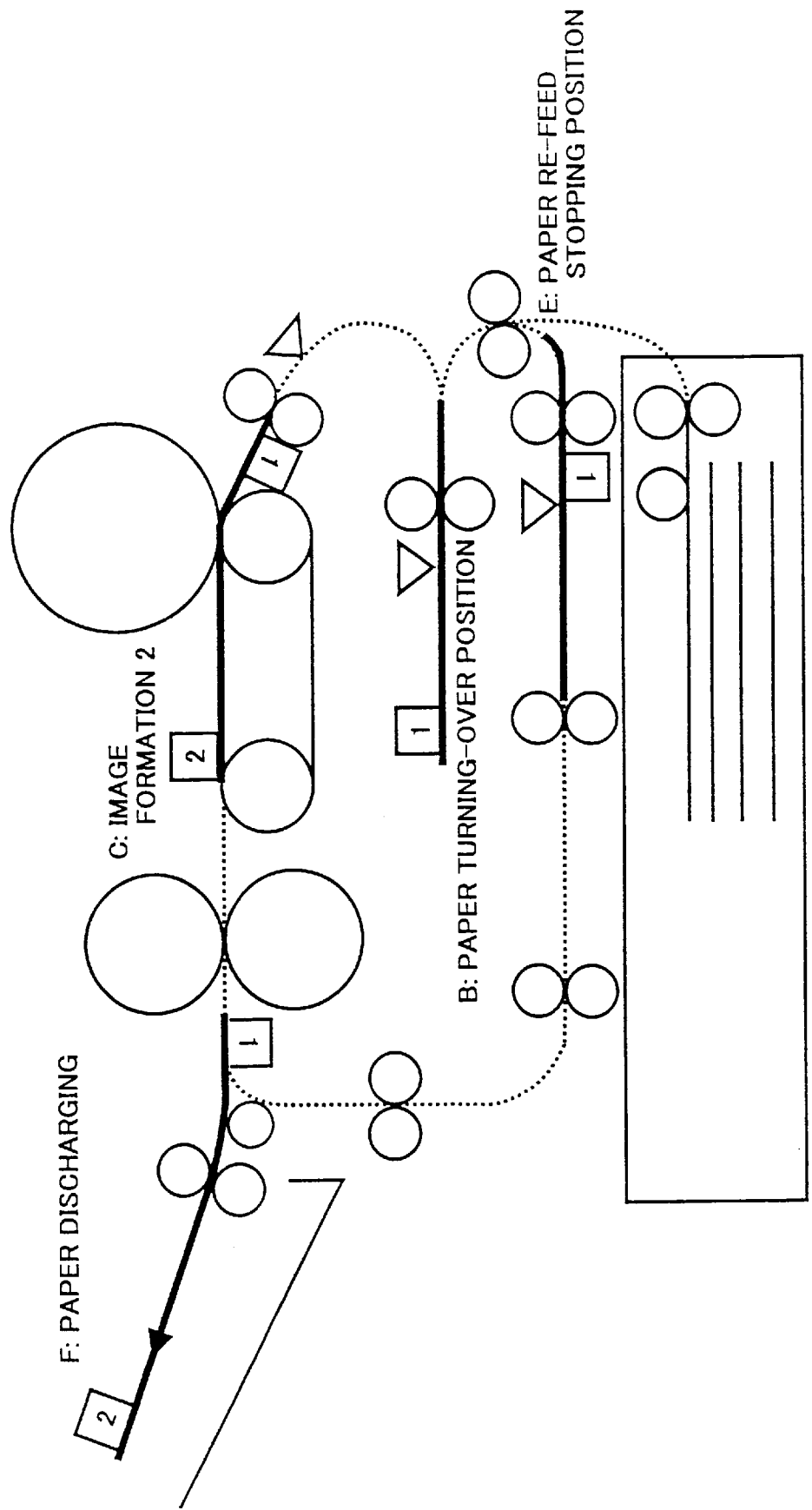
FIG. 3 is another explanatory diagram illustrating the second-half portion of the paper conveying process at the time of forming the both-surfaces image in the image forming apparatus shown in FIG. 1.

FIG. 2 and FIG. 3 are explanatory diagrams for illustrating the operation at the time of forming the image on both surfaces of a sheet of recording paper in the present embodiment.

In FIGS. 2 and 3, the recording paper passes through the paths; ABCDEBCF in order, and the image is formed on both surfaces of the recording paper. Here, the respective symbols; A–F signify the matters as follows:

A: Paper Piling Position;
B: Paper Turning-over Position;
C: Image Forming Position;
D: Paper Re-feeding Position;
E: Paper Re-feed Stopping Position;
F: Paper Discharging Position Namely, the recording paper guided from the paper piling position A of the paper feeding device 1 to the first paper conveying device 11 is temporarily stopped on the paper turning-over position B of the switch-back path 13a. And then, the paper conveying direction is changed to the opposite direction and the paper is conveyed in the direction to the image forming device 2 by the third paper conveying device 13. The paper is temporarily stopped on the position of the registration sensor 15. The conveyance timing is taken with the position of the image visualized on the photosensitive drum of the image forming device 2, and then the paper is sent out.

The recording paper having the image formed on the one-side (rear) surface passes through the paper re-feeding path 20a (paper re-feeding position D) selectively changed over by the path changing-over device 21, and the paper is stopped on the paper re-feed stopping position E, and then the timing with the next recording paper is adjusted. The paper is sent again to the switch-back path 13a. The paper passes through the aforementioned paper turning-over position B and the image is formed on the other one-side (front) surface on the image forming position C. At last, the paper is discharged to the side of the paper discharging position F by changing over the path changing-over device 20 to the paper discharging side.

FIG. 4 is a block diagram illustrating the structure of the control system in the image forming apparatus shown in FIGS. 1 through 3. Basically, the control system is composed of a detecting section, a driving section, and a control device. The control device is composed of a CPU 401, a ROM (not shown) in which the programs of the CPU 401 are stored, and a RAM functioning as the work area of the above-mentioned CPU 401 in which dynamic data are stored. The detection signal from the detecting section is input to the CPU 401. The detecting section is composed of the aforementioned first and second paper detecting devices 14 and 26 and the registration sensor 15. As the detecting device or sensor, for instance, an optical sensor is employed.

An operation signal and a direction signal are output from the CPU 401 corresponding to the driven objects of the first through eighth drivers. The paper feeding device 1 is driven by the paper feeding motor 421. The image forming device 2 is driven by the image creating motor. The first paper conveying device 11 is driven by the first motor 423. The second paper conveying device 12 is driven by the second motor 424. The third paper conveying device 13 is driven by the third motor 425. The waiting device on the turning-over stop position B at the switch-back portion is driven by the solenoid 426. The path changing-over device 21 is driven by the changing-over motor 427. The fourth through seventh paper conveying devices 22, 23, 24, and 25 are respectively driven by the fourth motor 42.

The operation signal is output from the CPU 401 to the first through eighth drivers 411–418 in order to perform the driving control for the objects to be driven. Moreover, since the third paper conveying device 13 and the path changing-over device 21 respectively have directional properties, the operation signal is applied to the fifth and seventh drivers 415 and 417 by the CPU 401 and outputs the directional signal, in order to drive the third paper conveying device 13 and the path changing-over device 21.

In the embodiment, the fourth through seventh paper conveying devices 22–25 are each driven by the fourth motor 428. The reason thereof is that, for instance, the speed of conveying the recording paper can be changed by use of the structure as shown in FIG. 5 and FIG. 6. Namely, FIGS. 5 and 6 respectively illustrate the structure for changing the paper conveying speed. The paper conveying mechanism is generally constructed with a driving section for rotating the roller pairs having advantages in reliability and low-cost and a guide member for guiding the recording paper. On such an occasion, it is necessary to set the distance between the rollers to a distance shorter than the entire length of the recording paper.

In order to change the speed of conveying the recording paper, the speeds of all nipped rollers pairs have to be increased or decreased. However, the structure for performing such a control operation results in the cost-up due to the addition of the speed changing circuit, etc. When the speed thereof is increased, either one of the two pairs of rollers respectively having different conveying speeds is provided with a torque limiter, and the speed of conveying the recording paper can be increased by utilizing the slipping of the torque limiter without changing the speed of the motor.

In FIG. 5 and FIG. 6, the paper conveying speeds A and B are respectively set to $V_1$ and $V_2$. In FIG. 5, the roller pair constructing the paper conveying device A situated at the upstream side in the paper conveying direction is provided with the torque limiter, while the other roller pair constructing the paper conveying device B situated at the downstream side in the paper conveying direction is not provided with the torque limiter.

On the other hand, in FIG. 6, the roller pair constructing the paper conveying device B situated at the downstream side in the paper conveying direction is provided with the torque limiter, while the other roller pair constructing the paper conveying device A situated at the upstream side in the paper conveying direction is not provided with the torque limiter.

Figure 5A:
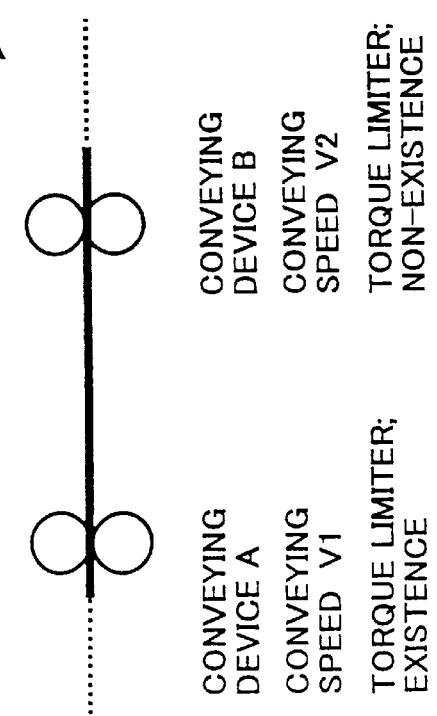
FIG 5A and 5B are explanatory diagrams illustrating the construction for changing the conveying speed by use of a torque limiter and the speed changing property thereof.
Figure 5B:
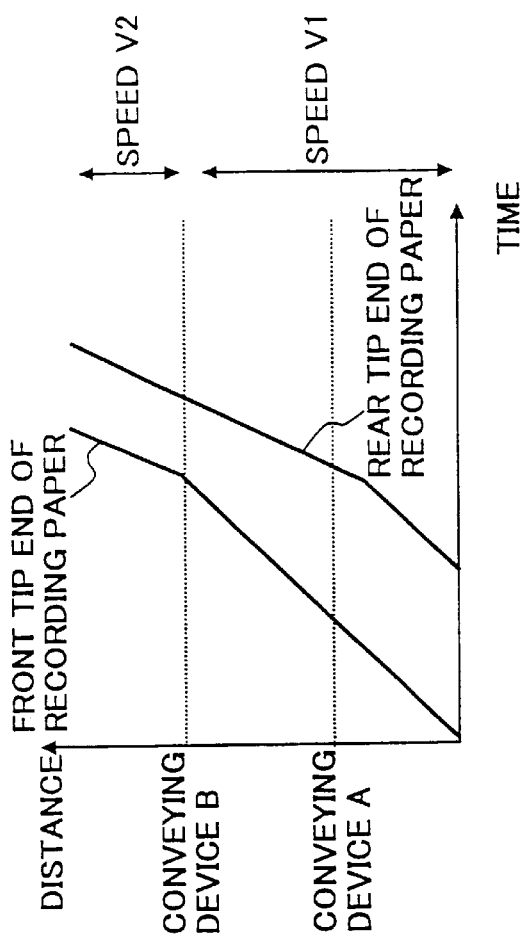
Figure 6A:
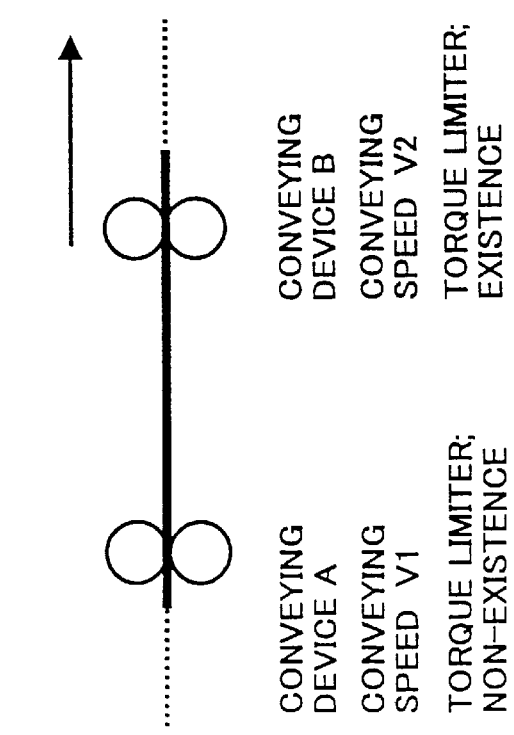
FIGS. 6A and 6B are explanatory diagrams illustrating the construction for changing the conveying speed by use of the torque limiter and the speed changing property thereof.
Figure 6B:
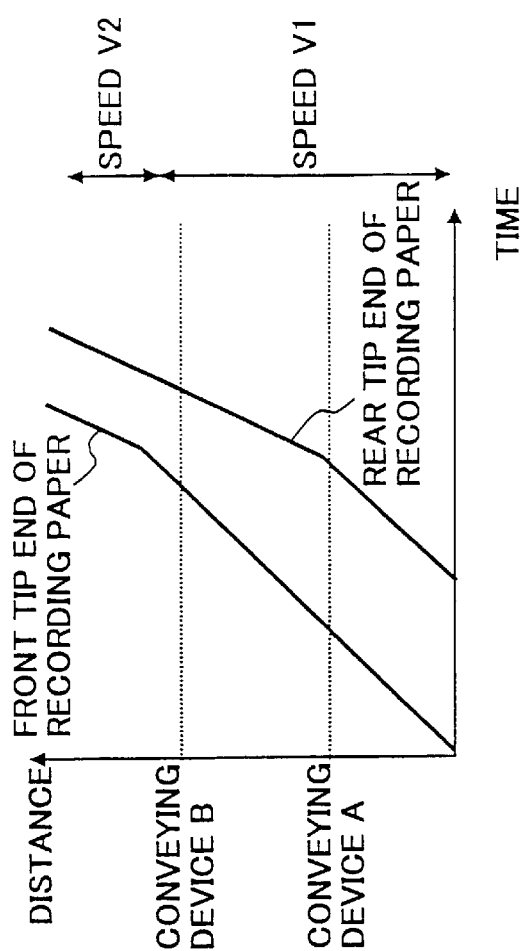

In both of FIG. 5 and FIG. 6, FIGS. 5A and 6A show the structure of the paper conveying devices, and FIGS. 5B and 6B show the property of the paper conveying devices.

In the structure as shown in FIG. 5, the recording paper is conveyed with the conveying speed $V_2$ at the time point when the leading tip end of the recording paper arrives at the conveying device B. On the other hand, in the structure as shown in FIG. 6, the recording paper is conveyed with the conveying speed $V_2$ at the time point when the rear tip end of the recording paper leaves the paper conveying device A. Moreover, in the structure as shown in FIG. 5, a one-way clutch can be used instead of the torque limiter. However, since the bending of the recording paper occurs when the conveying speed is reduced, the change of the paper conveying speed cannot be realized with such a simple structure. On such an occasion, it is necessary to change the conveying speed by use of the motor or to prepare a structure capable of tolerating the bending of the recording paper.

FIG. 7 is a conveying diagram illustrating the case of performing the paper re-feeding conveyance with the conveying speed $V_b$ in the image forming device in consideration of the conveying property by use of such the roller pairs. Only by adding the paper re-feeding device of simple structure, the paper turning-over section provided for the purpose of largely shortening the distance between the recording paper having the image on one-side thereof can be jointly commonly used as the paper turning-over section for performing the both-surfaces printing (copying). Therefore, in such a structure, the both-surfaces image formation can be performed. However, at the time of forming the image on the both surfaces of the recording paper, it takes a long time until the paper is re-fed, and the distance between the recording papers is largely widened. FIG. 7 is a conveying diagram of the embodiment corresponding to the structure of the first aspect according to the present invention.

In the embodiment as shown in FIG. 7, the small-sized image forming apparatus capable of forming the image on the both surfaces of the recording paper can be provided with low cost. However, the productivity is not so well at the time of forming the image on the both surfaces of the recording paper as mentioned before. In such a situation, if the productivity is intended to improve or raise at the time of forming the image on the both surfaces of the recording paper, the problem as mentioned below may occur. For instance, as shown in the conveying diagram of FIG. 8, when the rear tip end of the recording paper passes through the fixing roller and then the paper is conveyed by the conveying force of the fourth conveying device 22, the recording paper is conveyed with high paper conveying speed (speed $V_c$), and then the speed is slowed down to the other paper conveying speed (speed $V_a$) of the first paper conveying device 11 at the time point when the leading tip end of the recording paper arrives at the first paper conveying device 11.

As described before, if the paper conveying device 4 is provided with the torque limiter, the conveying speed can be simply increased. However, in the case of decreasing the paper conveying speed, it is necessary to change the paper conveying speed of the seventh paper conveying device 25, or to provide the structure in which the jamming phenomenon does not occur at all even though the bending of the recording paper occurs.

In such a structure as mentioned heretofore, the paper distance can be largely shortened at the time of practicing the image formation on the both surfaces of the recording paper. However, since the paper conveying speed of the image forming device is increased on some occasions in accordance with the image forming operation, it is impossible to avoid the enlargement of the distance between the recording papers corresponding to the image forming period. The paper conveying diagram shown in FIG. 8 corresponds to the second aspect of the present invention.

Figure 8:
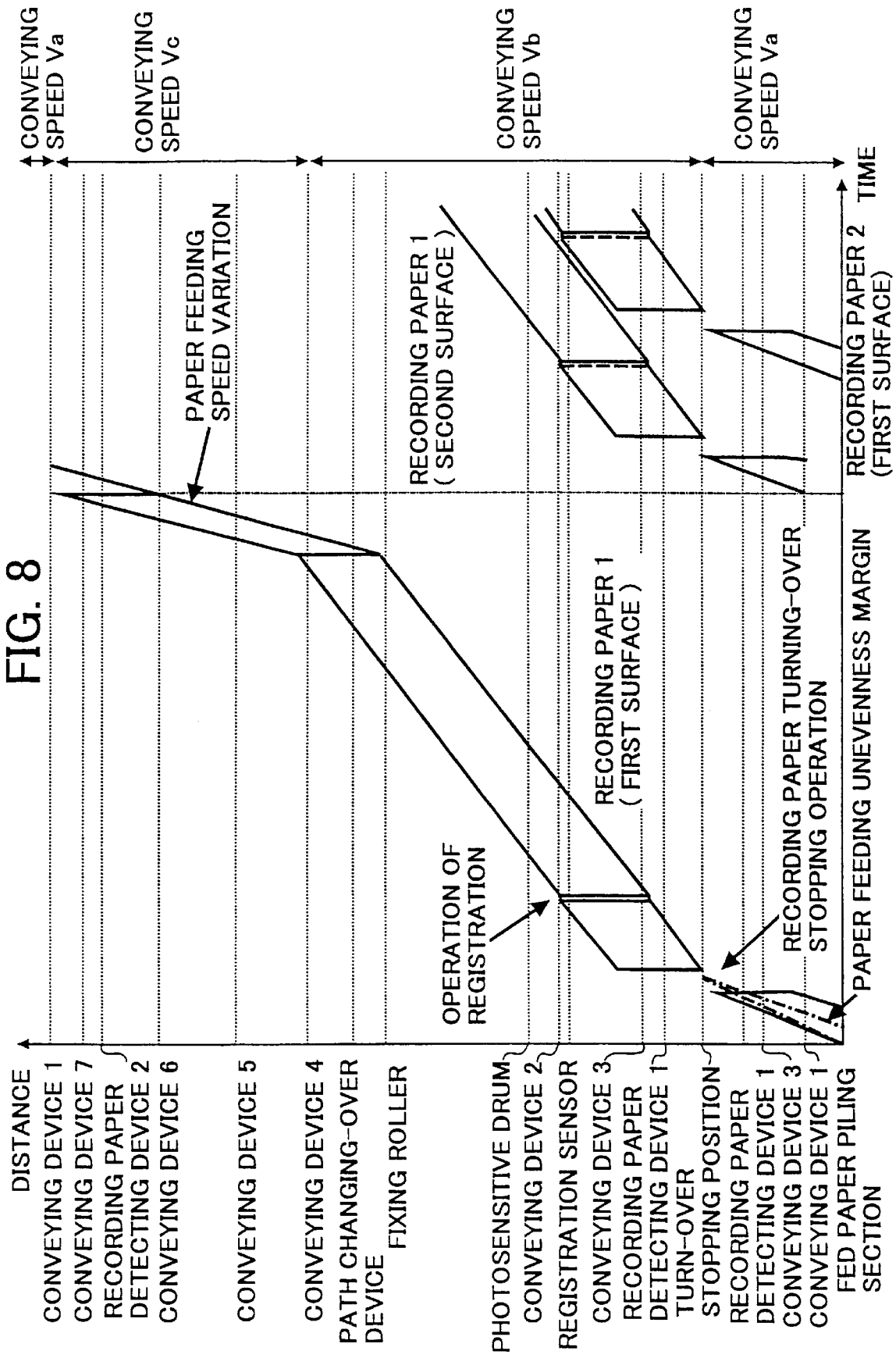
FIG. 8 is a conveying diagram illustrating the conveying process of performing the paper conveying operation with the high speed $V_c$ when the paper is conveyed with the conveying force of the fourth conveying device and reducing the conveying speed to the conveying speed $V_a$ of the first conveying device at the time point when the leading tip end of the recording paper arrives at the first conveying device.
Figure 9:
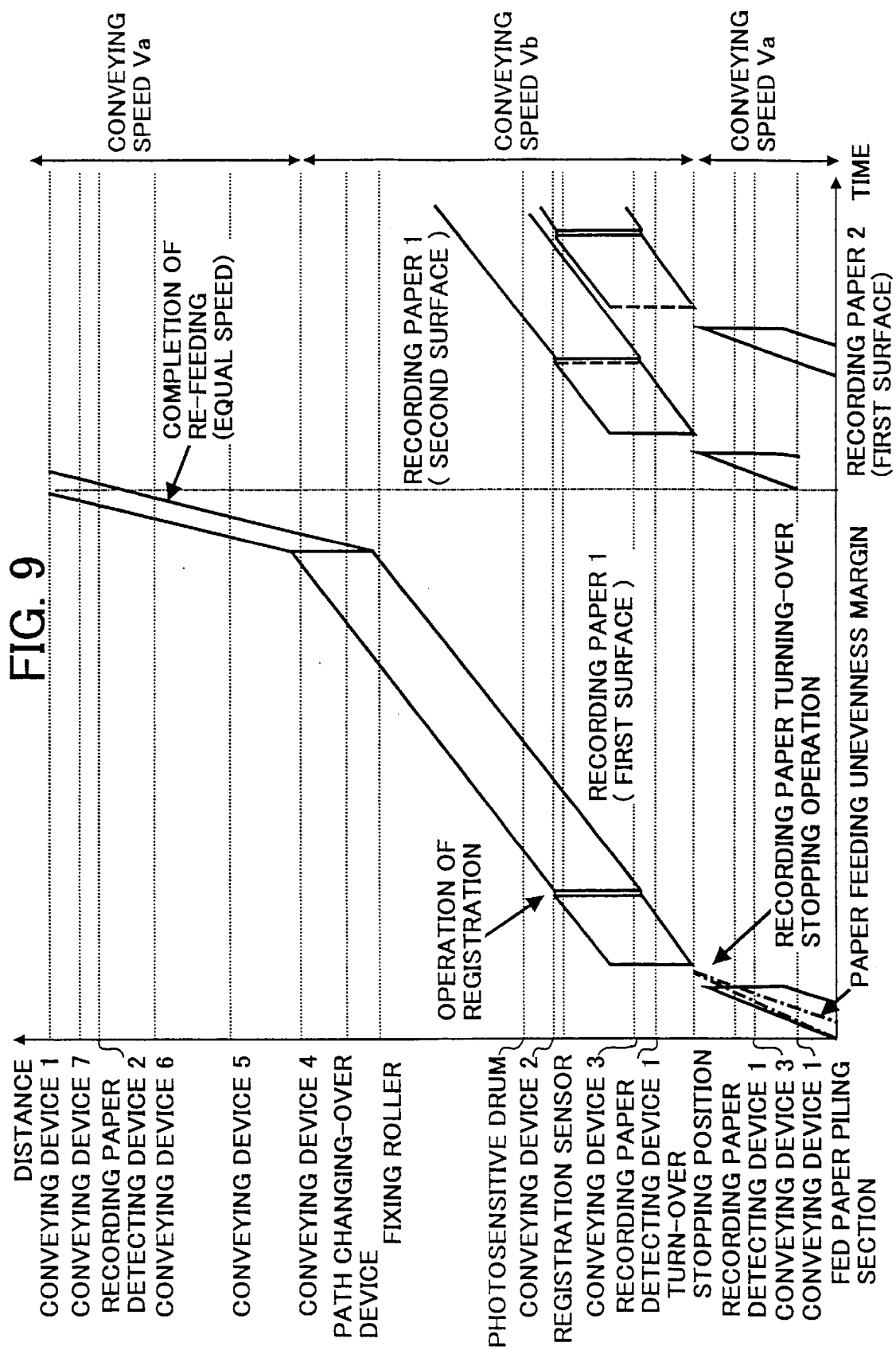
FIG. 9 is a conveying diagram illustrating the conveying process of making the conveying speed of the re-feeding device almost equal to the conveying speed $V_a$ in the conveying diagram of FIG. 8.

In contrast with the paper conveying diagram of FIG. 8, FIG. 9 illustrates the paper conveying operation at the time of almost equalizing the paper conveying speeds of the paper re-feeding devices; those are, the fourth through seventh paper conveying devices 22, 23, 24, and 25 to the paper conveying speed $V_a$ of the paper feeding device.

In such a way, when the paper conveying speed of the paper re-feeding device is almost equalized to the paper feeding speed $V_a$ of the paper feeding device 1, the distance between the both-surfaces recording papers can be further shortened, compared with the case of FIG. 7. In addition, it is not necessary to prepare the aforementioned structure employed at the time of decreasing the paper conveying speed even in the case of improving the productivity, and thereby the small-sized and low-cost apparatus can be realized. The paper conveying diagram shown in FIG. 9 corresponds to the third aspect of the present invention.

Figure 10:
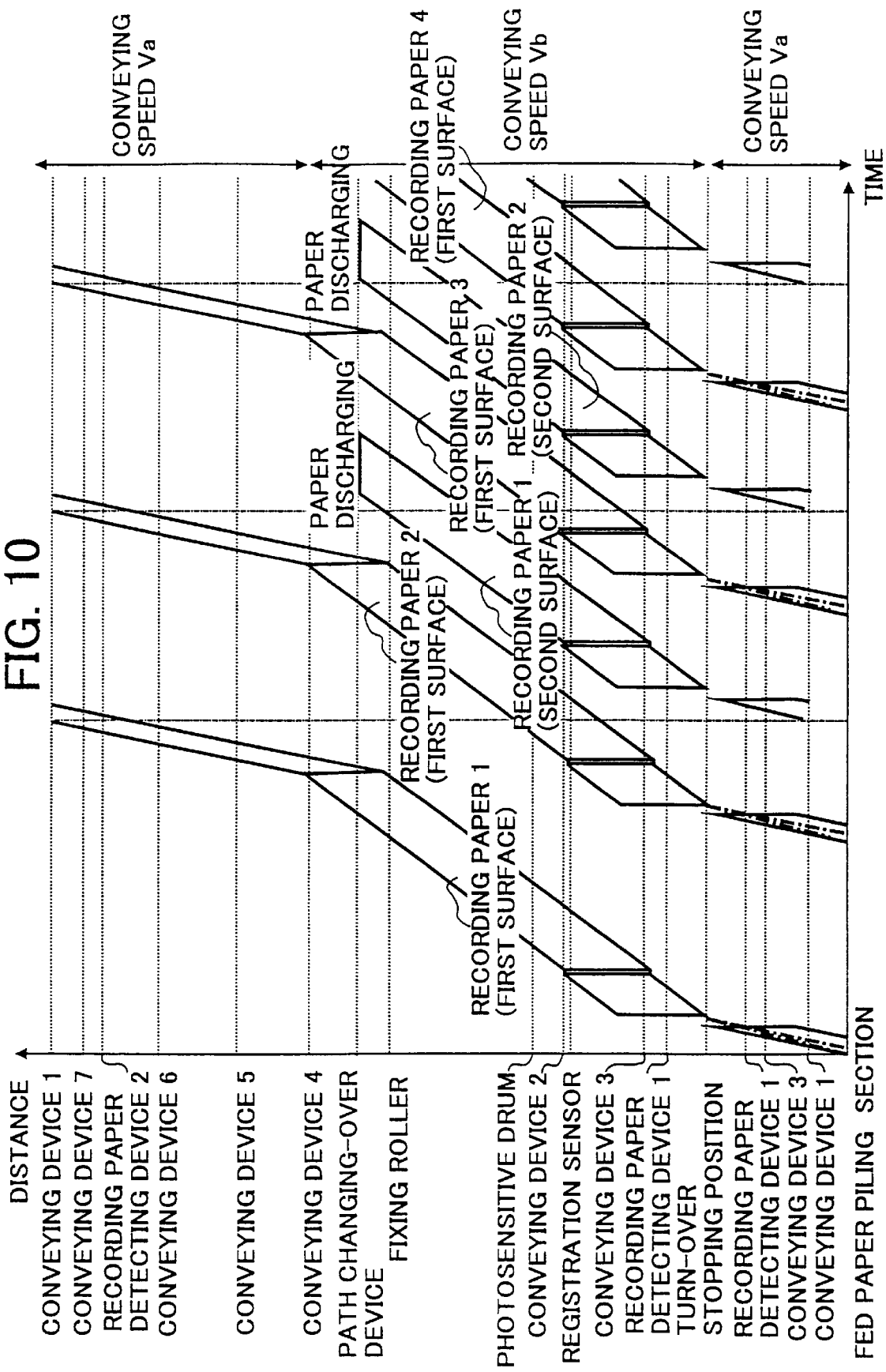
FIG. 10 is a conveying diagram illustrating the conveying process of making shorter the both-surfaces-image paper distance than that of FIG. 9 and enabling to realize the both-surfaces image formation of further high productivity.

FIG. 10 is a paper conveying diagram illustrating an example of further shortening the distance between the both-surfaces recording paper and enabling to perform the both-surfaces image formation of further high productivity. Namely, in the example, the control of the image formation is done such that, after performing the image formation on the first surface of the recording papers 1 and 2 (two sheets of paper) for the purpose of largely reducing the distance between the both-surfaces recording paper, the image formation on the second surface of the recording paper 1 and the image formation on the first surface of the recording paper 3 are performed. Thereafter, the image formations on the second surface and the first surface are alternately repeated. Consequently, the paper distance between the recording papers can be largely shortened at the time of performing the both-surfaces image forming operation in the case of large paper distance therebetween longer than the entire length of the recording paper, and thereby the improvement of the productivity can be realized. The paper conveying diagram shown in FIG. 10 corresponds to the fourth aspect of the present invention.

In the case of performing the image formation by conveying the recording paper on the basis of the paper conveying diagram in such a way, when the necessity of performing the long-term timing compensation occurs for some reasons of the image forming device during the time period of successively forming the both-surfaces image, at most two sheets of recording paper are situated on the paper re-feeding path at halfway of the paper re-feeding path. However, the operation of conveying the recording paper is successively continued until the paper arrives respectively at the stopping position after the registration operation and at the paper turning-over stop position, and thereafter the recording paper is stopped. Consequently, there occurs no troublesome matter such as paper jamming.

Figure 11:
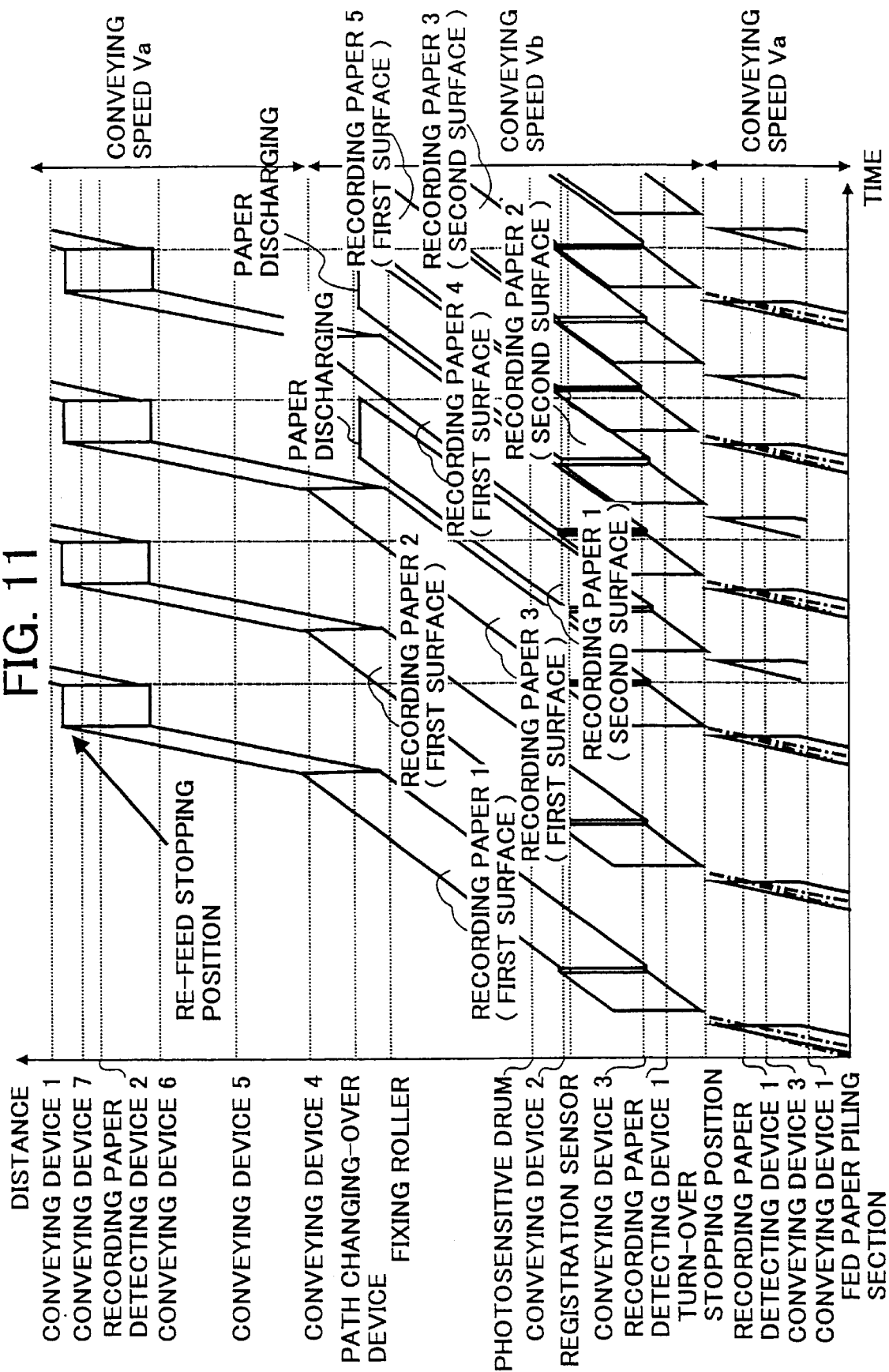
FIG. 11 is a conveying diagram illustrating the conveying process of enabling to perform the both-surfaces image formation of higher productivity than that in the conveying diagram shown in FIG. 10.

FIG. 11 illustrates a further improved example in consideration of the productivity compared with the paper conveying diagram as shown in FIG. 10.

In the processing on the basis of the paper conveying diagram of FIG. 11, after the second paper detecting device 26 detects the leading tip end of the re-fed recording paper, the fourth through seventh paper conveying devices 22 through 25 are controlled to stop. Furthermore, the paper conveying operation is practiced in accordance with the paper conveying diagram shown in FIG. 9. Namely, after successively practicing the image formation on the first surface of the recording paper by three pages, the feeding operations for the beginning paper (first paper—second surface), the fourth paper (first surface), the second paper (second surface), the fifth paper (first surface), the third paper (second surface), the sixth paper (first surface), and the fourth paper (second surface), are alternately changed over.

For this reason, regarding the image forming operations subsequent to the image forming operation on the first surface of the third recording paper, the both-surfaces image formation can be performed with very short paper distance almost the same as that in the case of the one-side-surface image forming operation. Consequently, the productivity of the both-surfaces image formation can be sufficiently improved. The paper conveying diagram shown in FIG. 11 corresponds to the fifth aspect of the present invention.

Furthermore, when the necessity of compensating the timing for a long time period as mentioned before occurs, at most three sheets of the recording paper are situated at the halfway of the paper conveying path. However, since the paper re-feeding stop position is provided in addition to the aforementioned stopping position, the troublesome matters such as the paper jamming, etc. do not occur.

Furthermore, although the example of successively performing the image formation on the first surface of the recording paper for three sheets of the recording paper is illustrated in FIG. 11, it may be also allowable to form the image on the three or more sheets of the recording paper in accordance with the length of the paper conveying path, the entire length of the recording paper, and the paper conveying speed, and further, to obtain the similar functional effect by preparing the number of the stopping positions corresponding thereto.

Furthermore, when the operation of the image formation on the first surface of the recording paper is performed for the first time, the number of the image formation operations, the paper conveying speed, the number of the stopping positions, etc. are respectively changed, corresponding to the change of the recording paper size. Consequently, the most preferable productivity can be realized with the aforementioned structure.

Here, since the image formation can be easily stopped at the paper distance in the line printer such as the ink-jet printer, there is no fear of the deterioration of the image forming device. However, in the image forming apparatus of the electrophotographic type, for instance, the page printer such as the laser beam printer, the image forming device represented by the photosensitive body cannot be temporarily stopped at the distance between the recording papers. Therefore, the image forming device turns out to be rotated idly. As a result, although the image is not written, the operation is successively performed instead of being stopped. After all, the deterioration of the life span proceeds similarly to the case of forming the image. Namely, the accumulation of the total operating time exerts an influence on the life span on the image forming device as it is, regardless of whether an image is being formed or not.

At present, although the high-speed printer technology is mainly constructed with the image forming device of the digital electrophotographic type, for instance, in the image forming apparatus provided with the digital writing device such as a laser beam printer, the factor represented by the aforementioned polygon motor rotation number is the upper limit of the image forming speed, and thereby it is difficult to improve the recording paper conveying speed.

However, in the present embodiment, the paper distance at the time of forming an image not only on the one surface of the recording paper but on the both surfaces thereof can be largely shortened. Furthermore, the time period of the idle rotation at the paper distance can be largely shortened. Consequently, the deterioration of the life span at the time of forming the image on both surfaces of the recording paper can be also further largely reduced.

Furthermore, the speed of forming the image on the both surfaces of the recording paper can be improved with the same paper conveying speed kept constant by largely shortening the idle rotation time period at the paper distance at the time of the both-surfaces image formation. Moreover, to begin with, in the small-sized image forming apparatus provided with the turned-over paper feeding path, it is possible to realize the aforementioned long life span and the improvement of the paper conveying speed. Consequently, the both-surfaces image forming apparatus of low cost and superior productivity can be provided.

As is apparent from the foregoing description, according to the first aspect of the present invention, the image forming apparatus includes the paper re-feeding device for re-feeding the recording paper having the image formed on one-side surface thereof by the image forming device to the paper re-feeding device, and the recording paper is turned over from the paper re-feeding device to the image forming device and fed again to the image forming device. In such an image forming apparatus, the paper turning-over device is commonly used with the paper turning-over device for use in the both-surfaces image formation. Consequently, keeping the small size and the low cost, the both-surfaces image formation can be practiced at the short paper distance as in the case of the one-surface image formation.

According to the second aspect of the present invention, since the paper conveying speed of the paper re-feeding device is higher than that of the image forming section, the image formation can be performed at the very short paper distance even at the time of forming the image on the both surfaces of the recording paper.

According to the third aspect of the present invention, since the paper conveying speed of the paper re-feeding device is almost equal to the conveying speed of the paper feeding section and it is not necessary to control so as to change the conveying speed of the paper re-feeding device, keeping the small size and the low cost, the both-surfaces image forming apparatus can be provided.

According to the fourth aspect of the present invention, after practicing the image formation on plural pages of the one surface of the recording paper, and the recording paper re-fed from the paper re-feeding section and the recording paper fed from the paper feeding section are set so as to alternately advance. Consequently, it is not necessary to provide the intermediate tray for piling and storing the recording paper in the paper re-feeding device. Furthermore, keeping the small size and the low cost, the image formation can be performed with very short paper distance.

According to the fifth aspect of the present invention, the paper re-feed stopping position is provided in order to temporarily stop to re-feed the recording paper to the paper re-feeding device, and the timing is controlled so as to cause the recording paper to advance to the paper turning-over device from the paper re-feeding path. Consequently, the image formation can be performed at the very short paper distance even at the time of the both-surfaces image formation.

According to the sixth and seventh aspects of the present invention, the wearing of the image forming device at the time of the successive both-surfaces image formation occurring at the paper distance can be largely improved, for the image forming device of the electrophotographic type in which the frictional deterioration of the image forming device occurs to the same extent as that at the time of forming the image even in the case of the paper distance of high rate for the entire length of the recording paper in the sixth aspect. In addition, the both-surfaces image forming device provided with the high-speed/high-productivity properties can be provided by effectively combining the technologies of the present invention without accompanying any large-scaled cost-up of the writing device.

Second Embodiment

Figure 20:
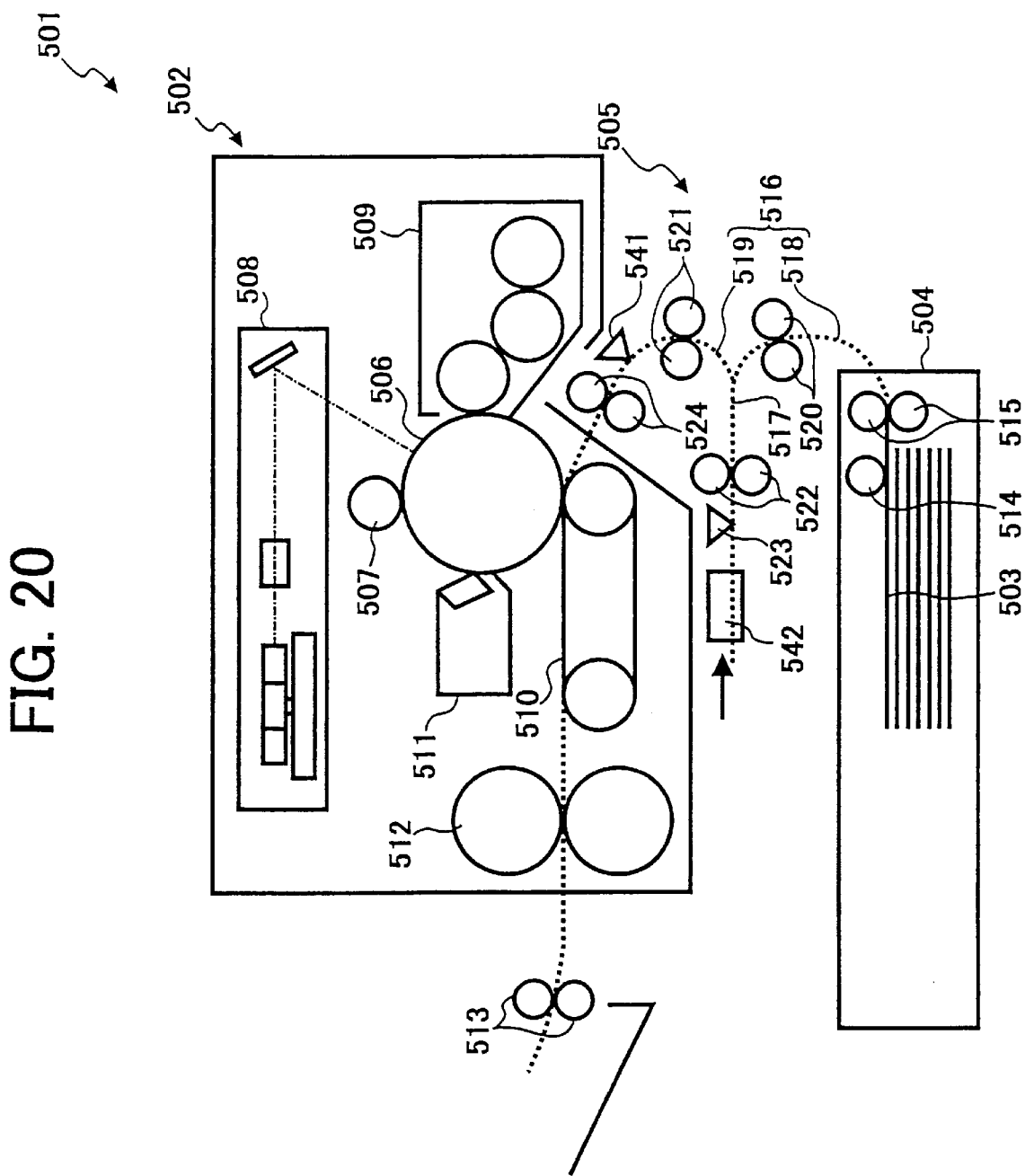
FIG. 20 is an outlined structural diagram illustrating the image forming apparatus of the second embodiment according to the present invention.

The second embodiment of the present invention is described hereinafter. FIG. 20 is a general concept view illustrating the outlined structure of the image forming apparatus as the second embodiment of the invention. As shown in FIG. 20, the image forming apparatus includes a printer engine for performing the image formation with the electrophotographic method, a recording paper cassette 504 serving as the paper piling and accommodating section for piling and accommodating therein the recording paper 503 to be supplied to the printer engine 502, and a paper feeding device 505 for separating the piled recording paper 503 sheet by sheet and conveying the paper to the printer engine 502.

The printer engine 502 is provided with a photosensitive body 506, a charger 507 for charging the photosensitive body 506, a digital optically-writing device 508 for optically writing the electrostatic latent image on the photosensitive body 506, a developing unit 509 for developing with the toner the electrostatic latent image on the photosensitive body 506, a transfer unit 510 for transferring the toner image after developing onto the recording paper 503, and a cleaning device 511 for removing the residual toner remaining on the photosensitive body 506. In such a structure, the printer engine 502 performs the image formation on the recording paper 503 with the digital electrophotographic process. The fixing unit 512 fixes the transferred toner image on the recording paper 503. The recording paper 503 thus fixed is discharged outside of the printer engine 502 by use of the paper discharging roller 513.

The paper feeding device 505 is provided with a paper feeding roller 514 for taking out the recording paper 503 piled in the recording paper cassette 504, a separation roller 515 for separating the taken-out recording paper 503 sheet by sheet, and a conveying path 516 for conveying the taken-out recording paper 503 to the printer engine 502. From the middle position of the conveying path 516, the innermost portion thereof becomes a dead-end path. A switch-back path 517 serving as a temporary paper accommodating section for temporarily accommodating therein the recording paper 503 branches out from the middle position of the conveying path 516. The conveying path 516 is divided into two conveying paths 518 and 519 by the switch-back path 517. The conveying path 518 is the one for connecting the recording paper cassette 504 and the inlet/outlet of the switch-back path 517, and a conveying roller 520 driven by a motor 526 (shown in FIG. 22) for conveying the recording paper 503 is provided in the conveying path 518. The conveying path 519 is the one for connecting the inlet/outlet of the switch-back path 517 and the printer engine 502, and a conveying roller 521 driven by a motor 528 (shown in FIG. 22) for conveying the recording paper 503 is provided in the conveying path 519.

A conveying roller 522 serving as the recording turning-over device is a roller pair driven by a motor 530 (shown in FIG. 22) and is capable of rotating in normal and reverse directions. The roller 522 is provided in the switch-back path 517. The conveying roller 522 functions as the recording paper turning-over device which rotates in the normal and reverse directions in the state of nipping the recording paper 503, accommodates the recording paper 503 conveyed from the recording paper cassette 504 through the conveying path 518 in the switch-back path 517 from the front tip end thereof, switches back the recording paper 503 accommodated in the switch-back path 517 such that the rear tip end of the recording paper 503 becomes the front tip end, and sends out the recording paper 503 to the conveying path 519 toward the printer engine 502. A paper detecting sensor 523 for detecting the recording paper is provided in the switch-back path 517.

The advancement of the recording paper 503 to the switch-back path 517 is performed by the actions of the rotating separation roller 515 and the rotating conveying roller 520. A microcomputer 525 (shown in FIG. 22) calculates the timing of the advancement completion of the recording paper 503 to the switch-back path 517, from the detection timing at the tip end of the recording paper 503 detected by the recording paper detecting sensor 523, and thereby the advancement operation is completed. The switch-back path 517 has a sufficient length capable of accommodating the entire length of the recording paper 503. The path is linear.

The recording paper is sent out from the switch-back path 517 by the actions of the rotating conveying rollers 521 and 522. Thereafter, at the time of the registration operation by the registration roller 524 provided in the vicinity of the printer engine 502 in the conveying path 519, the conveying roller 521 performs the co-operation for the registration operation such as the temporary stop of conveying the recording paper 503, and thereafter, the microcomputer 525 (shown in FIG. 22) calculates the timing of the completion of sending out the recording paper 503, from the detection timing of the recording paper detecting sensor 523, and thereby the sending-out operation is completed.

A registration sensor 541 detects the recording paper 503 on the position in front of the registration roller 524 at the downstream side of the conveying roller 521 in the conveying path 519 and takes the timing of the registration operation performed by the registration roller 524.

The front tip end of the recording paper 503 is always guided to the side of the printer engine 502 on the branch-off portion of the conveying path 516. For instance, it may be preferable to guide upward the front tip end of the recording paper 503 by use of a resilient guide member or otherwise to forcibly guide that of the recording paper by changing over the guiding path from the conveying path 518 to the other conveying path 519 by use of the gate provided with the drive device such as a solenoid.

As illustrated in FIG. 21A, the conveying roller pair 522 is energized by a spring 534 so as to bring one of the rollers supported on a fulcrum 535 into pressing contact with the other roller. As occasion demands, as shown in FIG. 21B, the roller energized by the spring 534 can be pulled by the solenoid 532, and thereby the two rollers can be released.

Figure 22:
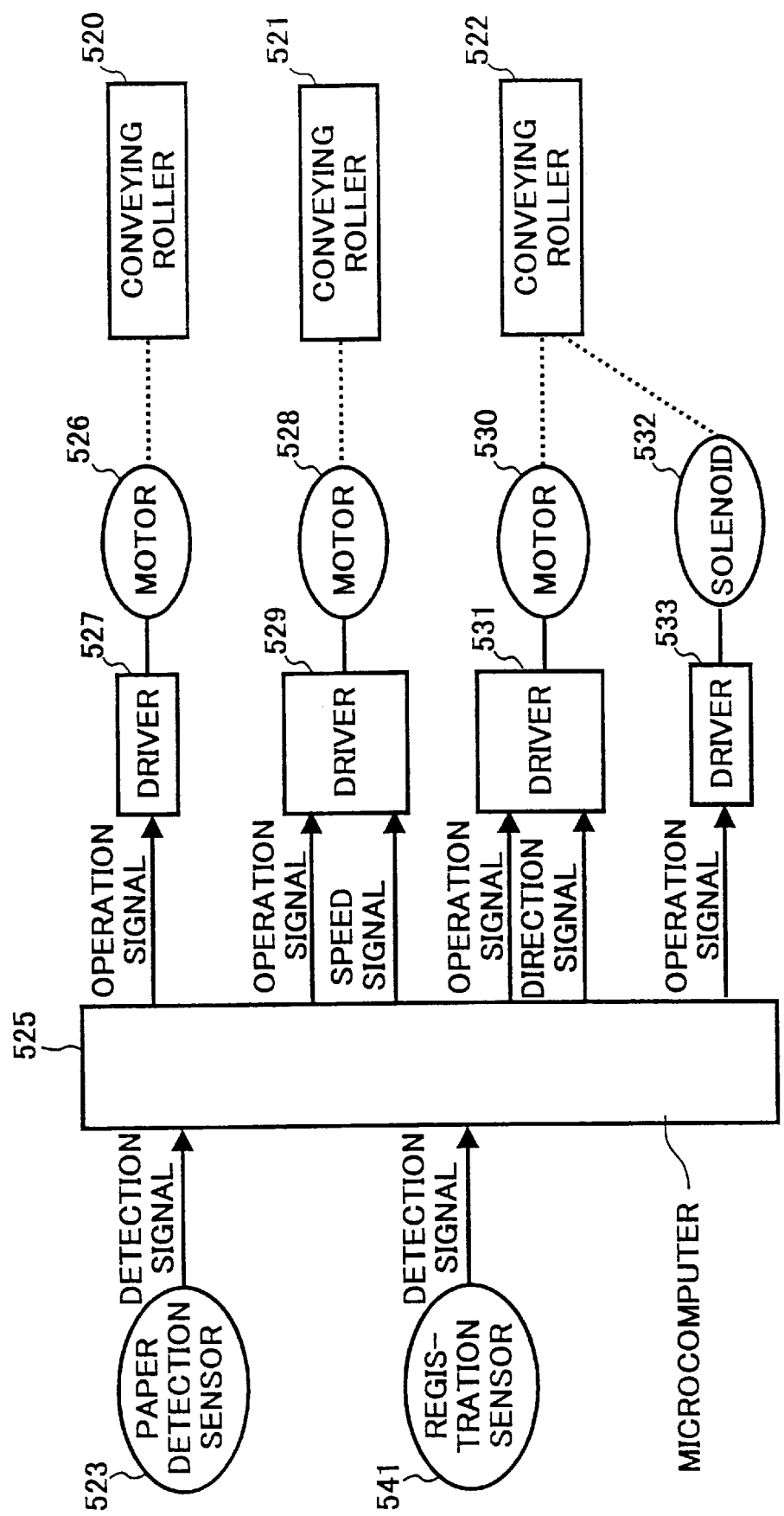
FIG. 22 is a block diagram illustrating the electrical connection of the image forming apparatus.

FIG. 22 is a block diagram illustrating the electrical connection of a control system in the image forming apparatus 501. In the control system, a motor driver 527 for driving the motor 526 rotating the conveying roller 520, a motor driver 529 for driving the motor 528 rotating the conveying roller 522, a motor driver 531 for driving the motor 530 rotating the conveying roller 522, a solenoid driver 533 bringing the pair of conveying rollers into pressing contact with each other and driving the released solenoid 532, and the recording paper detecting sensor 523 are respectively connected to the microcomputer 525 for concentratedly controlling the entire portion of the paper feeding apparatus 505. In such a structure, the conveying roller 520 in the conveying path 518 and the other conveying roller 521 in the conveying path 519 are driven independently by the different separated motors 526 and 528, and thereby the timings of conveying and stopping the recording paper 503 are independently set by the conveying paths 518 and 519.

According to the background art, the switch-back path 517 is not provided, and the rear tip end of the recording paper waiting by the action of the registration operation is stopped in the state of nipping the rear tip end by use of the conveying rollers 520 and 521 and the separating roller 515. Therefore, the in-advance adjustment of the unevenness of the front tip end position of the recording paper 503 by starting the separation and the paper feeding of the next recording paper 503. Furthermore, it is necessary to design the possible paper feed starting in the start of nipping, the recording paper by use of the conveying rollers 520 and 521 and the separation roller 515. The conveying load variation of the registration roller 524 occurs on some occasions when the recording paper 503 is stopped or the paper feeding is started. For this reason, it is necessary to design the sufficiently strong driving force of the registration roller 524 or to enhance the force of nipping the recording paper 503, so as not to cause the variation of the conveying speed. Furthermore, there arises a serious problem to be solved that such load variation causes the image defect of the lateral line referred to as shock jitter or density variation before and after the conveying speed variation occurrence.

In the image forming apparatus 501, the switch-back path 517 is utilized as the position for temporarily storing the recording paper 503, and thereby, since the rear tip end of the recording paper 503 waiting for the start of the image forming operation does not stay on the conveying roller 520 or the separation roller 515 owing to the registration operation, it may be possible to perform the operations of starting the paper feeding for the next recording paper 503, the compensation of unevenness, etc. Consequently, the distance between the recording papers 503, 503 is shortened, and thereby the productivity of the image formation can be improved, without transiently increasing the speed of conveying the recording paper 503 as in the background art.

Furthermore, since the occurrence of the separation load on the separation roller 515 can be avoided, the speed of conveying the recording paper 503 having the image formed thereon can be stabilized and the image deterioration accompanying the conveying speed variation can be avoided.

Moreover, since the conveying force of the registration roller 524 is not required to increase unnecessarily, it may be possible to prevent the lowering of the apparatus life span due to the wearing of the registration roller 524.

On the other hand, it is desired to shorten the time until the completion of the image formation by conveying the recording paper 503 from the separation roller 515 to the printer engine 502 as soon as possible. However, if the rear tip end of the recording paper 503 is nipped on the separation roller 515, all of the conveying paths have to be speed-controlled in order to speed up the conveying speed to the speed equal to or higher than that of the paper conveying at the time of performing the image formation with the printer engine 502.

Generally, a DC servo motor or a stepping motor which is of low cost and superior in rotation accuracy is put to practical use as the drive source for driving the image forming apparatus of the electrophotographic type. However, the DC servo motor unpreferably causes the unevenness in the recording paper moving amount at the time of controlling the changed speed, and if the stepping motor is used, the motor cannot be fitted to the conveying load variation on some occasions. At this time, the motor is put out of order and thereby the operation of conveying the recording paper is stopped. Those are the problems to be solved.

Figure 23:
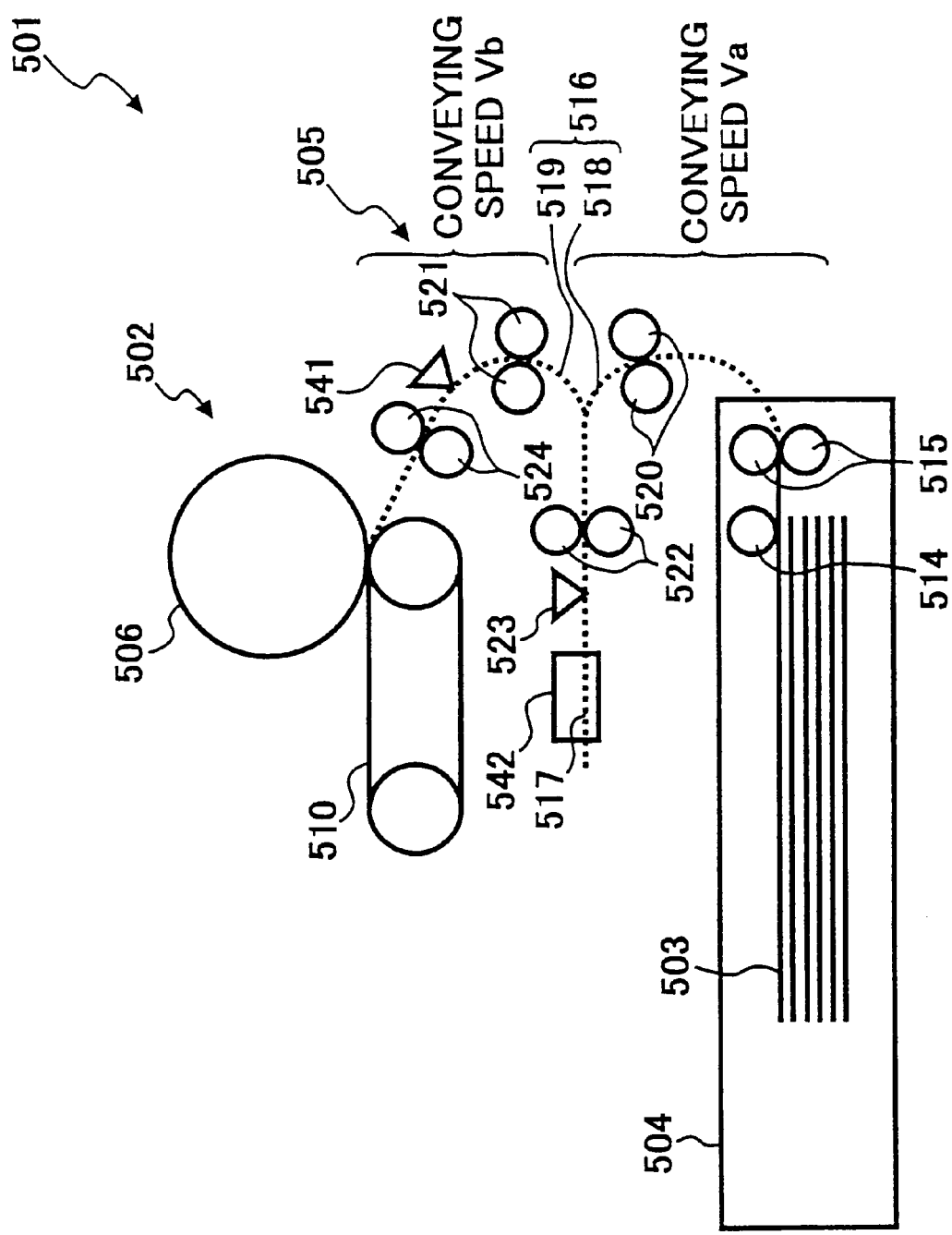
FIG. 23 is an explanatory diagram illustrating the paper conveyance of the image forming apparatus.

In the present embodiment, only the conveying roller 522 is constructed so as to enable to perform the controlling operation of the normal and reverse variable speeds. As shown in FIG. 23, the separation roller 515 and the conveying roller 520 are always controlled so as to rotate with the conveying speed $V_a$ and stop, while the registration roller 524 and the conveying roller 521 are always controlled so as to rotate with the conveying speed $V_b$ and stop. Here, $V_a$ is not equal to $V_b$. Consequently, those changed speed controls may become unnecessary, and the paper feeding speed can be made larger than the recording paper conveying speed at the time of forming the image with the printer engine. Only the conveying roller 522 requires the control of the changed speed. However, since the conveying roller 521 performs the assistant drive when the recording paper advances into the switch-back path 517 and there exists almost no load at the time of sending out the paper from the switch-back path 517, the risk of putting out of order can be avoided even though the stepping motor is put to practical use. In such a way, the speed of conveying the recording paper 503 can be stably converted, in the embodiment of the present invention.

Figure 24:
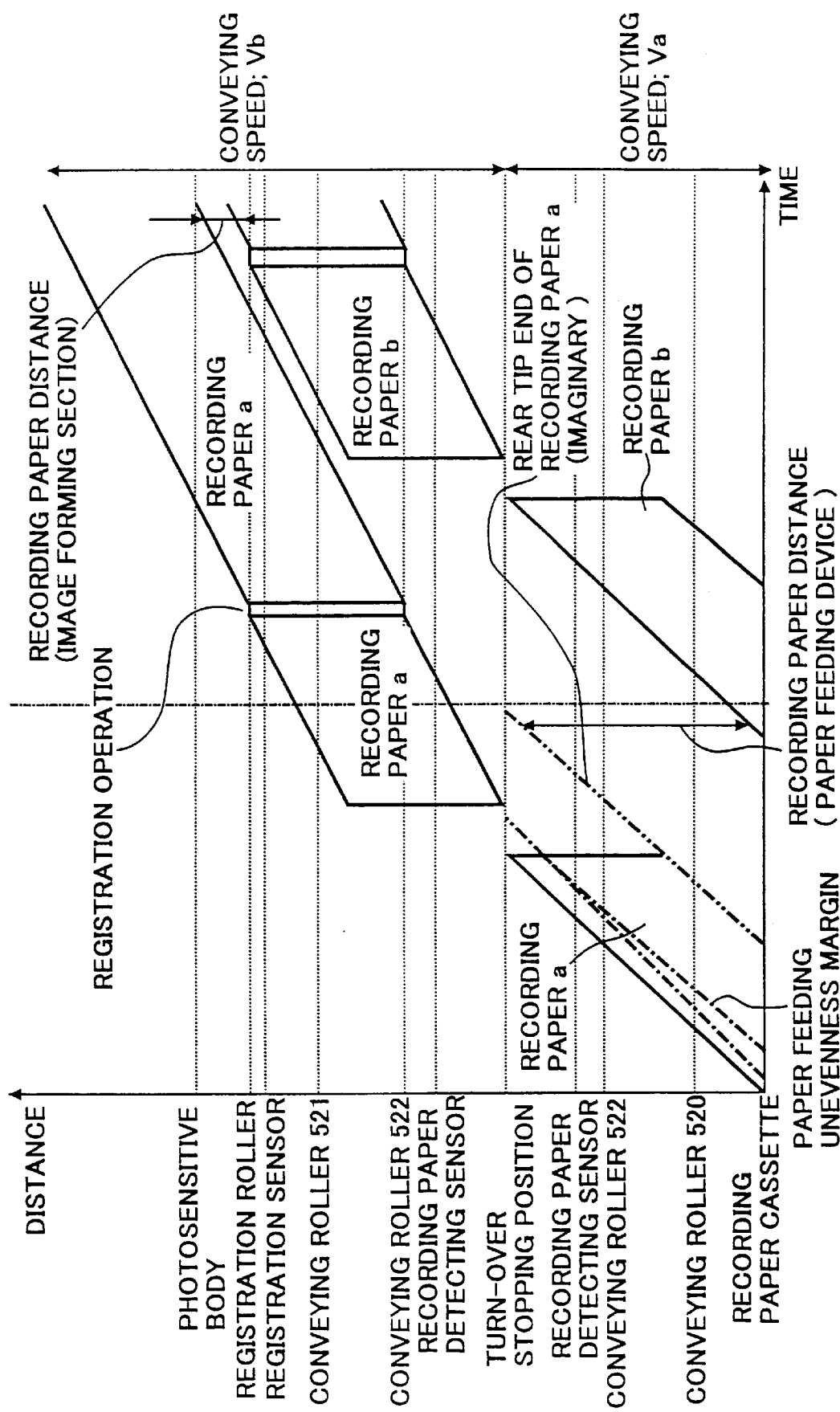
FIG. 24 is a diagram illustrating the paper conveyance of the image forming apparatus.

FIG. 23 illustrates the state of conveying the recording paper 503. FIG. 24 is a diagram for illustrating the conveyance of the recording paper. Since the front tip end of the advancing direction of the recording paper 503 is described as the tip end of the recording paper 503, in the above diagram, the movement of the front tip end position by the entire length of the recording paper 503 is apparently expressed, accompanying the advancing direction conversion of the recording paper 503, before and after the switch-back of the recording paper 503 in the switch-back path 517.

Furthermore, since there exists a commonly-used distance by the length of the switch-back path 517, before and after the stopping position (hereinafter referred to as the "turning-over stopping position") of the recording paper 503 in the switch-back path 517, the two-times appearance of the same recording paper detecting sensor 523 and conveying roller 522 is expressed. Although the elimination of the paper feeding unevenness is performed by the registration operation in the background art, the elimination of the paper feeding unevenness is performed during the time period when the recording paper 503 stops on the turning-over stopping position, in the embodiment of the present invention. Since the conveyance unevenness may become small on the position subsequent to the turning-over stopping position, the registration operating time can be completed in a very short time.

Regarding the recording paper a, the recording paper b, and the recording paper c, the head paper, the second-head paper, and the third-head paper, all shown in FIG. 24 are referred to as the first, second, and third recording papers a, b, and c among the recording papers 503 successively conveyed to the printer engine 502 by the paper feeding apparatus 505. Assuming that the recording paper is conveyed, as it is, without switching-back the distance between the apparatus of the recording papers 503, 503 may become very wide. In the embodiment of the present invention, the distance between the recording papers 503, 503 in the printer engine 502 at the time of successively conveying the recording paper can be made very narrow inevitably. Consequently, the productivity of the image formation can be further improved.

In the example shown in FIG. 24, the distance between the recording papers 503 is set to a somewhat wide distance so as not to convey the recording papers a and b at the same time. In the case of performing such paper conveyance, it is not necessary to take into consideration the passing to each other when the conveying roller 522 and the recording paper detecting sensor 523 are arranged in the switch-back path 517. Consequently, it is not necessary to prepare a device for sheltering the conveying roller 522, and the manufacturing cost can be reduced with a simple structure.

Furthermore, the first, second, and third embodiments of the present invention are provided with a processing device for performing the specified operation or processing for the recording paper 503 in the switch-back path 517 or the outlet/inlet portion thereof. In the second embodiment, a jogger 542 serving as the lateral registration is provided in the switch-back path 517 as the processing device.

Figure 25:
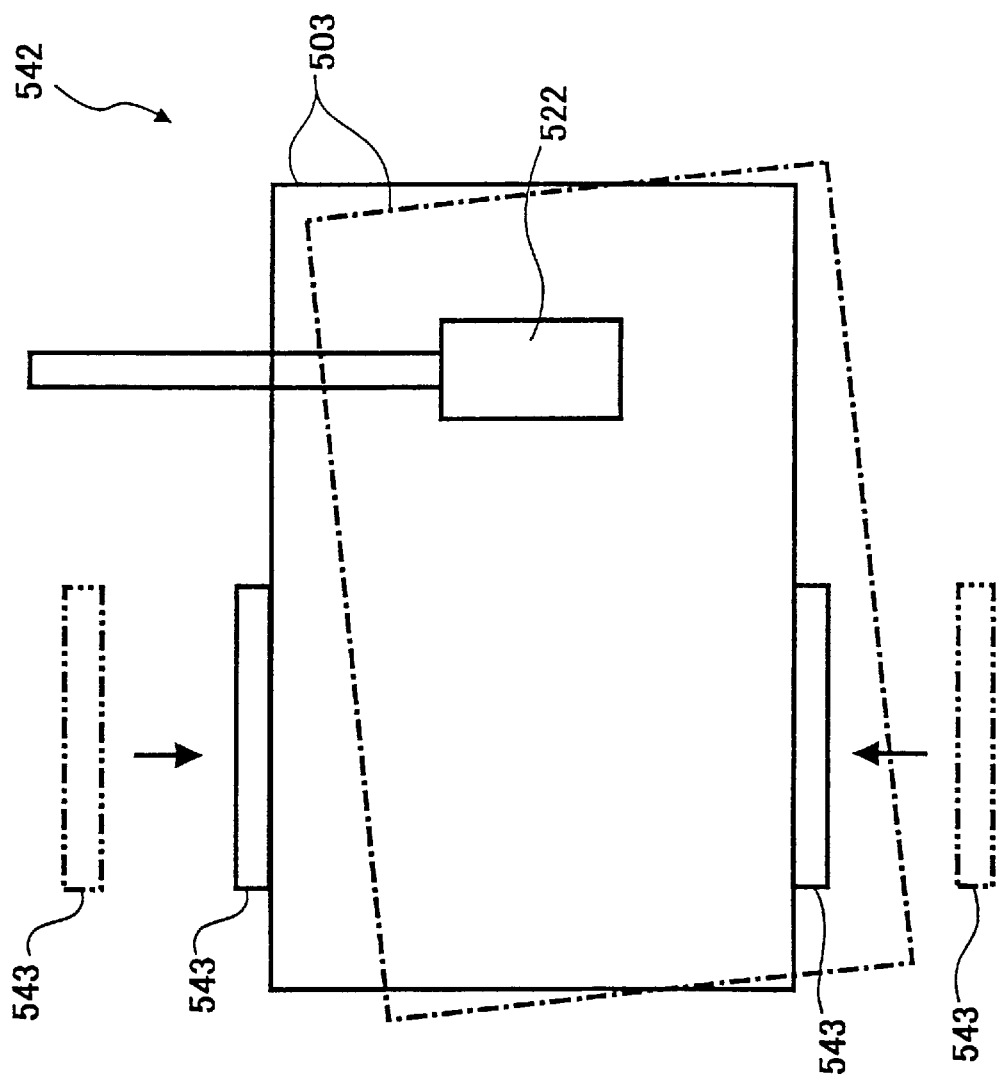
FIG. 25 is a plan view illustrating the structure example of a jogger in the image forming apparatus.

FIG. 25 is a plan view illustrating a structural example of the jogger 542. The jogger 542 shown in FIG. 25 comes close to an actuator (not shown) in the width direction of the recording paper 503 in the switch-back path 517 by the action of the actuator and the jogger 542 is provided with two jogger fences 543, 543 for performing the separating operation. Namely, after the recording paper 503 is accommodated in the switch-back path 517, the conveying roller 522 is opened by the solenoid 532 and the recording paper 503 in the switch-back path 517 is released. In such a state, the two jogger fences 543, 543 come close to each other in the width direction of the recording paper 503, and thereby the attitude of the recording paper 503 is straightened. Namely, in such a structure, it is possible to compensate the relative position between the side end of the recording paper 503 and the formed image, that is, the lateral registration, and the inclination of the recording paper 503, that is, the skew.

Figure 26:
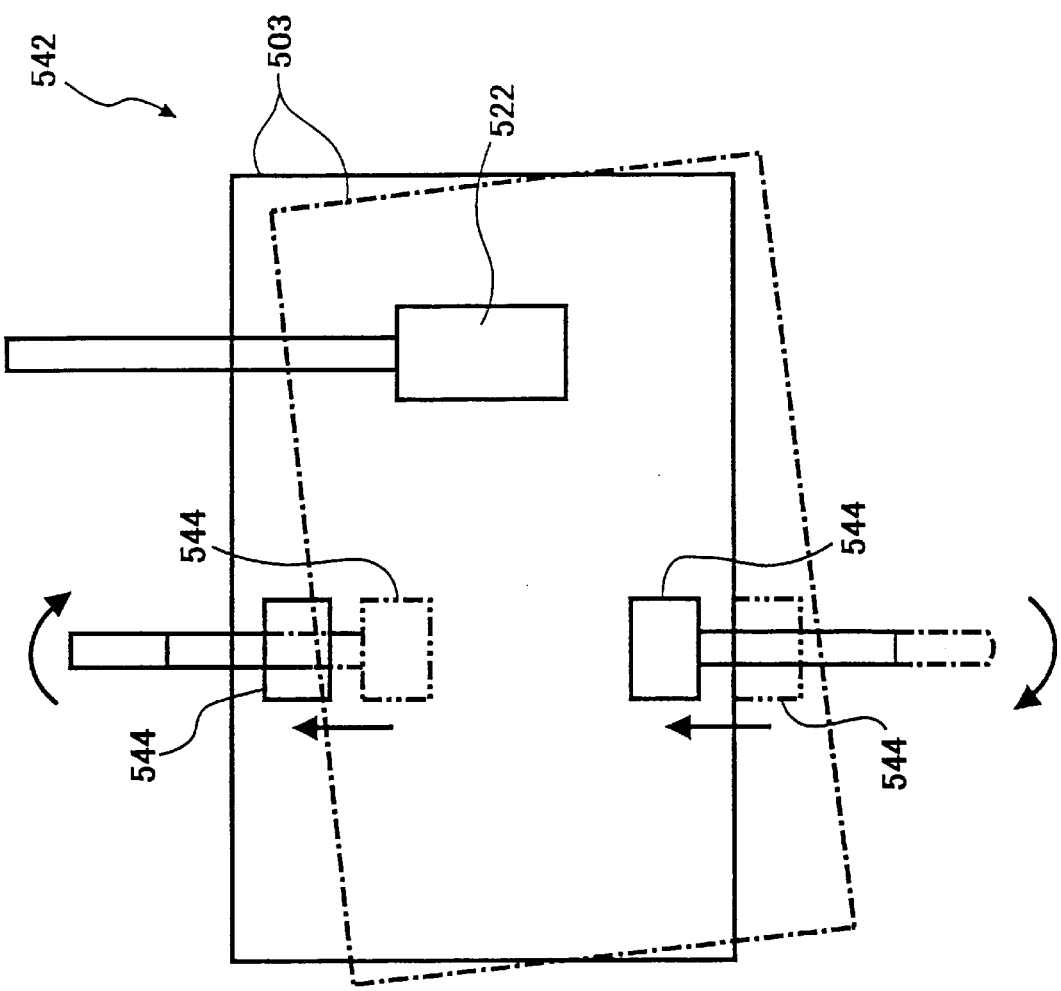
FIG. 26 is a plan view illustrating the other structure example of a jogger in the image forming apparatus.

Furthermore, such compensation of the attitude can be preferably done by the jogger 542. Namely, as shown in FIG. 26, the jogger 542 is provided with two jogger rollers 544, 544 both driven by the actuator (not shown). Those jogger rollers 544, 544 are provided so as to be disposed at both sides of the recording paper 503 in the switch-back path 17 taking the direction of the axial core as the width direction of the recording paper. Both of the jogger rollers 544, 544 can respectively rotate in the opposite directions to each other in the pressing state of being brought into contact with the recording paper 503. Those jogger rollers 544, 544 can slidably move in the axial core direction. After accommodating the recording paper 503 in the switch-back path 517, the conveying roller 522 is opened by the action of the solenoid 543 and the recording paper 503 in the switch-back path 517 is released. In such a state, when the jogger rollers 544, 544 are slidably moved in the axial core direction, the lateral registration of the recording paper 503 can be compensated. When the jogger rollers 544, 544 rotate in the opposite directions to each other, the skew compensation can be executed for the recording paper 503.

In the background art, in order to compensate the lateral registration of the recording paper 503, the registration roller 524 is provided in the axial core direction on the condition of nipping the recording paper 503 with the registration roller 524. Regarding such a structure in which the registration roller 524 itself is slidably moved in the axial core direction nipping the recording paper 503 with the registration roller 524, there arises an unavoidable troublesome matter that the apparatus becomes large-scaled and complicated.

Here, in the second embodiment of the invention, noticing that the positional compensation movement can be freely done over the entire length of the recording paper 503 in the switch-back path 517, the nipping of the conveying roller 522 is released and thereafter the jogger 542 performs the operation of compensating the attitude of the recording paper 503 in the switch-back path 517. Consequently, the compensation of the lateral registration can be performed with a simple device.

The distance between the conveying path 519 and the switch-back path 517 from the front tip end portion of the jogger 542 to the impinging position of the recording paper 503 onto the registration roller 524 is set to a distance shorter than the length of the recording paper 503.

Thereby, after the registration roller 524 starts to nip the recording paper 503, the jogger 542 can part the recording paper 503 therefrom, and, keeping the state of precisely compensating the lateral registration, the recording paper 503 can be fed to the printer engine.

Furthermore, in the embodiment as shown in FIGS. 25 and 26, although the device for detecting the necessary compensation amount of the lateral registration is not particular, it may be possible to construct the apparatus such that the necessary compensation amount of the lateral registration is detected by use of the optical sensor, etc., and the jogger is driven in accordance with the detection signal. Moreover, it may be allowable to construct the apparatus such that the lateral registration compensation of the necessary amount can be performed, utilizing the mechanical impingement of the tip end of the recording paper 503 thereon.

Third Embodiment

Another embodiment of the present invention is described hereinafter as the third embodiment.

The embodiment described hereinafter is focused on the different points between the second and third embodiments of the invention. The same reference numerals are respectively attached to the common members, and the detailed explanations thereof are omitted here.

Figure 27:
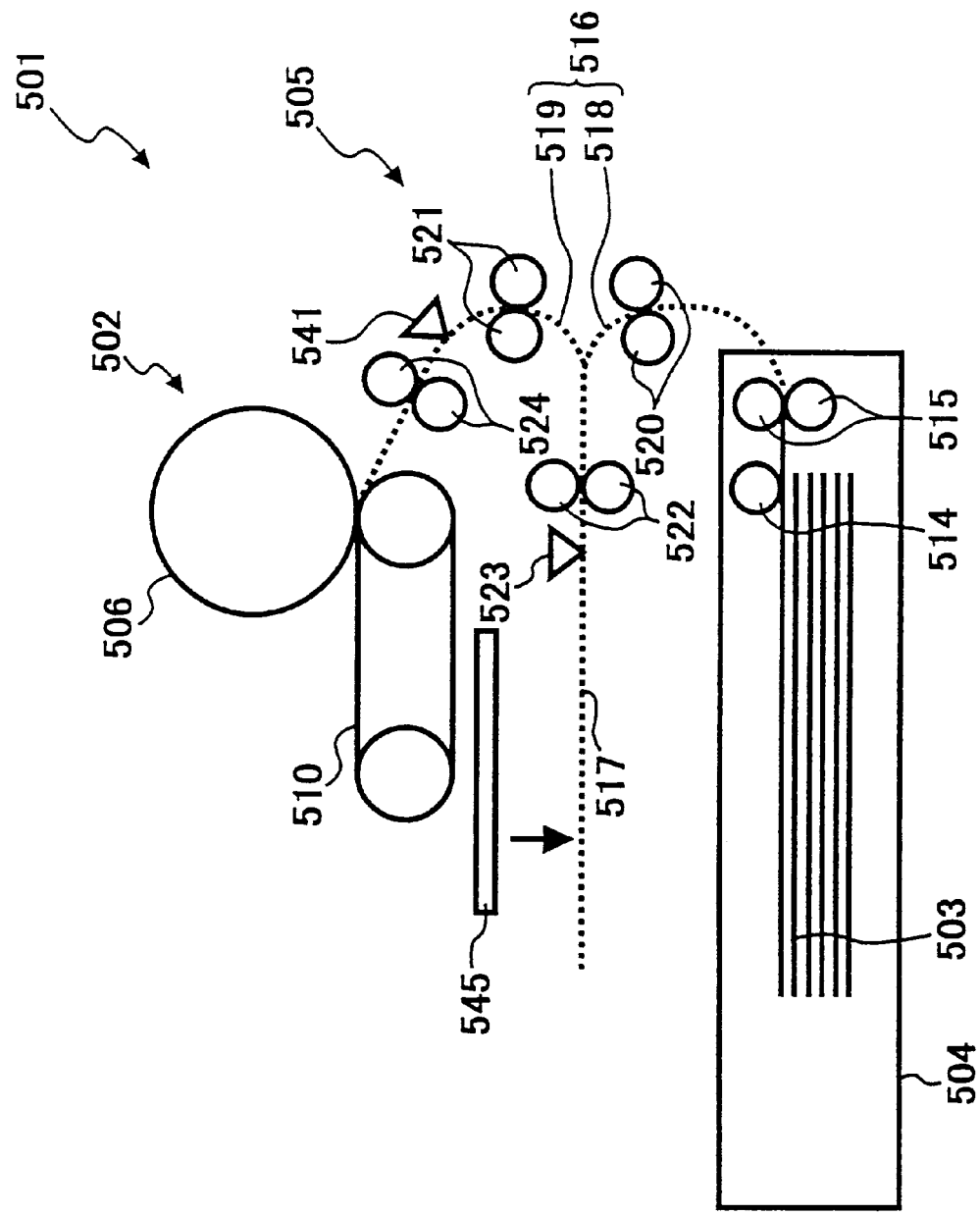
FIG. 27 is an outlined structural diagram illustrating the image forming apparatus of the third embodiment according the present invention.

The different point between the second and third embodiments of the invention is, as shown in FIG. 27, that a stamping device 545 serving as a processing device is provided in the switch-back path 517 instead of the jogger 542. The stamping device 545 performs the stamping of the mark "X" on a specified surface area of the recording paper in the switch-back path 517 by use of a predetermined actuator.

Namely, the following stamping operations can be performed on the recording paper 503:

The operation of the stamping for showing the stamping device forming the image on the recording paper 503;

The operation of the stamping for showing that the image formed on the rear surface of the recording paper 503 is an unnecessary image, at the time of re-utilizing the recording paper 503 having the image formed on the one-side surface thereof;

The operation of the stamping for showing that the recording papers 503 are surely conveyed sheet by sheet without any superposing conveyance (double or plural-sheets conveyance).

In the background art, such a stamping operation is performed by rotating the stamping roller on the conveying path 516. Namely, the conveying path 516 is not a linear path. Some devices such as the rollers are provided on the conveying path 516. The rolling roller-state member performs the stamping operation on the recording paper 503 conveyed and moved on the conveying path 516 (on the position in front of the conveying roller 520). However, on this occasion, the ink supplying cannot be done onto the rotating roller-state member. It is difficult to form a large stamping image with a small device, because the diameter of the roller-state member becomes inevitably large. Those are the troublesome matters to be solved.

In the third embodiment of the invention, since the stamping device 545 moving in a direction perpendicular to the surface of the recording paper 503 and stamping the surface of the recording paper 503 is provided in the linear switch-back path 517, the stamping operation can be performed easily over the entire surface of the recording paper 503, and the print/shadow can be easily viewed and recognized. In addition, the ink can be easily supplied to the stamping device 545.

Fourth Embodiment

Another embodiment of the present invention is described hereinafter as the fourth embodiment.

The embodiment described hereinafter is focused on the different points between the second and fourth embodiments of the invention. The same reference numerals are respectively attached to the common members, and the detailed explanations thereof are omitted here.

Figure 28:
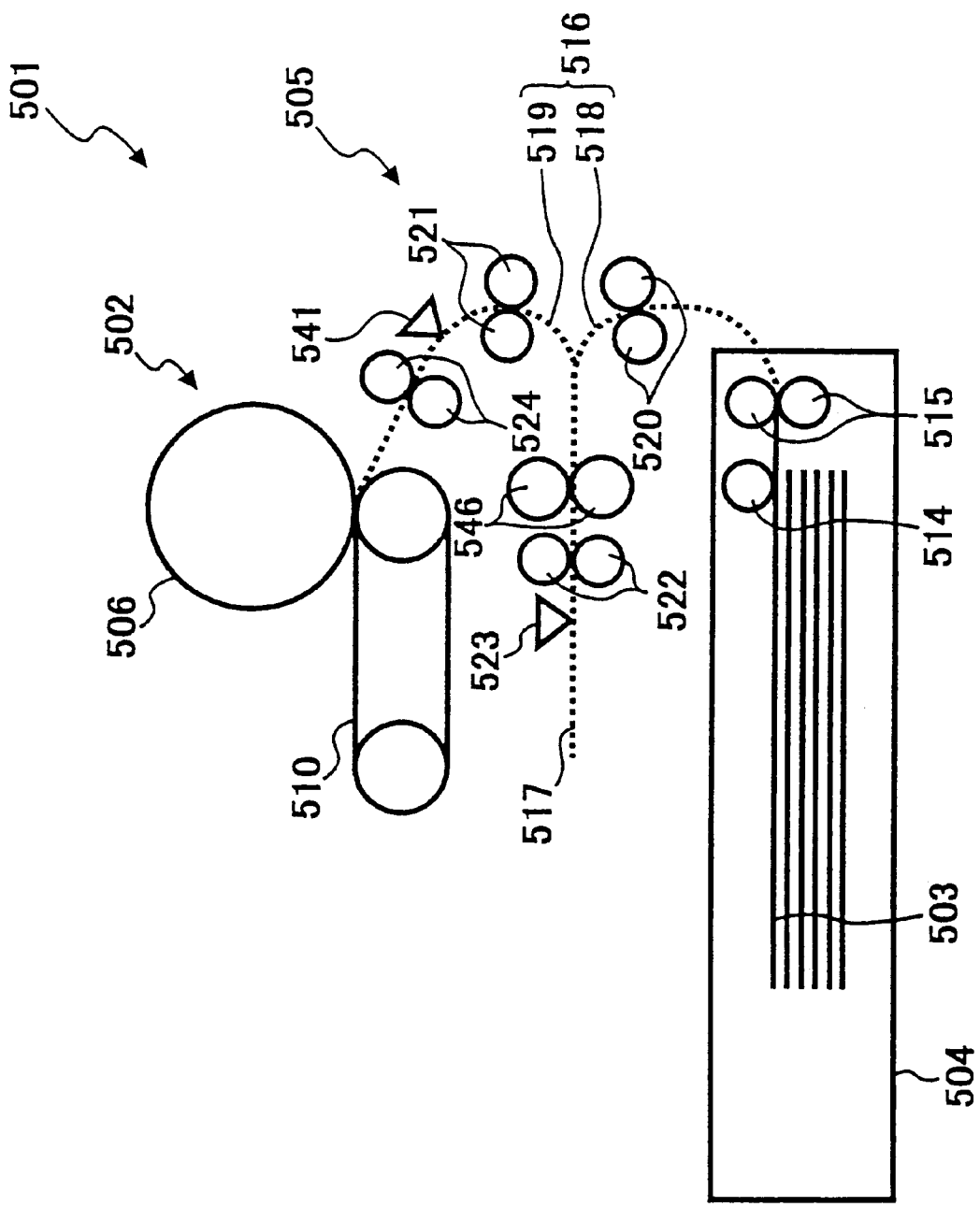
FIG. 28 is an outlined structural diagram illustrating the image forming apparatus of the fourth embodiment according the present invention.

The difference between the second and fourth embodiments is, as shown in FIG. 28, that, in the present embodiment, an operation/treatment device 546 serving as a device for performing a specified operation or treatment processing to the recording paper 503 is provided instead of the jogger 542 on the outside position of the conveying roller 522 in the outlet/inlet portion of the switch-back path 517, when the recording paper 503 is accommodated into the switch-back path 517 and sent out therefrom.

Namely, when the specified treatment processing is performed for the recording paper 503 on the conveying path 516, if the sufficient effect of the treatment processing is intended to be obtained by repeatedly performing the similar treatment processing for the recording paper, the plural devices for use in the treatment processing have to be arranged along the conveying path 516. As a result, there arise several troublesome matters, such as an increase of the parts number, large-sizing of the apparatus, lowering of the reliability thereof, and increase in cost.

Here, in the fourth embodiment of the invention, the apparatus is constructed such that, positively utilizing the property of the switch-back operation of the recording paper 503 by use of the switch-back path 517, a one-operation/treatment-processing device 546 can perform the two-times processing when the recording paper 503 is accommodated in the switch-back path 517 and sent out therefrom.

In such a structure of the fourth embodiment, regarding the operation/treatment processing device 546, it may be possible to decrease the number of the parts, to make the device small-sized, to improve the reliability thereof, and to lower the cost.

Next, a concrete example of the treatment processing performed by the operation/treatment processing device is explained hereinafter.

Figure 29:
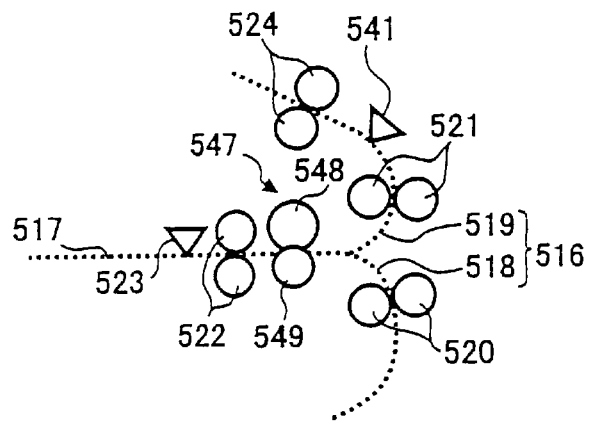
FIG. 29 is a diagram illustrating the example of the treatment/process device in the image forming apparatus.

In the example as shown in FIG. 29, a compensation device 547 for compensating the curling of the recording paper 503 is provided in the operation/treatment processing device 546. Namely, as shown in FIG. 29, the compensation device 547 is constructed with the roller pair composed of a largely-deformable rubber-made roller 548 of large diameter and a high-rigidity metal roller 549 of small diameter.

A predetermined actuator drives the rollers 548 and 549 and thereby nips the recording paper 503 following along the metal roller 549. In such a way, it is possible to practice the processing of compensating the curling of the recording paper 503 so as to cause the recording paper 503 to be downward-curled.

Namely, since the image-formed recording paper 503 after going out from the fixing device 512 tends to become curled, the image-formed recording paper 503 can be prevented from being curled by previously giving the recording paper 503 the curling in the opposite direction by the compensation device 547. In the embodiment, since the recording paper 503 passes through the compensation device 547 two times, the curling compensation can be performed further effectively. Furthermore, regarding the compensation device 547, the number of the parts can be reduced. In addition, the device can be small-sized, the reliability thereof can be improved, and the cost of the apparatus can be realized.

Figure 30:
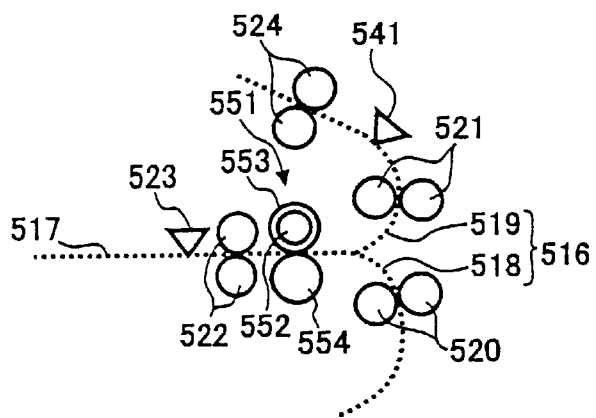
FIG. 30 is a diagram illustrating the other example of the treatment/process device in the image forming apparatus.

FIG. 30 illustrates an example of providing a temperature adjustment device 551 for adjusting the temperature of the recording paper 503 to a temperature within almost constant area as the operation/treatment processing device 546. Namely, as shown in FIG. 30, the temperature adjustment device 551 is composed of a pair of rollers 553 provided with a heat pipe of a well-know structure in the interior thereof and another roller 554 opposed to the roller 553.

Namely, it is preferable that the temperature of the recording paper 503 is not so high or low for the image formation. The rollers 553 and 554 are driven by the predetermined actuator. The recording paper 503 is nipped between the rollers 553 and 554. When the temperature of the recording paper 503 is high, the paper 503 is cooled by the heat pipe 552. When the temperature thereof is low, the paper 503 is heated by the heater. Thereby, the temperature of the paper 503 is adjusted to a normal temperature within a substantially constant range. In such a state, the image formation is performed in order to enable to maintain the preferable image quality.

Furthermore, in the present embodiment, since the recording paper 503 passes through the temperature adjustment device 551 two times, the operations of heating and cooling can be done further effectively. In addition, regarding the temperature adjustment device 551, the number of the parts can be reduced. Furthermore, the device can be small-sized, the reliability thereof can be improved, and low cost of the device can be realized.

Figure 31:
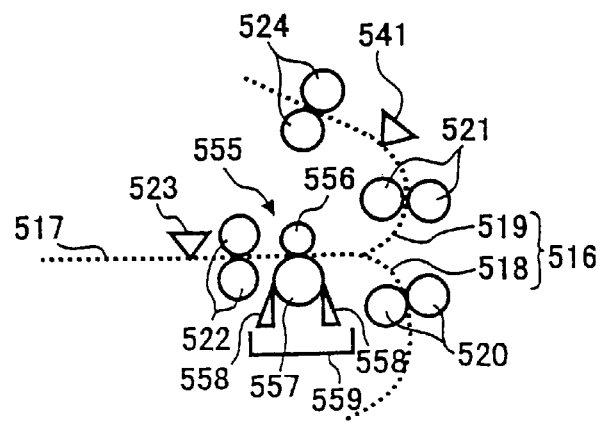
FIG. 31 is a diagram illustrating the other example of the treatment/process device in the image forming apparatus.

FIG. 31 illustrates an example of providing a cleaning device 555 for removing dust or dirt such as the paper powders attached to the recording paper 503 as an operation/treatment processing device 546. Namely, as shown in FIG. 31, the cleaning device 555 is provided with a roller 556 and another roller 557 opposing thereto. Both of the rollers 556 and 557 are rotatively driven by a predetermined actuator. A voltage is applied to the roller 557 by the predetermined power source, and the static electricity is generated on the surface of the roller 557. A scraper 558 removes dirt or dust attached to the surface of the roller 557, and the removed dirt or dust drops into a dust box 559.

Namely, the paper of low quality including much mixtures such as paper powders or calcium carbonate, etc. may be employed as the recording paper 503 on some occasions. However, in the present embodiment, since the recording paper 503 passes through the cleaning device 555 two times, the dust such as the paper powder is sufficiently removed and thereby the image quality can be improved. Regarding the cleaning device 555, the number of the parts can be reduced. Furthermore, the device can be small-sized, the reliability thereof can be improved, and low cost of the device can be realized.

Moreover, the surface of the roller 557 can be made viscous and the dust such as the paper powder is attracted by the viscous force and removed therefrom. In such a way, the dust can be favorably removed.

Figure 32:
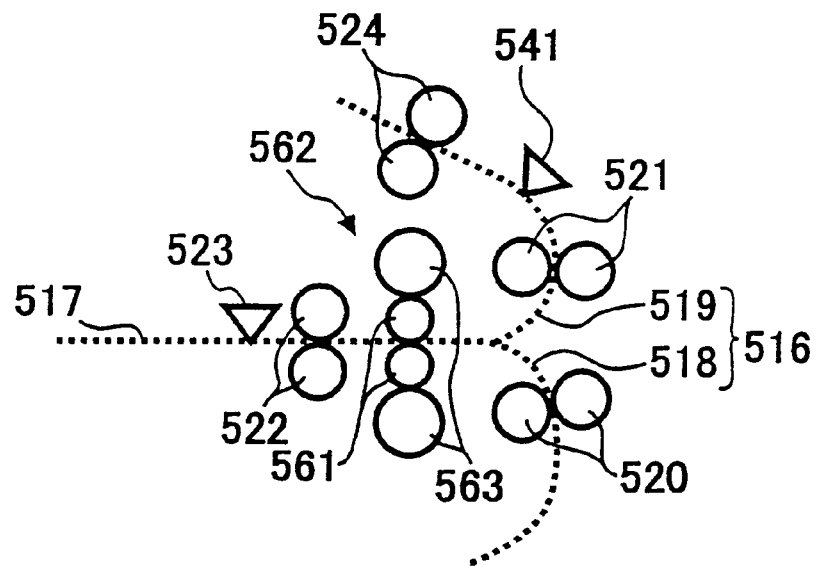
FIG. 32 is a diagram illustrating the other example of the treatment/process device in the image forming apparatus.

FIG. 32 illustrates an example of providing a pressing device 562 including a pair of metal rollers 561, 561 to improve the smoothness by pressing the recording paper 503 as an operation/treatment processing device 546. Namely, as shown in FIG. 32, the pressing device 562 is composed of a pair of metal rollers 561, 561 of comparatively small diameter and a pair of rubber rollers 563, 563 serving as a pressing back-up rollers for pressing the metal rollers 561, 561. The metal rollers 561, 561 press the surface of the recording paper 503.

Namely, a paper of inferior quality having bad surface flatness and bad brilliance may be employed as the recording paper 503 on some occasions. However, in the present embodiment, since the recording paper 503 passes through the pressing device 562 two times, the surface of the recording paper 503 is sufficiently pressed and thereby the smoothness and the brilliance thereof are improved. Regarding the pressing device, the number of the parts can be decreased, the device can be small-sized, the reliability of the device can be improved, and the cost of the device can be reduced.

Figure 33:
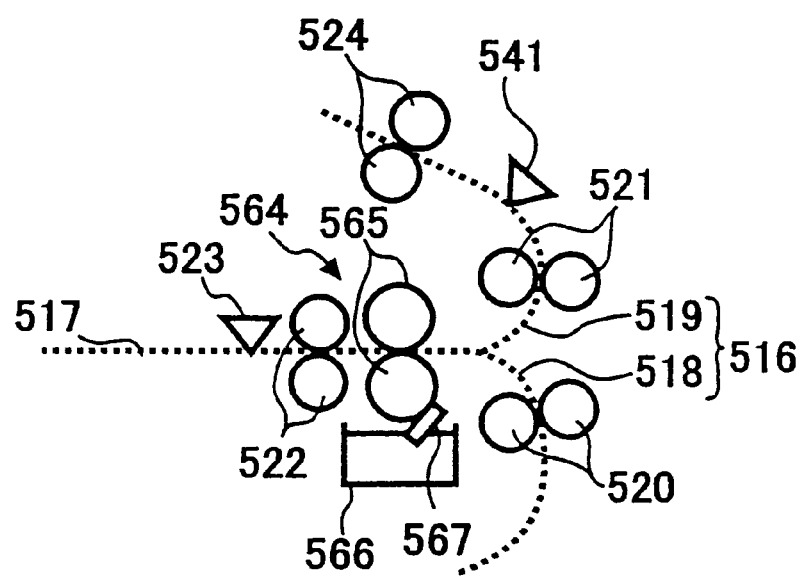
FIG. 33 is a diagram illustrating the other example of the treatment/process device in the image forming apparatus.

FIG. 33 illustrates an example of providing a painting device 564 for painting a predetermined coating agent on the recording paper 503 as an operation/treatment processing device 546. Namely, the painting device 564 is composed of a pair of rollers 565, 565 rotated by the predetermined actuator, a container 566 containing liquid coating agent, and a painting material 567 made of cloth for sucking up the coating agent from one side thereof and for painting the coating agent on the recording paper at other side thereof in the state of being brought into direct contact with the roller 565. The lower-side roller 565 is brought into direct contact with the recording paper 503 passing through the rollers 565, 565 and the coating agent is painted on the recording paper 503. Furthermore, it may be allowable that, without employing the painting material 567, the lower-side roller 565 is directly dipped and rotated in the coating agent contained in the container 566 and the coating agent is painted on the recording paper 503.

Such a coating agent is painted on the recording paper 503 and improves the characteristics of the recording paper 503, such as the brilliance, the smoothness, the uniformity, the electrostatic property, etc. Various sorts of well-known coating agent can be used for forming the image of high image quality. In the present embodiment, since the recording paper 503 passes through the painting device 564 two times, the coating can be done further uniformly and sufficiently with the coating agent. Regarding the painting device 564, the number of the parts can be decreased, the device can be small-sized, the reliability of the device can be improved, and the cost of the device can be reduced.

Although the respective examples of the operation/treatment processing device 546 are independently described heretofore, needless to mention, it may be possible to use the combination of the above-mentioned plural examples. Furthermore, the contents of the treatment processings performed by the operation/treatment processing device 546 may not be limited to the aforementioned examples.

Fifth Embodiment

Another embodiment of the present invention is described hereinafter as the fifth embodiment.

The embodiment described hereinafter is focused on the different points between the second and fifth embodiments of the present invention. The same reference numerals are respectively attached to the common members, and the detailed explanations thereof are omitted here.

Figure 34:
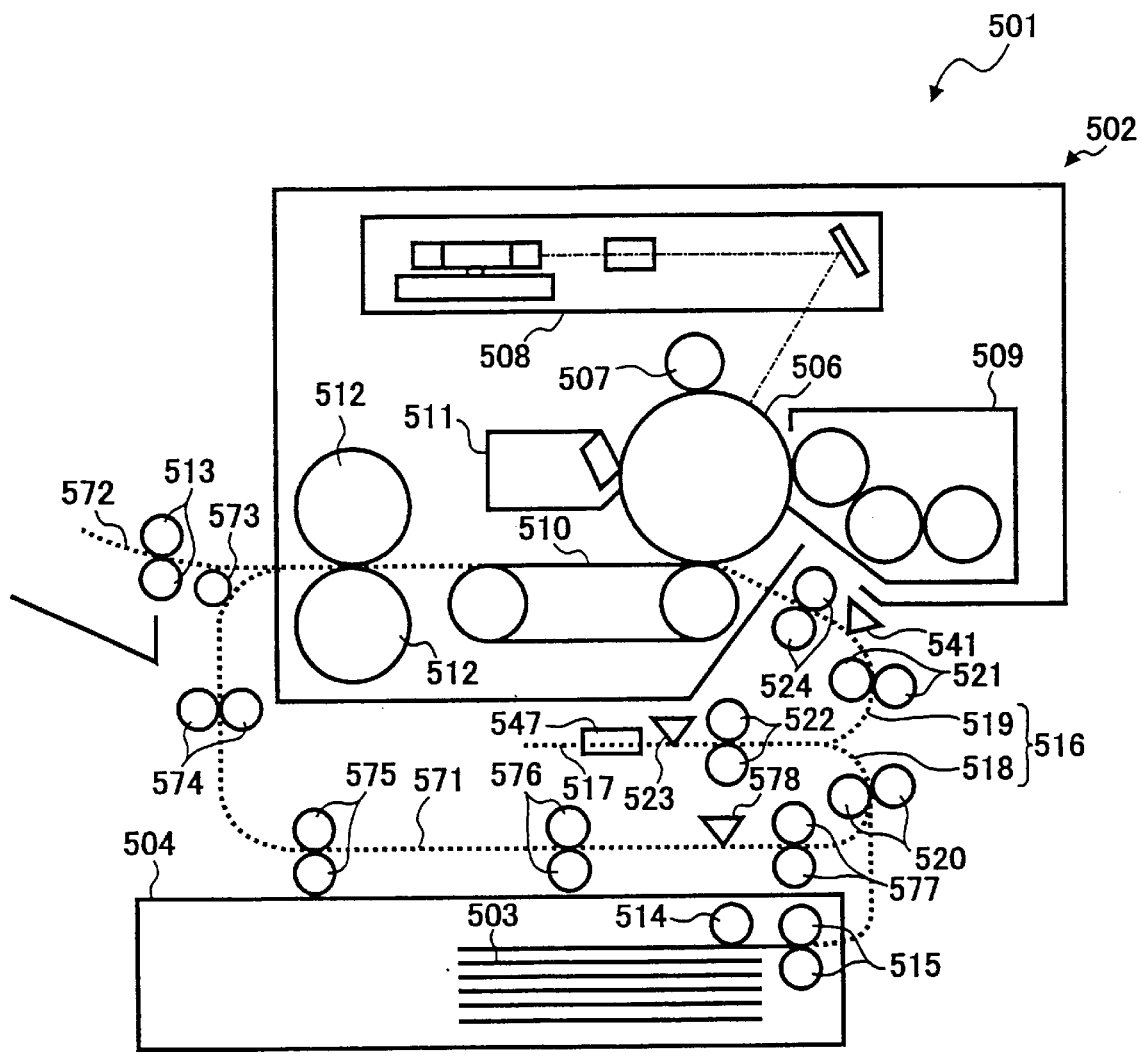
FIG. 34 is an outlined structural diagram illustrating the image forming apparatus of the fifth embodiment according the present invention.

The different points between the second and fifth embodiments of the invention are as follows. Namely, as shown in FIG. 34, in the image forming apparatus, there is provided a conveying path 571 serving as the returning path for conveying the recording paper 503 having the image formed thereon by the printer engine 502 and for returning the recording paper 503 to the switch-back path 517. In the case of the one-side-surface printing, the recording paper 503 having the image formed on the one-side surface thereof discharged from the fixing device 512 is conveyed on the conveying path 572 by the paper discharging roller 513 and discharged outside of the image forming apparatus. In the case of the both-surfaces printing, the recording paper 503 is returned through the conveying path 571 to the switch-back path 517. Such a path changing-over operation is performed by a path changing-over device 573 driven by the predetermined actuator. For instance, a well-known structure of driving a claw-state member for putting in two the recording paper 503 into the conveying paths 571 and 572 can be used as the path changing-over device 573.

The conveyance of the recording paper 503 by use of the conveying path 571 is performed by the conveying rollers 574 through 577; both pairs of rollers are driven by a predetermined motor. The conveying path 571 is connected to the position at the further upstream side of the conveying roller 520 in the conveying path 518 and guides the recording paper 503 to the switch-back path 517. A recording paper sensor 578 for detecting the recording paper 503 is provided between the conveying rollers 576 and 577 in the conveying path 571.

In such a structure, when the both-surfaces printing is performed, the one-surface-printed recording paper 503 is returned to the switch-back path 517. The surface of the recording paper 503 is switched back and then the recording paper 503 is sent to the printer engine 502. The image can be formed on the other surface not printed of the recording paper 503.

Figure 35:
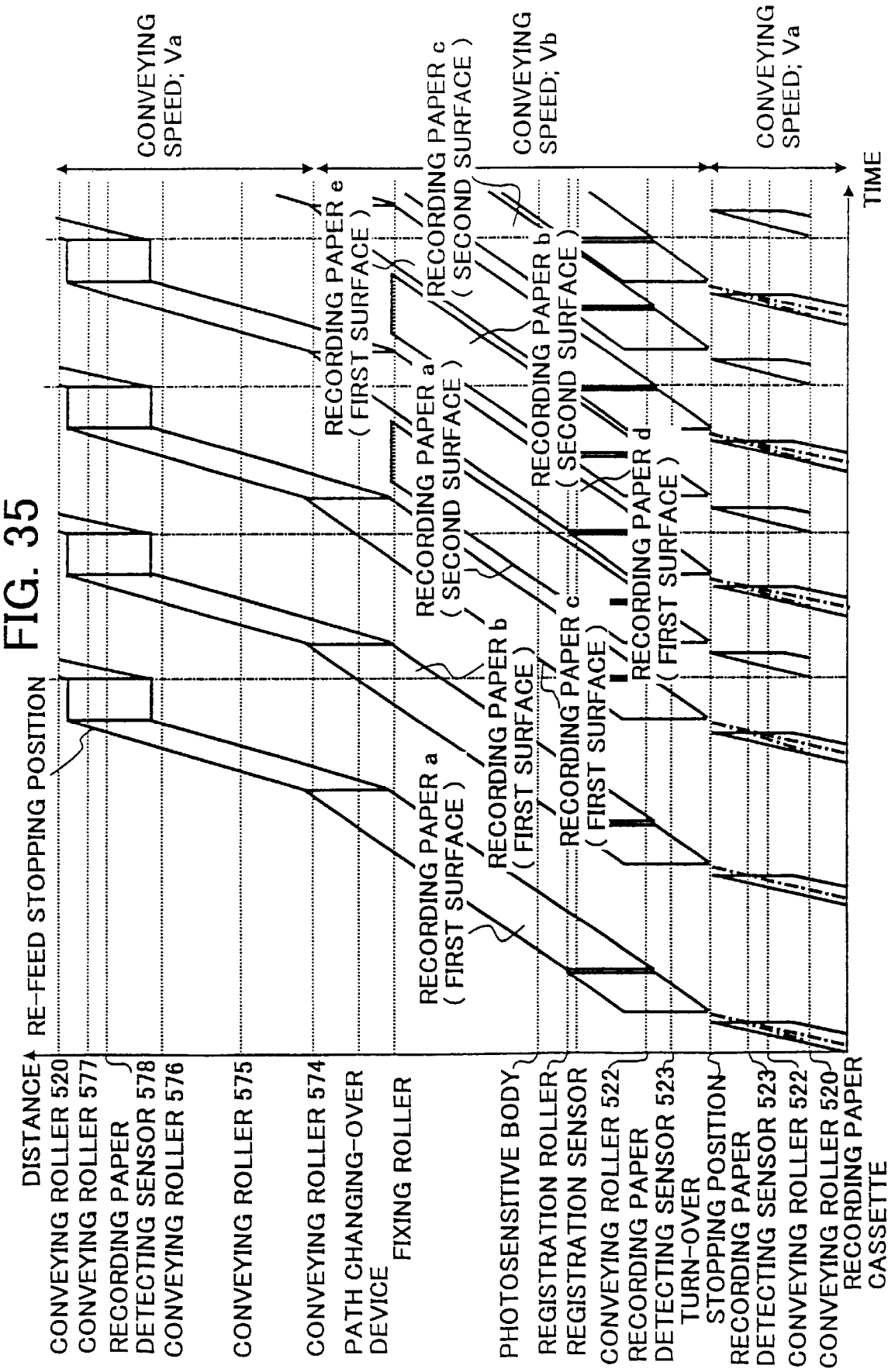
FIG. 35 is a diagram illustrating the paper conveyance of the image forming apparatus.

FIG. 35 is a diagram illustrating the conveyance of the recording paper 503 by use of the image forming apparatus 501. Regarding the paper conveying speed, the conveying speed in the conveying paths 518 and 571 is set to a comparatively high speed $V_a$, and the conveying speed in the conveying path 519 and the printer engine 502 is set to a comparatively low speed $V_b$. By adjusting the time of stopping in the switch-back path 517, the recording paper 503 can be stably conveyed with high reliability even though the unevenness of the paper conveyance occurs. Moreover, in FIG. 35, the image formation is performed in the order of the papers a, b, c.

When the recording paper 503 remains in the switch-back path 517, the recording paper 503 conveyed in the conveying path 571 is temporarily stopped on the predetermined position ("re-feed stopping position" shown in FIG. 35) in front of the conveying roller 20. The timing of stopping the recording paper 503 on the re-feed stopping position can be taken by the detection signal of the paper detecting sensor 578.

Conventionally, in the case of printing the image on the both surfaces of the recording paper 503, a switch-back device for switching back the one-side-printed recording paper 503 to the conveying path 571 is provided in the image forming apparatus. The recording paper 503 is turned over in the switch-back device and returned to the printer engine 502.

On the contrary, in the present embodiment, since the turning-over device for turning over the one-side-printed recording paper 503 and the switch-back device for switching back the recording paper 503 fed by the paper feeding cassette 504 are commonly used in the switch-back path 517 and on the conveying roller 522, the reduction of the manufacturing cost can be realized, owing to the small-sized device and decreasing the number of the parts.

Generally, the accuracy of the relative position between the front tip end of the recording paper 503 and the image formed thereon is precisely secured by the registration operation performed by the registration roller 524. However, the accuracy of the relative position between the side edge of the recording paper 503 and the formed image, that is, the accuracy of the lateral registration is not always optimum due to the influence of the respective parts in the conveying path. In particular, since the recording paper 503 rotates almost one or more cycles around the image forming apparatus 501 until the image formation on the rear surface is started in the both-surfaces image forming apparatus, the positional accuracy is lowered considerably. For this reason, in the background art, a compensation device for compensating the lateral registration is provided on the conveying path 571. However, it is necessary to adjust the accuracy of the lateral registration on the front surface of the recording paper 503 and that of the lateral registration on the rear surface thereof so as to be made equal to each other. For instance, when the conveying state of the recording paper 503 varies due to the time-elapsing variation, the positional unevenness may become large. That is the troublesome matter to be solved.

In particular, regarding the outer frame portion of the pages frequently used for the image such as the book, etc., since the images on the front and rear surfaces frequently appear alternately each time the page is turned over, the outer appearance of the image turns out to be very unsightly with the lateral registration on the front and rear surfaces of the recording paper 503. Regarding the compensation of the inclination of the recording paper 503, that is, the skew compensation, the similar troublesome matter may exists.

The same jogger 542 as in the second embodiment of the invention is provided in the switch-back path 517 as the lateral registration compensating device and the skew compensating device. Refer to FIGS. 25 and 26 as to the concrete structural example mentioned before. The one-surface-printed recording paper 503 conveyed through the conveying path 571 is accommodated in the switch-back path 517 by the action of the conveying roller 522 as in the case of the recording paper 503 fed by the paper cassette 504 and sent out to the printer engine 502. At this time, the nipping of the conveying roller 522 is released, and the jogger 542 performs the lateral registration compensation and the skew compensation for the recording paper 503.

In such a way, in the case of returning the one-surface-printed recording paper 503 to the printer engine 502, and in the case of feeding the recording paper 503 from the paper cassette 504 to the printer engine 502, the jogger 542 is disposed on the switch-back path 517 located at the position where the recording paper 503 commonly paths through.

The operations of the lateral registration compensation and the skew compensation are performed on the front and rear surfaces of the recording paper 503 by use of the jogger 542. In such a structure, the positions of the images formed on the front and rear surfaces of the recording paper 503 can be stably made to coincide with each other. Furthermore, since the nipping of the conveying roller 522 is released and the lateral registration compensation is performed in the switch-back path 517, the compensation of the lateral registration can be done with a simple device, as in the case of the second embodiment of the invention.

Figure 36A:
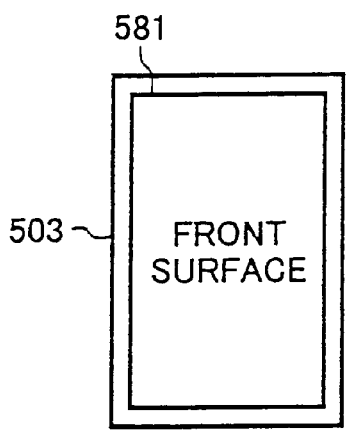
FIGS. 36A, 36B and 36C are explanatory diagrams illustrating the function and the functional effect of the image forming apparatus.
Figure 36B:
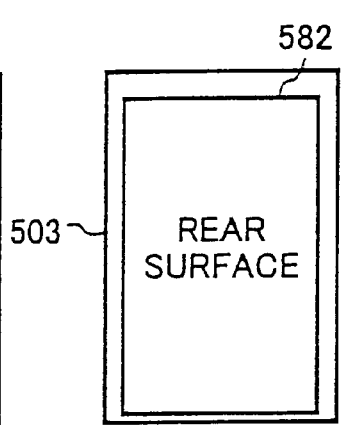
Figure 36C:
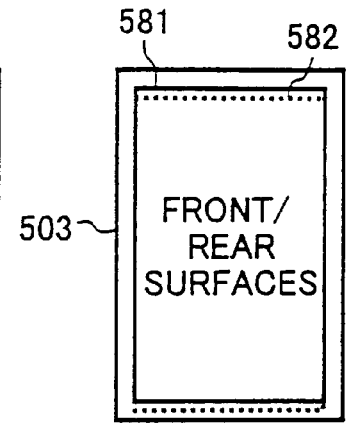

FIG. 36 illustrates the respective images formed on the both surfaces of the recording paper 503 in the case of performing the lateral registration compensation by use of the separate different devices. FIG. 36A, FIG. 36B, and FIG. 36C respectively illustrate the image 581 on the front surface of the recording paper 503, the image 582 on the rear surface thereof, and the superposition of those images 581 and 582. As is apparent from FIGS. 36A–36C, the images 581 and 582 formed on the both surfaces are shifted from each other. The images 581 and 582 respectively represent the page frame lines on the both surfaces of the document such as the book.

Figure 37A:
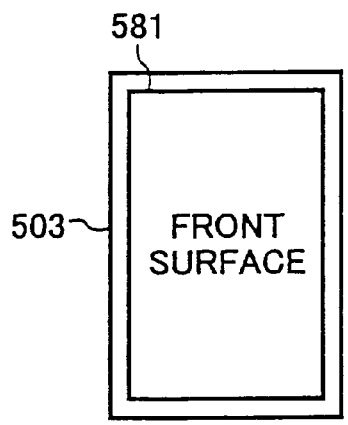
FIGS. 37A, 37B and 37C are explanatory diagrams illustrating the function and the functional effect of the image forming apparatus.
Figure 37B:
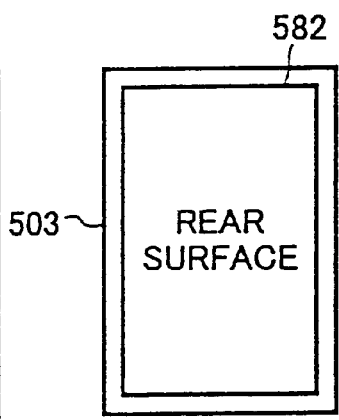
Figure 37C:
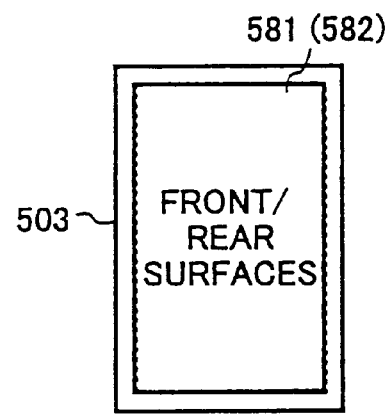

On the other hand, FIG. 37 illustrates the respective images formed on the both surfaces of the recording paper 503 in the case of performing the lateral registration compensation by use of the jogger 542 of the present invention. FIG. 37A, FIG. 37B, and FIG. 37C respectively illustrate the image 581 on the front surface of the recording paper 503, the image 582 on the rear surface thereof, and the superposition of those images 581 and 582. As is apparent from FIGS. 37A–37C, the images 581 and 582 formed on the both surfaces coincide with each other.

Sixth Embodiment

Another embodiment of the present invention is described hereinafter as the sixth embodiment.

Figure 38:
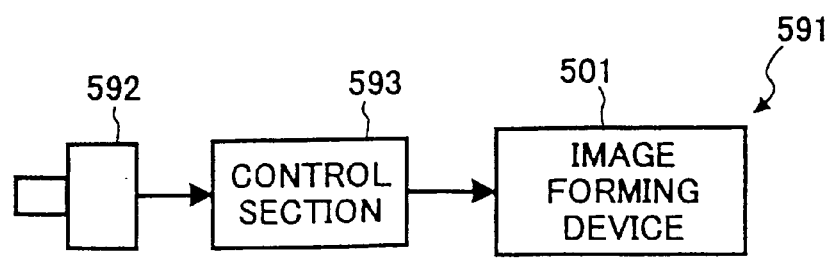
FIG. 38 is a block diagram illustrating the printer which is the sixth embodiment according the present invention.

FIG. 38 is a block diagram illustrating an outlined structure of a printer 591 according to the embodiment of the invention. The printer 591 is provided with the image forming apparatus 501 described in either one of the second through fifth embodiments, the input terminal 592 for receiving the image data as the input data, and the control section 593 for controlling the image forming apparatus 501 and for causing the apparatus 501 to perform the image formation on the recording paper 503 on the basis of the image data inputted from the input terminal 592.

Seventh Embodiment

Another embodiment of the present invention is described hereinafter as the seventh embodiment.

Figure 39:
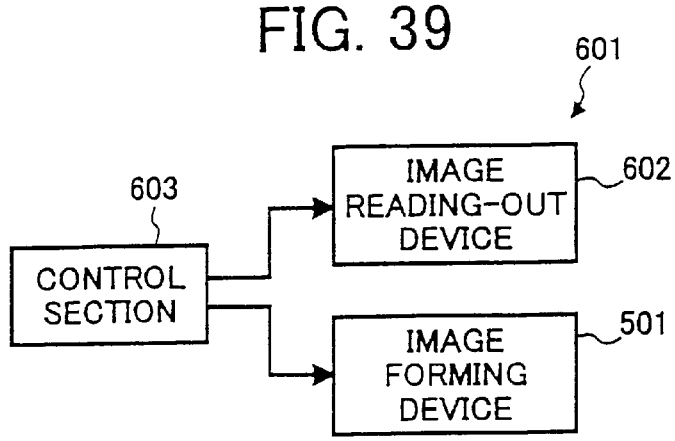
FIG. 39 is a block diagram illustrating the copying machine which is the seventh embodiment according the present invention.

FIG. 39 is a block diagram illustrating an outlined structure of a copying machine 601 according to the embodiment of the invention. The copying machine 601 is provided with the image reading-out apparatus 602 for reading out the image on the original document, the image forming apparatus 501 described in either one of the second through fifth embodiments, and the control section 603 for controlling the image reading-out apparatus 602 and the image forming apparatus 501 and for causing the apparatus 501 to perform the image formation on the recording paper 503 on the basis of the image data of the original document read out by the image reading-out apparatus 602.

Eighth Embodiment

Another embodiment of the present invention is described hereinafter as the eighth embodiment.

Figure 40:
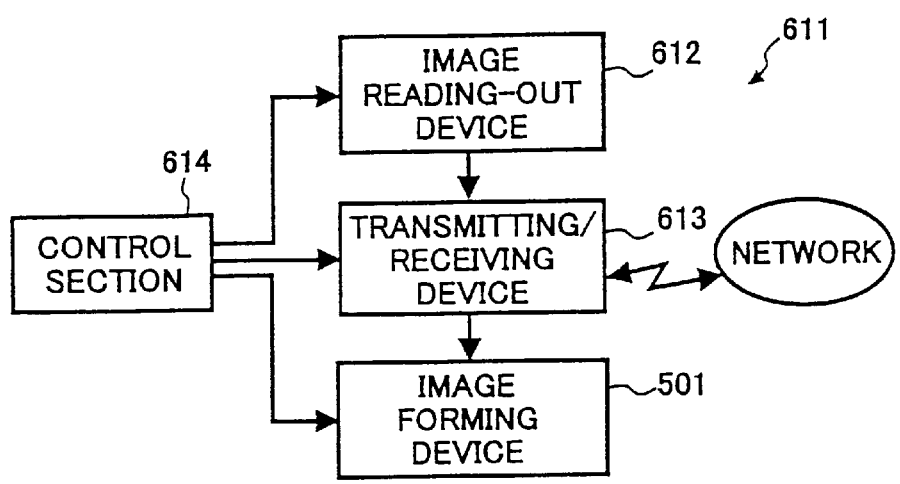
FIG. 40 is a block diagram illustrating the facsimile device set which is the eighth embodiment according the present invention.

FIG. 40 is a block diagram illustrating an outlined structure of a facsimile device set 611 according to the embodiment of the invention. The facsimile device set 611 is provided with the image reading-out apparatus 612 for reading out the image on the original document; the image forming apparatus 501 described in either one of the second through fifth embodiments; the transmitting/receiving apparatus for performing the transmission/receipt of the image data through the network between the facsimile device set and the other external apparatus; and the control section 614, for controlling the image reading-out apparatus 612, the image forming apparatus 501, and the transmitting/receiving apparatus 613, for transmitting the image data of the original document read out by the image reading-out apparatus 612 to the external apparatus through the network by use of the transmitting/receiving apparatus 613, and for causing the image forming apparatus 501 to perform the image formation on the recording paper 503 on the basis of the image data received by the transmitting/receiving apparatus 613 from the external apparatus through the network.

Ninth Embodiment

Another embodiment of the present invention is described hereinafter as the ninth embodiment.

Figure 41:
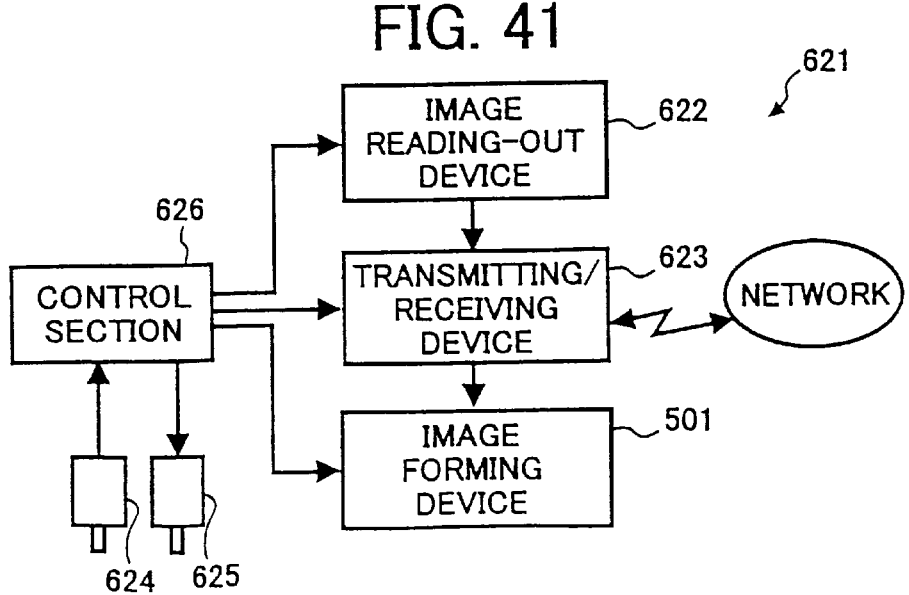
FIG. 41 is a block diagram illustrating the complex machine which is the ninth embodiment according the present invention.

FIG. 41 is a block diagram illustrating an outlined structure of the complex machine 621 according to the embodiment of the invention. The complex machine 621 is provided with the image reading-out apparatus 622 for reading out the image on the original document; the image forming apparatus 501 described in either one of the second through fifth embodiments; the transmitting/receiving apparatus 623 for performing the transmission/receipt of the image data through the network between the complex machine and the other external apparatus; the input terminal 624 for receiving the image data as the input; the output terminal 625 for outputting the image data; and the control section 626 for controlling the image reading-out apparatus 622, the image forming apparatus 501, and the transmitting/receiving apparatus 623, for causing the image forming apparatus 501 to selectively perform the image formation based on the image data received at the input terminal 624, for outputting the image data of the original document read out by the image reading-out apparatus 622 to the external apparatus through the output terminal 625, and for transmitting the image data of the original document read out by the image reading-out apparatus 622 to the external apparatus through the network by use of the transmitting/receiving apparatus 623 or for causing the image forming apparatus 501 to perform the image formation on the recording paper 503 on the basis of the image data received from the external apparatus through the network by use of the transmitting/receiving apparatus 623 on the recording paper.

Heretofore, the example of the electrophotographic method of printing by use of the printer engine 502 is described hereinafter in the aforementioned second through ninth embodiments. However, the present invention is not limited to the above-mentioned point. In the invention, in addition to the electrophotographic printer engine, other types of engines such as an ink-jet printer engine, etc. can be used.

As is apparent from the foregoing description, various advantageous and functional effects can be attained. In an aspect of the invention, various operations or treatment processings for the image formation can be performed further effectively for the recording paper by switching back the recording paper in the temporary paper accommodating section, compared with the case of feeding the recording paper directly to the printer engine without performing such the switch-back operation.

In another aspect of the invention, since the positional compensation movement can be freely done over the entire length of the recording paper in the temporary paper accommodating section, when the paper turning-over device is put in the state of releasing the paper in the temporary accommodating section, the lateral registration compensation of the recording paper can be done by use of the lateral registration device. Therefore, the lateral registration compensation can be done with a simple device.

In still another aspect of the invention, after the registration roller starts to nip the recording paper, the paper is parted from the lateral registration device. Therefore, the recording paper can be fed to the printer engine, keeping the state of precisely compensating the lateral registration.

In still another aspect of the invention, since the linear temporary paper accommodating section is provided with the stamping device for stamping the surface of the recording paper which moves in a direction perpendicular to the surface of the recording paper, the stamping operation can be easily done over the entire surface of the recording paper. In addition, the visible appearance of the print shadow turns out to become superior, and the ink can be easily supplied to the stamping device.

In still another aspect of the invention, the property of the switch-back operation of the recording paper is utilized by use of the temporary paper accommodating device. In such a structure, the operation/treatment processings can be performed two times at the time of accommodating the recording paper into the temporary paper accommodating device and at the time of sending out the paper therefrom by use of one processing device. Thereby, the efficiency of the operation/treatment processings can be enhanced. Regarding the processing device, the number of the parts can be reduced. In addition, the device can be small-sized, the reliability of the device can be improved, and the cost of the device can be lowered.

In still another aspect of the invention, since the recording paper passes through a compensation device two times, curling compensation can be done further effectively. Regarding the compensation device, the number of the parts can be reduced. In addition, the device can be small-sized, the reliability of the device can be improved, and the cost of the device can be lowered.

In still another aspect of the invention, since the recording paper passes through a temperature adjusting device two times, heating and the cooling can be done further effectively. Regarding the temperature adjusting device, the number of the parts can be reduced. In addition, the device can be small-sized, the reliability of the device can be improved, and the cost of the device can be lowered.

In still another aspect of the invention, the temperature adjusting device can be easily realized by use of a heat pipe.

In still another aspect of the invention, since the recording paper passes through a cleaning device two times, the image quality can be improved by sufficiently removing dust or dirt such as the paper powders. Regarding the cleaning device, the number of the parts can be reduced. In addition, the device can be small-sized, the reliability of the device can be improved, and the cost of the device can be lowered.

In still another aspect of the invention, since the recording paper passes through a metal roller two times, the surface of the recording paper is sufficiently pressed. Thereby, the smoothness and the brilliance thereof can be improved. Regarding the metal roller and the circumferential device thereof, the number of the parts can be reduced. In addition, the device can be small-sized, the reliability of the device can be improved, and the cost of the device can be lowered.

In still another aspect of the invention, since the recording paper passes through a painting device two times, a coating operation with the coating agents can be further uniformly and sufficiently performed. Regarding the painting device, the number of the parts can be reduced. In addition, the device can be small-sized, the reliability of the device can be improved, and the cost of the device can be lowered.

In still another aspect of the invention, since the paper turning-over device for turning over the recording paper having the image formed on one surface thereof and the switch-back device for switching back the recording paper fed by the paper piling and accommodating section are commonly used with the one temporary paper accommodating section and the paper turning-over device, the reduction of the manufacturing cost can be realized owing to the small-sized device and parts number reduction.

In still another aspect of the invention, a lateral registration compensation device is disposed on the temporary paper accommodating section at the position where the recording papers commonly pass through, in the case of returning the one-surface printed recording paper to the printer engine, or in the case of feeding the recording paper from the paper piling and accommodating section. The operation of the lateral registration compensation is performed for the front and rear surfaces of the recording paper by use of the same lateral registration compensation device. In such a structure, the image positions on the front and rear surfaces of the recording paper can be stably made to coincide with each other.

In still another aspect of the invention, a skew compensation device is disposed on the temporary paper accommodating section at the position where the recording papers commonly pass through, in the case of returning the one-surface printed recording paper to the printer engine, or in the case of feeding the recording paper from the paper piling and accommodating section. The operation of the skew compensation is performed for the front and rear surfaces of the recording paper by use of the same skew compensation device. In such a structure, the image positions on the front and rear surfaces of the recording paper can be stably made to coincide with each other.

In other aspects of the invention, the image forming apparatus for forming the image, utilizing the electrophotographic method and the digital electrophotographic method attain the same functional effects as mentioned in all of the above aspects of the invention.

In other aspects of the invention, the printer, the copying machine, the facsimile device set, and the complex machine attain the same functional effects as mentioned in all of the above aspects of the invention.

Tenth Embodiment

Another embodiment of the present invention is described hereinafter as the tenth embodiment.

Figure 42:
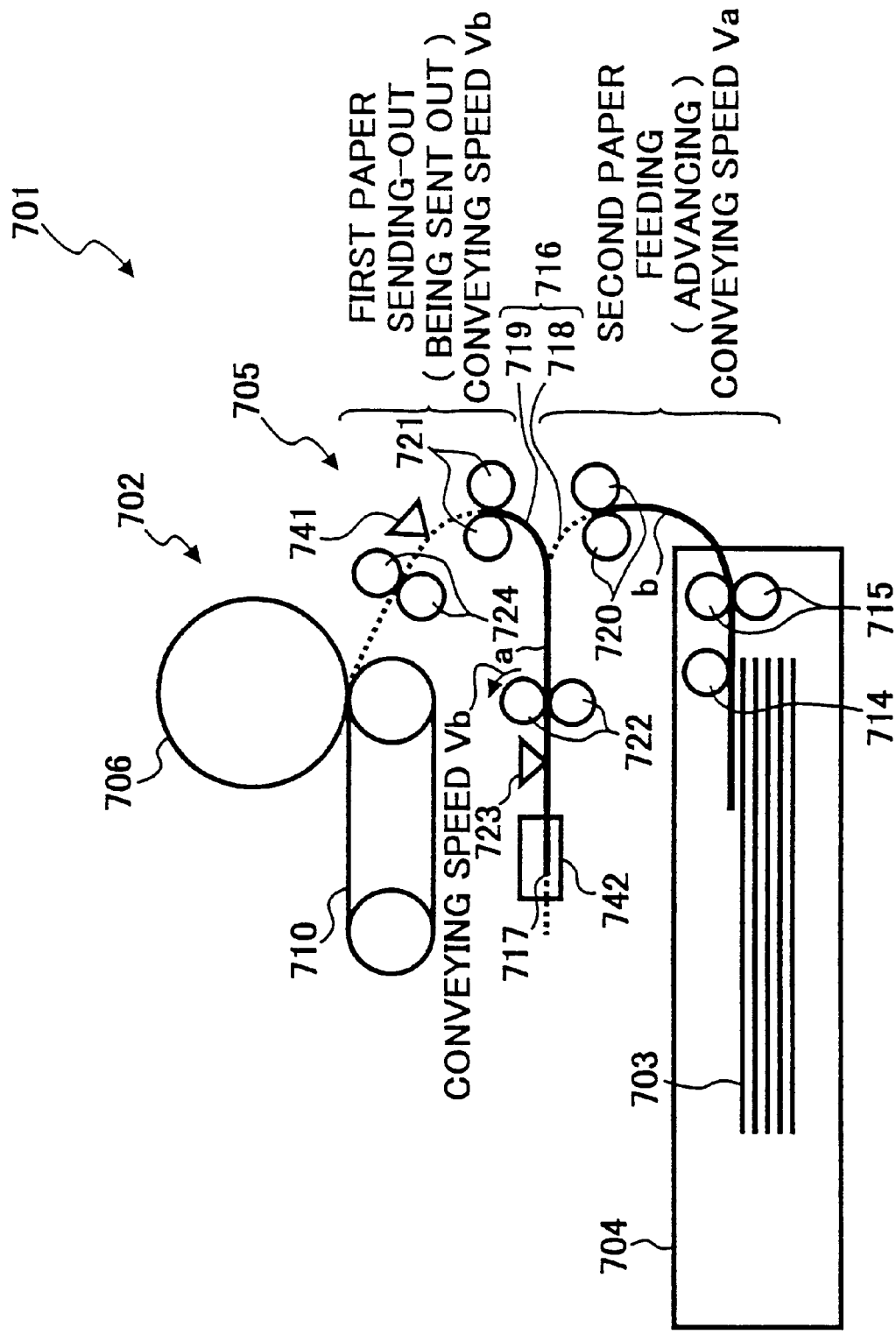
FIG. 42 is an explanatory diagram illustrating the time-elapsing paper conveyance state in the image forming apparatus of the tenth embodiment according the present invention.

In the embodiment as shown in FIG. 42, the apparatus is constructed so as to perform a control of enabling only the conveying roller 722 to change the speed in both of the normal and reverse directions. Furthermore, as shown in FIG. 42, since the apparatus is constructed such that the rotation/stop control is always performed for the separation roller 715 and the conveying roller 720 with the conveying speed Va and the same control is always performed for the registration roller 724 and the conveying roller 721 with the conveying speed Vb which is not equal to Va, it is not necessary to perform the speed changing control for the above respective rollers, and it is possible to make the paper feeding speed higher than the paper conveying speed at the time of forming the image with the printer engine. Although only the conveying roller 722 requires the speed changing control, the conveying roller 721 performs the assistant drive operation when the recording paper advances to the switch-back path 717. Furthermore, there is almost no load when the recording paper is sent out from the switch-back path 717. As a result, even when the stepping motor is utilized, the risk of a dangerous situation of disordering can be avoided. In such a way, according to the present embodiment, it may be possible to perform the stable conversion of the conveying speed of the recording paper 703.

Figure 46:
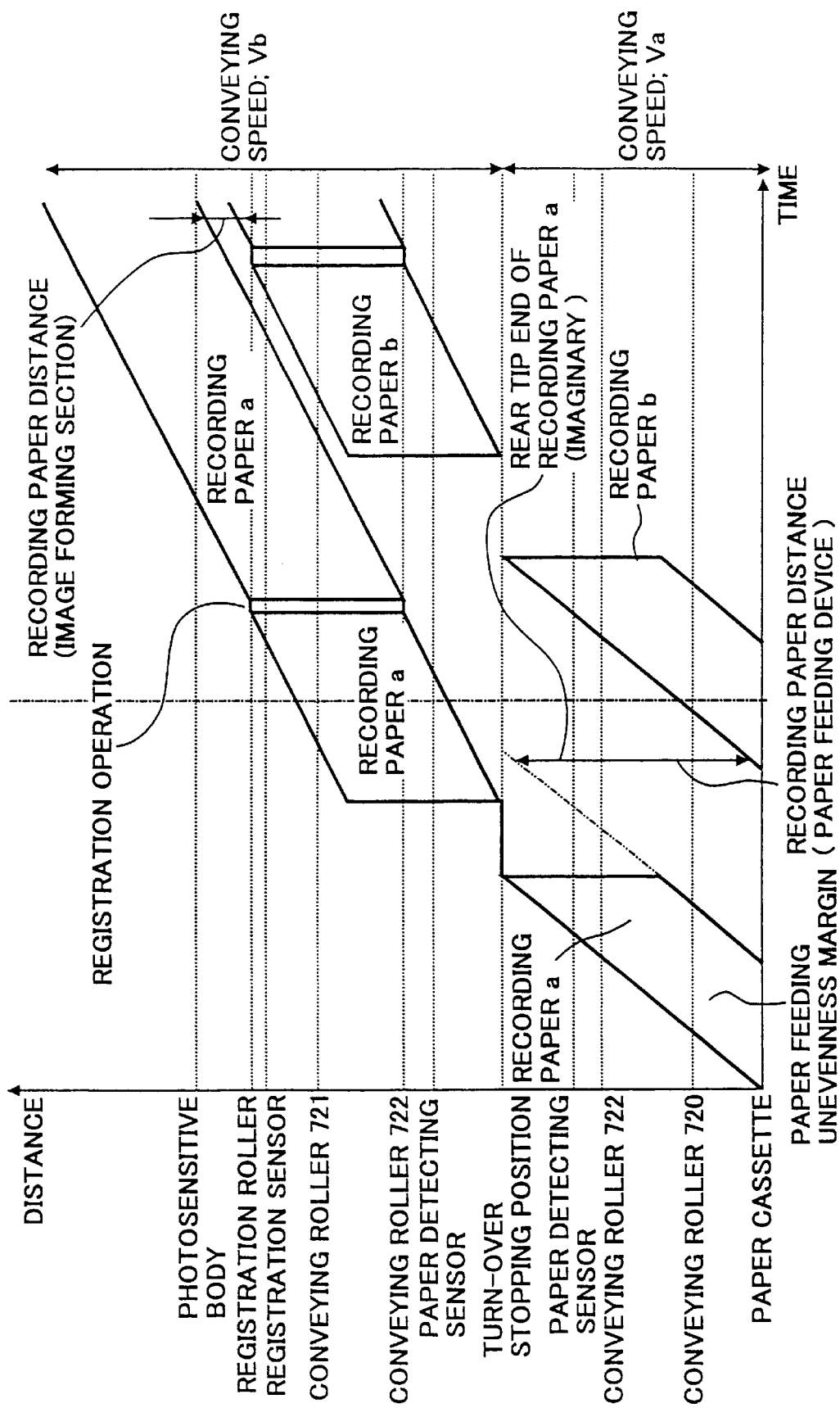
FIG. 46 is a diagram illustrating the paper conveyance state of the image forming apparatus.

FIGS. 42 through 45 illustrate the time-elapsing state of conveying the recording paper 703 in the order of FIGS. 42 through 45. FIG. 46 is a diagram showing the conveyance of the recording paper 703. Since the diagram illustrates the front tip end of the advancing direction of the recording paper as the front tip end of the recording paper 703, the front tip end position of the recording paper 703 is expressed to seemingly move by the entire length of the recording paper 703 accompanying the advancing direction conversion of the recording paper 703 before and after the switching-back of the recording paper 703. There exists a commonly-used positional distance by the length of the switch-back path 717 before i and behind the stop position of the recording paper 703 (hereinafter referred to as the "turning-over stop position") in the switch-back path 717. Therefore, those figures express that the same paper detecting sensor 723 and the same conveying roller 722 respectively appear twice.

In the tenth embodiment, the unevenness of the paper feeding is eliminated during the time period when the recording paper 703 stops on the turning-over stop position. Since the conveyance unevenness becomes small on the position on and after the turning-over stop position, the registration operation can be completed in a very short time.

Figure 43:
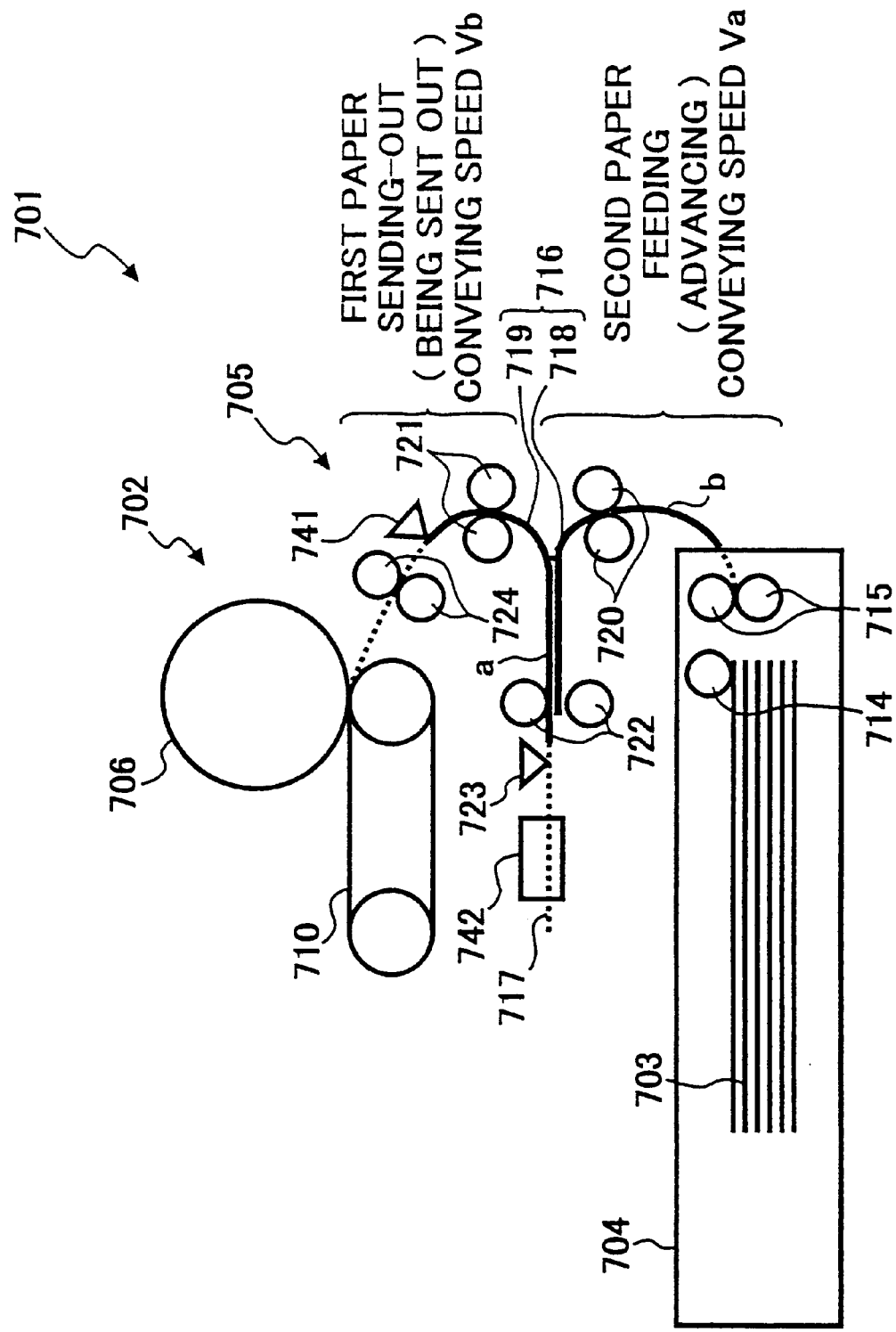
FIG. 43 is an explanatory diagram illustrating the other time-elapsing paper conveyance state.

Assuming that the recording paper a shown in FIG. 43 is conveyed as it is without being switched back, the distance between the recording papers 703, 703 on the separation roller 715 becomes very wide. Among the recording papers 703 successively conveyed to the printer engine 702 by the paper feeding device 705, the head paper, the second head paper just subsequent to the head paper, the third head paper further subsequent to the second head paper are respectively referred to as "recording paper a", "recording paper b", and "recording paper c". In the tenth embodiment, the distance between the recording papers 703, 703 at the printer engine 702 at the time of successively conveying the recording paper can be converted necessarily to a very short distance, by changing the conveying speed. Consequently, the productivity of the image formation can be further improved.

As illustrated time-elapsingly in FIGS. 42 though 45, in the embodiment, the conveying rollers 720 through 722, the paper feeding roller 714, and the reparation roller 715 are controlled. The timing is taken, for the start of sending out the preceding recording paper a from the switch-back path 717 to the printer engine 702, and for the start of sending out the just subsequent recording paper b from the paper cassette 704 to the switch-back path 717. Thereby, the first control device is realized. The preceding paper a and the paper b just subsequent to the paper a to be accommodated in the switch-back path 717 are at least partially superposed on each other in the switch-back path 717, as shown in FIG. 43.

Figure 44:
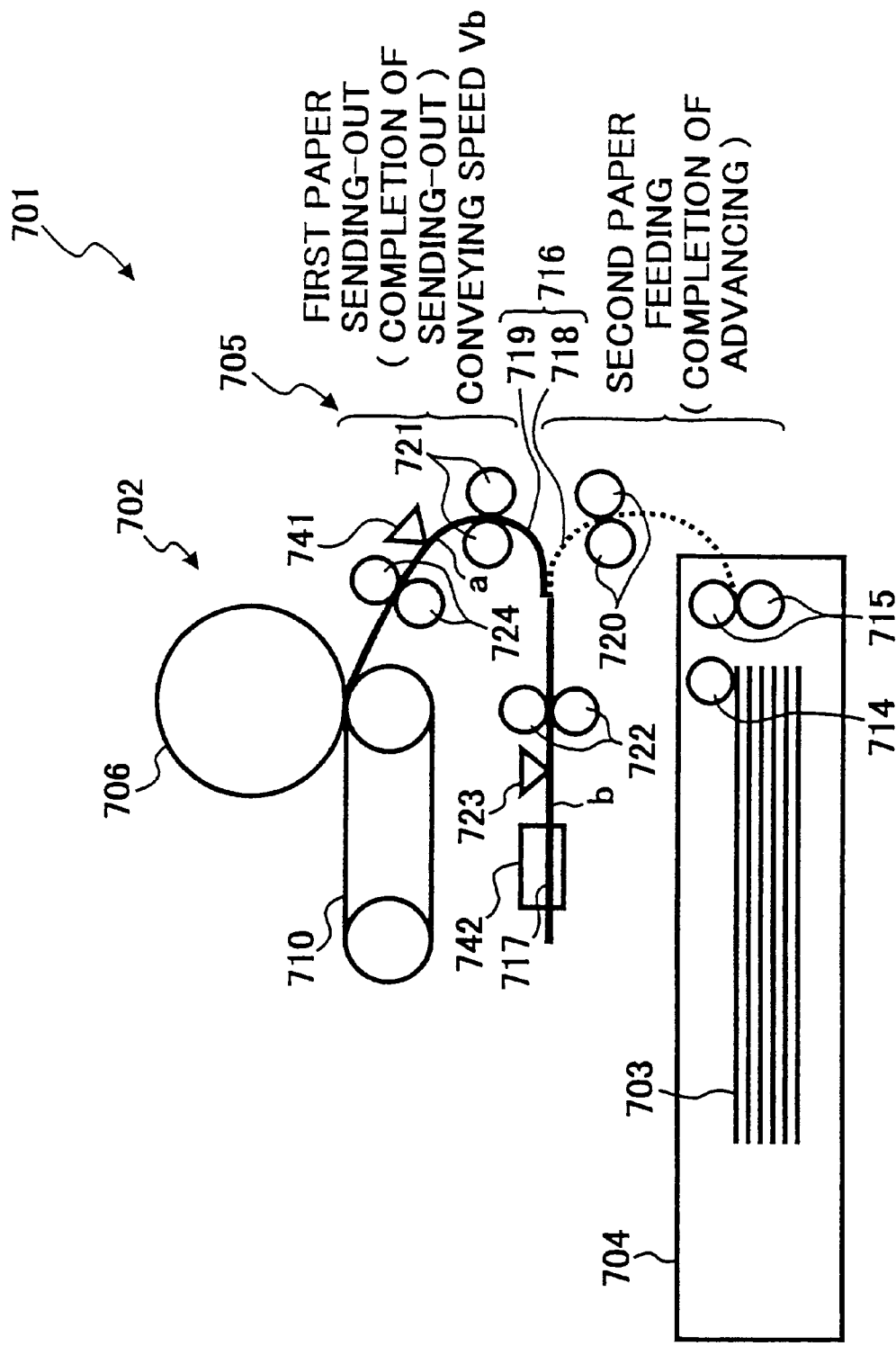
FIG. 44 is an explanatory diagram illustrating the other time-elapsing paper conveyance state.
Figure 45:
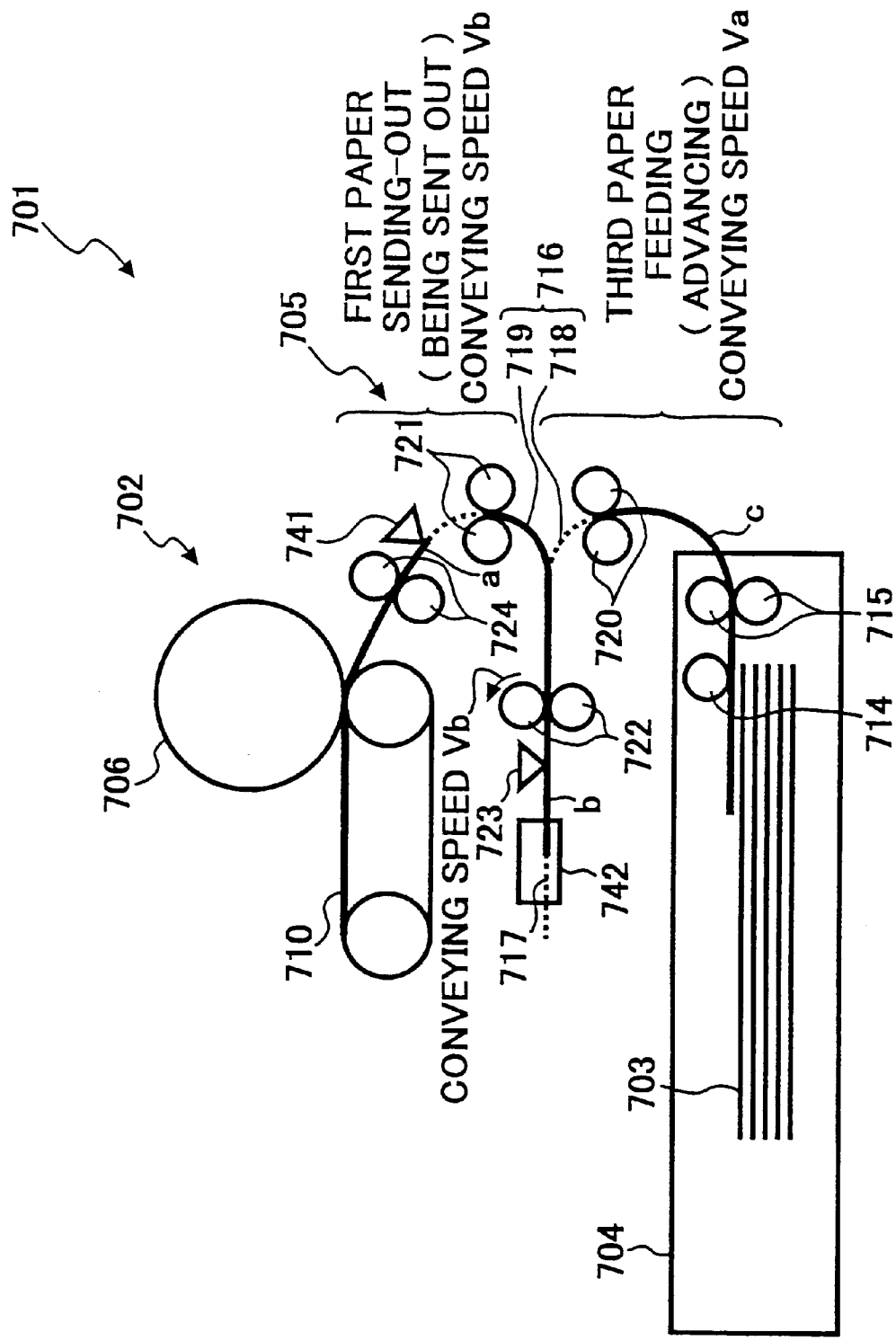
FIG. 45 is an explanatory diagram illustrating the other time-elapsing paper conveyance state.

On this occasion, the nipping state of the conveying roller 722 is released with the timing when the recording paper a being sent out is superposed on the other recording paper b starting to advance into the switch-back path 717. In such a state, both of the recording papers a and b can intersect each other, as shown in FIG. 43. Thereafter, the conveying roller 722 is closed (the nipping state is formed again) with the timing when the sending-out of the recording paper a from the switch-back path 717 is completed. At this time, the accommodation of the recording paper b into the switch-back path 717 is completed, as shown in FIG. 44.

Regarding the superposition of the recording papers a and b, it is desirable to superpose the rear tip end side of the preceding recording paper a in the conveying direction on the front tip end side of the just subsequent recording paper b, as shown in FIG. 43. Owing to the superposition of the papers a and b, the distance therebetween can be shortened compared with the case before the occurrence of the superposition, compare FIG. 43 with FIG. 45 and refer to FIG. 46.

By performing the above-mentioned control, since the preceding paper a is superposed on the just subsequent paper b in the switch-back path 717, the distance between the papers a and b can be sufficiently shortened, compared with the case in which the paper a is switched back and sent out to the printer engine 702 and thereafter the paper b is sent out to the switch-back path 717. Therefore, the high-speed successive paper-feeding can be realized.

On this occasion, as shown in FIG. 43, if the rear tip end side of the preceding paper a is superposed on the front tip end side of the just subsequent paper b, since the paper b advancing to the switch-back path 717 is guided so as to go along the surface of the paper a, it is not necessary to prepare the particular device for prescribing the movement path of the paper b intersecting with the preceding paper a in the switch-back path 717. Consequently, the apparatus can be simplified and small-sized and the manufacturing cost can be reduced.

Figure 47:
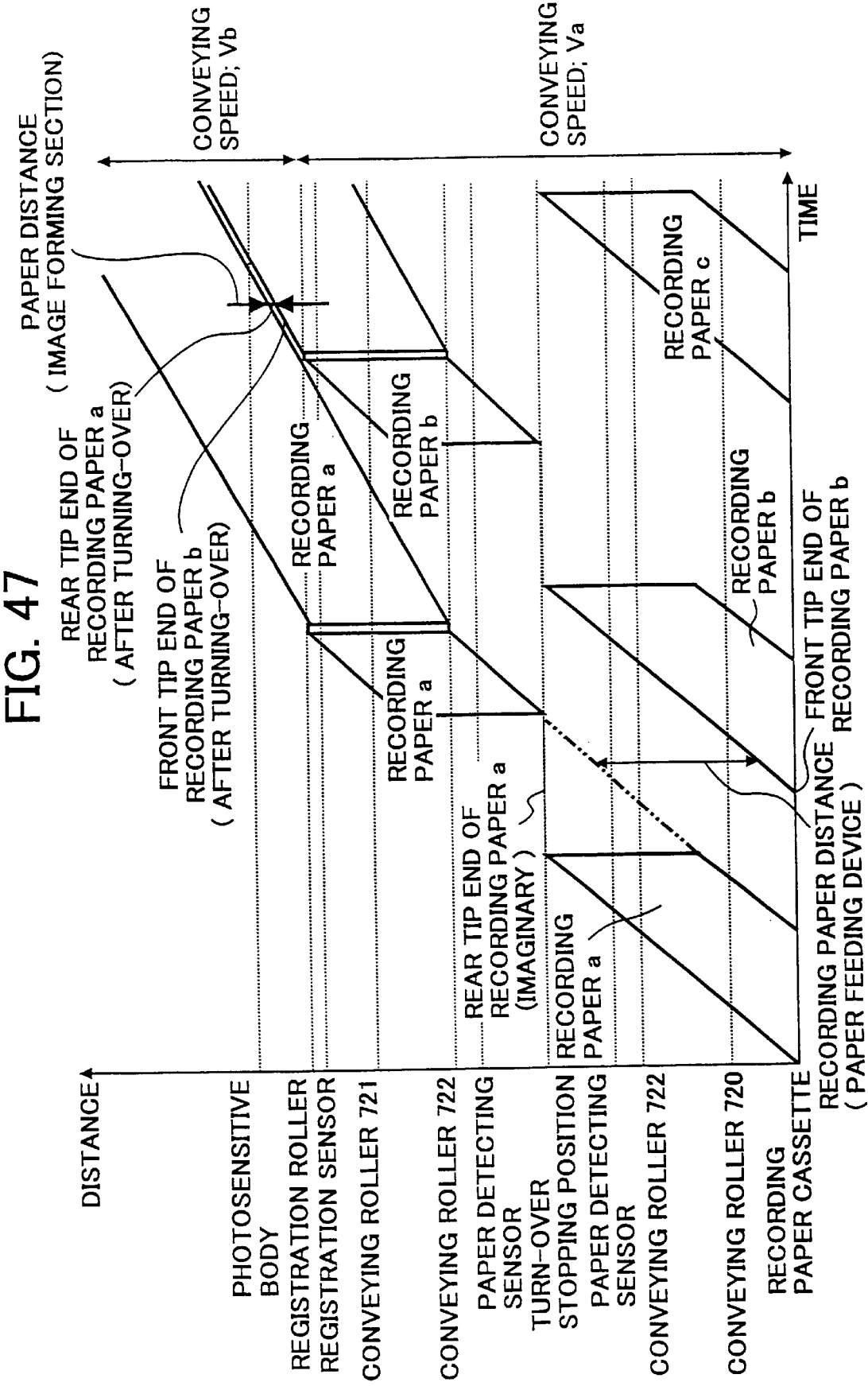
FIG. 47 is another diagram illustrating the paper conveyance of the image forming apparatus.

Furthermore, as shown in the diagram of conveying the recording paper 703 shown in FIG. 47, it may be allowable that the recording paper 703 after being sent out from the switch-back path 717 is further conveyed with the conveying speed Va until the paper 703 arrives at the registration roller 724, and after passing through the roller 724, the paper 703 is conveyed with the conveying speed Vb lower than the speed Va. In such a way, the distance between the recording papers a and b in the section area from the switch-back path 717 to the registration roller 724 is enlarged and thereby the paper conveyance can be intended to stabilize by the detection of the paper jamming, etc.

Furthermore, in the embodiment of the present invention, there is provided a processing device for performing the specified treatment and processing to the recording paper 703 in the switch-back path 717 or at the outlet/inlet portion thereof. To state more concretely, a jogger 742 serving as the lateral registration device is provided in the switch-back path 717.

Eleventh Embodiment

Still another embodiment of the present invention is described hereinafter as the eleventh embodiment.

Figure 48:
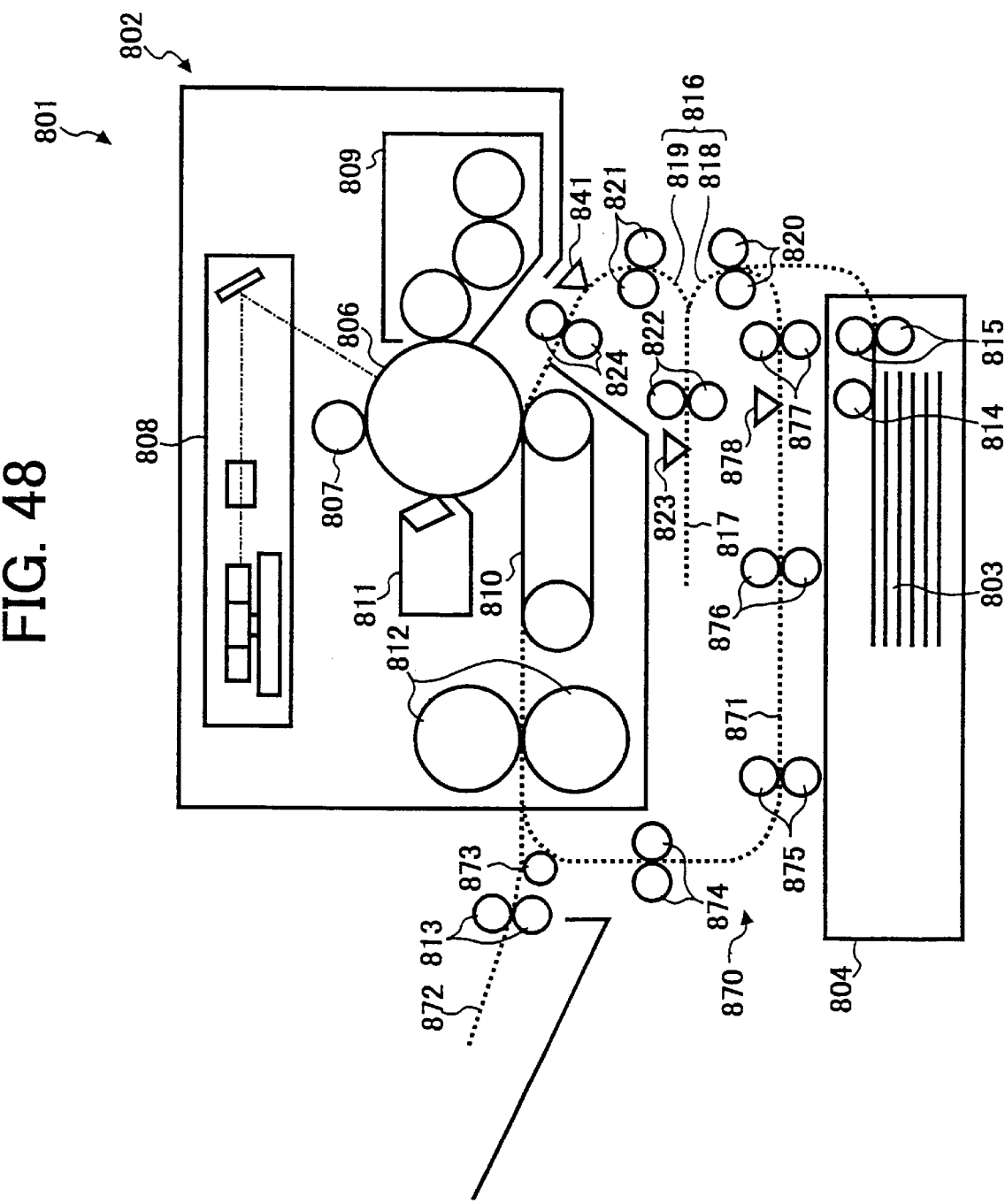
FIG. 48 is an outlined structural diagram illustrating the image forming apparatus of the tenth embodiment according the present invention.

FIG 48 is a concept diagram illustrating the outlined structure of the image forming apparatus 801 of the eleventh embodiment. As shown in FIG. 48, the apparatus 801 is provided with a printer engine 802, a paper cassette 804 for piling and accommodating the recording paper 803, and a paper feeding device 805 for separating the piled papers 803 sheet by sheet and conveying the separated paper 803 to the printer engine 802.

The printer engine 802 is provided with a photosensitive body 806, a charger 807 for charging the body 806, a digital optical writing device 808 for optically writing the electrostatic latent image on the body 806, a developing section 809 for developing the latent image on the body 806 with toner, a transferring section 810 for transferring the developed toner image onto the recording paper 803, and a cleaning device 811 for removing the residual toner on the body 806. The engine 802 forms the image on the paper 803 with the digital electrophotographic process. A fixing roller 812 fixes the toner image transferred onto the paper 803. The image-fixed paper 803 is discharged outside of the engine 802 by a paper discharging roller 813.

The paper feeding device 805 is provided with a paper feeding roller 814 for taking out the paper 803 piled in a paper cassette 804, a separation roller 815 for separating the taken-out paper 803 sheet by sheet, and a conveying path 816 for conveying the paper 803 to the engine 802. From the intermediate position of the path 816, the path is stopped at the deepest portion thereof A switch-back path 817 is branched off therefrom. The path 817 serves as a temporary paper accommodating section for temporarily accommodating the paper therein. The conveying path 816 is divided into two conveying paths 818 and 819 by the switch-back path 817. A conveying path 818 is the path for connecting the paper cassette 804 to the outlet/inlet of the switch-back path 817. A conveying roller 820 driven by a motor 826 (shown in FIG. 50), and conveying the paper 803 is provided therein. A conveying roller 822 serving as the paper turning-over device is a pair of rollers driven by a motor 830 (shown in FIG. 50) and is capable of rotating in the normal and reverse directions, and the rollers pair is provided in the path 817. The conveying roller 822 nips the paper 803 and rotates in the both directions and thereby accommodates the paper 803 conveyed in the path 818 from the cassette 804 in the switch-back path 817 from the front tip end of the paper 803. The paper 803 accommodated in the path 817 is switched back such that the rear tip end of the paper 803 becomes the front tip end thereof and sent out to the conveying path 819 toward the printer engine 802. Namely, the conveying roller 822 functions as the paper turning-over device. A paper detecting sensor 823 is provided in the switch-back path 817.

The advancement of the paper 803 to the switch-back path 817 is performed by rotating the separation roller 815 and the conveying roller 820. The timing of completing the advancement to the switch-back path 817 is calculated by a microcomputer 825 (shown in FIG. 50) from the detection timing at the tip end portion of the paper 803 by the paper detection sensor 823. Thereby, the advancing operation is completed. The switch-back path 817 in the state of a linear straight line has a length capable of accommodating the entire length of the paper 803.

The sending-out of the paper 803 from the switch-back path 817 is performed by rotating the conveying rollers 821 and 822. Thereafter, at the time of the registration operation performed by the registration roller 824 provided in the vicinity of the printer engine 802 of the conveying path 819, the conveying roller 821 performs the co-operation for the registration operation such as the temparary stopping of the paper conveyance, and thereafter the timing of completing the sending-out of the paper 803 from the detection timing of the paper detection sensor 823 is calculated by the microcomputer 825 (shown in FIG. 50) from the paper detecting timing. Thereby, the paper sending-out operation is completed. The registration sensor 841 detects the paper 803 on the position in front of the registration roller 824 at the downstream side of the conveying roller 821 in the conveying path 819, and the timing of the registration operation performed by the registration roller 824 is taken by the above detection.

Figure 50:
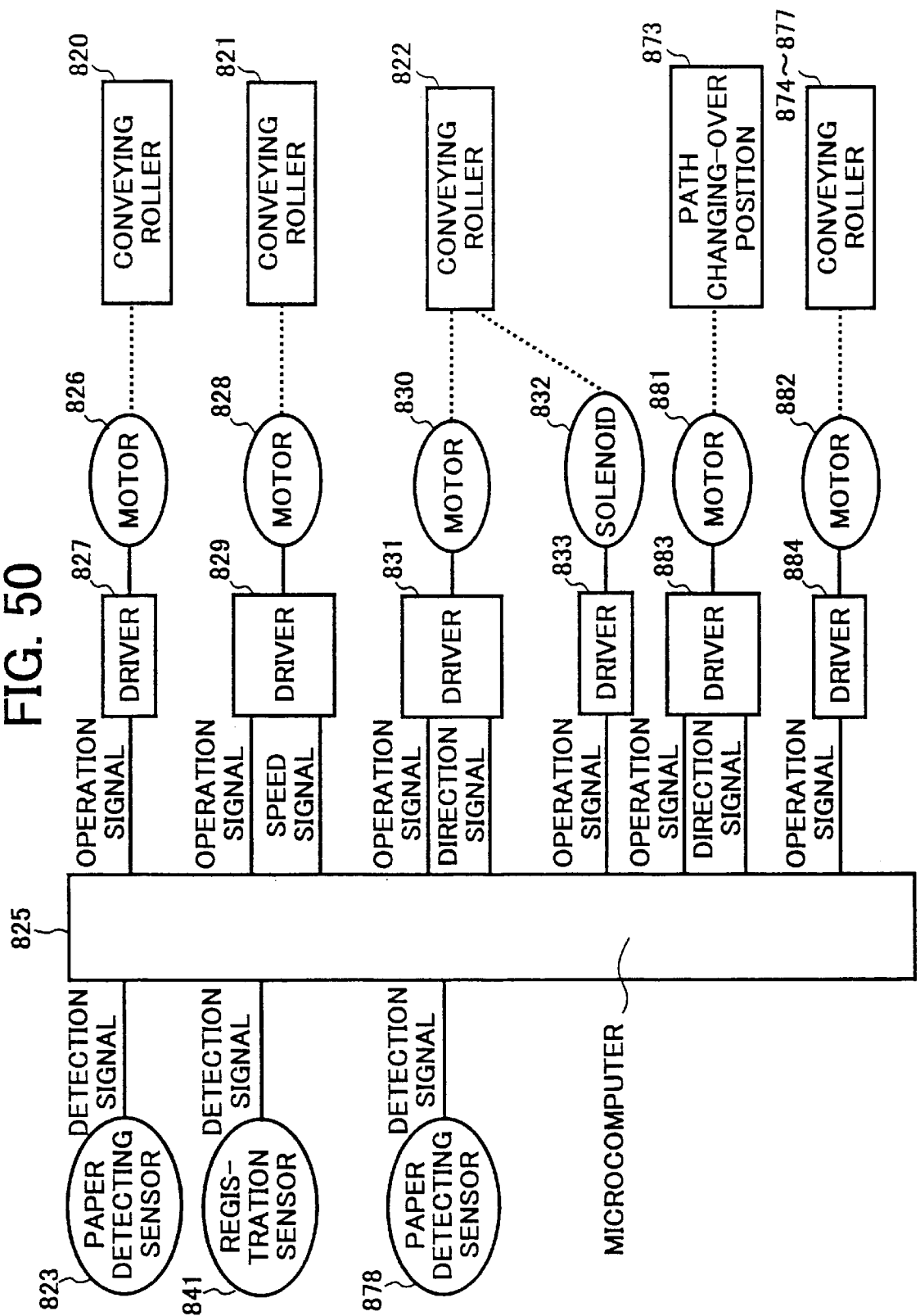
FIG. 50 is a block diagram illustrating the electric connection in the image forming apparatus.

Furthermore, the front tip end of the paper 803 is always to the side of the printer engine 802 at the branching-off portion in the conveying path 816 by use of the guide member (not shown in FIG. 50). Or otherwise, it may be allowable that, for instance, the front tip end of the paper 803 is guided upward by use of the flexible guide member, or the conveying path is forcibly changed over from the path 818 to the other path 819 by the gate provided with the driving device such as a solenoid, etc.

The image forming apparatus 801 is provided with a return conveying device 870 for conveying the paper 803 having the image formed thereon by the printer engine 802 and returning the paper 803 to the switch-back path 817. The device 870 is composed of a conveying path 871 for sending the paper from the printer engine 802 to the switch-back path 817, conveying rollers 874–877, and a path changing-over device 873, etc. In such a structure, the paper 803 discharged from the fixing roller 812 and having the image formed on the one-side surface is conveyed in the conveying path 872 by the paper discharging roller 813 and discharged outside of the apparatus, in the case of the one-surface printing. The paper 803 is returned to the switch-back path 817 in the conveying path 871, in the case of the both-surfaces printing.

The changing-over operation is performed by the path changing-over device 873 driven by the predetermined actuator. As the path changing-over device 873, for instance, the well-known structure for driving the claw-like member directing the paper 803 into two conveying paths 871 and 872 may be employed. Or, it may be allowable to use a structure capable of promptly changing over the front tip end of the paper 803 to the selected direction by rotating the brush roller in the normal and reverse directions in order to precisely change over the direction even though the distance between the papers 803 is very short.

The conveyance of the paper 803 in the conveying path 872 is performed by the conveying rollers 874 through 877, all of which are pairs of rollers driven by the predetermined motors. The conveying path 871 is connected to a position at the upstream side of the roller 820 in the path 818 and guides the paper 803 to the path 817. A paper detecting sensor 878 for detecting the paper 803 is provided between the rollers 876 and 877 in the path 871. Owing to the sensor 878, the improvement of the control accuracy of conveying the paper 803 by use of the return conveying device 870 and the detection of the paper jamming can be effectively done.

Figure 49B:
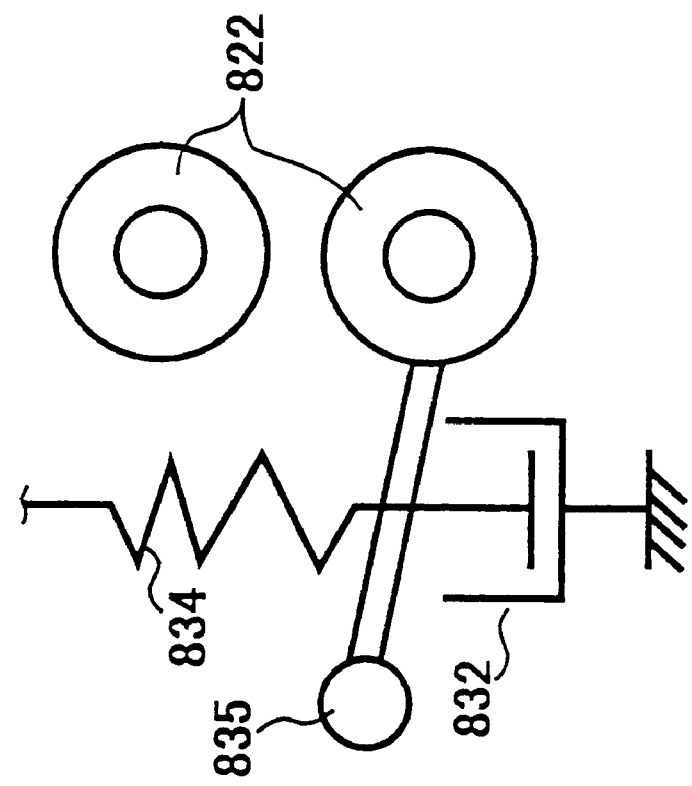
FIG. 49A and 49B are explanatory diagrams illustrating the mechanism of the conveying roller provided in the switch-back path of the image forming apparatus.
Figure 49A:
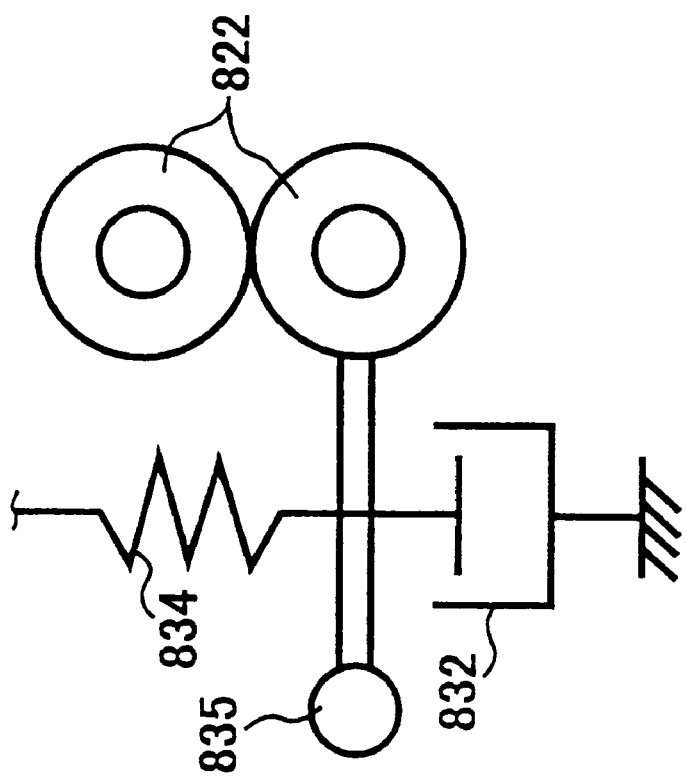

FIG. 49 is a diagram for illustrating the nipping mechanism between the conveying rollers 822, 822. As shown in FIG. 49A, the conveying roller 822 is energized by a spring 834 so as to bring the roller supported on the fulcrum among those rollers pairs into pressed contact with the other roller. The rollers pair can be released, as shown in FIG. 49B, by pulling the roller energized by the spring 834 with the solenoid 832.

FIG. 50 is a block diagram illustrating the electric connection of the control system for controlling the paper feeding device 805 and the return conveying device 870 in the image forming apparatus 801. In the control system, a motor driver 827 for driving the motor 826 for rotating the conveying roller 820, a motor driver 829 for driving the motor 828 rotating the conveying roller 821, a motor driver 831 for driving the motor 830 rotating the conveying roller 822, a solenoid driver 833 for driving the solenoid 832 for bringing into pressing contact and releasing the conveying roller 822, and a paper detecting sensor 823 are respectively connected to the microcomputer 825 for concentratedly controlling the entire portion of the image forming apparatus 801. In such a structure, the roller 820 in the path 818 and the other roller 821 in the path 819 are separately driven by the different motors 826 and 828, and thereby, the timings of conveying and stopping the paper 803 are separately taken independently by the path 818 and the other path 819. Moreover, a driver 883 for driving the motor 881 for operating the path changing-over device 873 and another driver 884 for driving the other motor 882 rotating the conveying rollers 874 through 877 are provided.

In the embodiment, the conveying rollers 874 through 877 are driven by one motor 882. The reason for that is that the paper conveying speed can be changed only with the above one motor, by utilizing the torque limiter with the structure as shown in FIG. 51 and FIG. 52.

Namely, the return conveying device 870 uses roller pairs (conveying rollers 74 through 77) for conveying the paper 803. On this occasion, it is necessary to set the distance between the respective rollers to a length shorter than the entire length of the paper 803, as a matter of course. In order to change the speed of conveying the paper 803, the speeds of all the roller pairs nippingly holding the paper 803 are increased or decreased. However, such a control gives rise to problems of having to add a motor speed changing circuit and the cost-up due to such an additional circuit. Thus, in this embodiment two rollers pairs of different conveying speeds and a torque limiter on either one of the rollers pairs are provided, in order to avoid the cost-up. The increase of the conveying speed can be done, utilizing the slip of the torque limiter, without changing the motor speed.

Figure 51B:
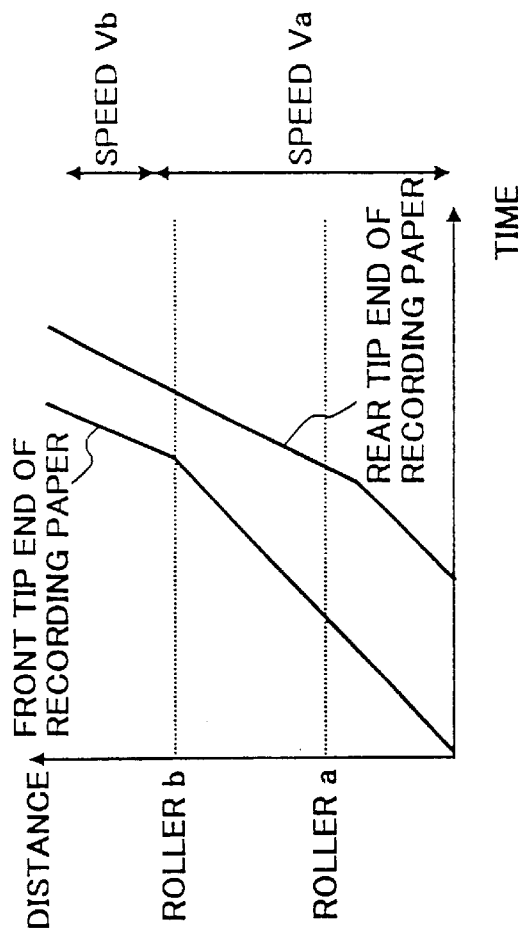
FIGS. 51A and 51B are explanatory diagrams illustrating the structure for changing the conveying speed by use of a torque limiter in the image forming apparatus and the speed changing property.
Figure 51A:
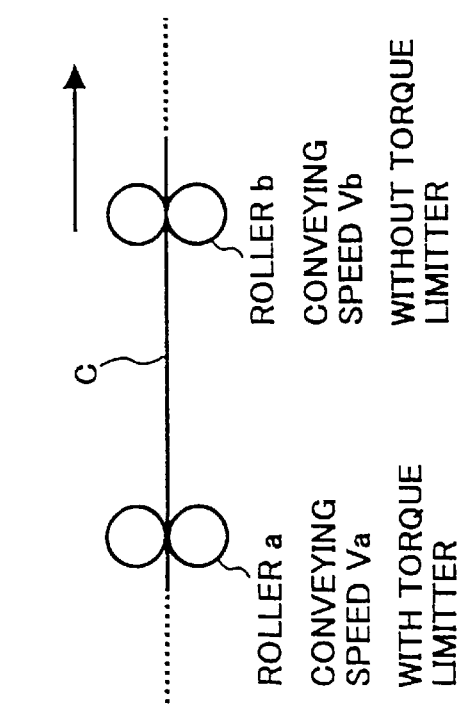
Figure 52B:
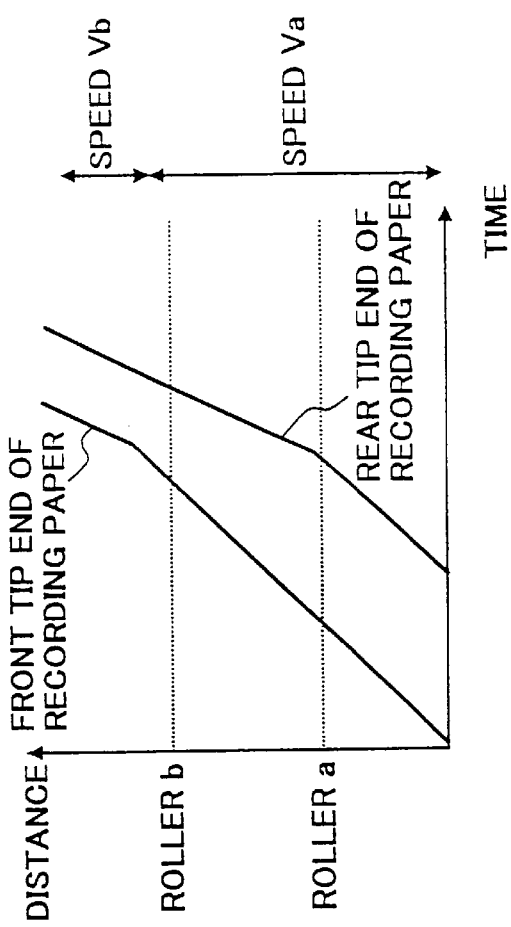
FIGS. 52A an 52B are explanatory diagrams illustrating the same structure and property.
Figure 52A:
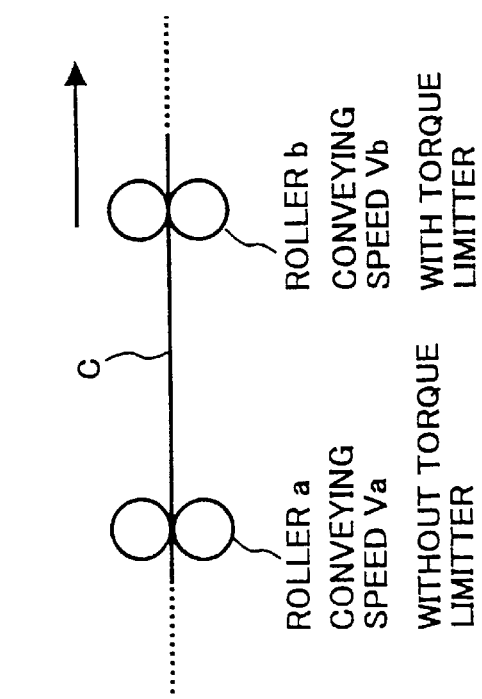
Figure 53:
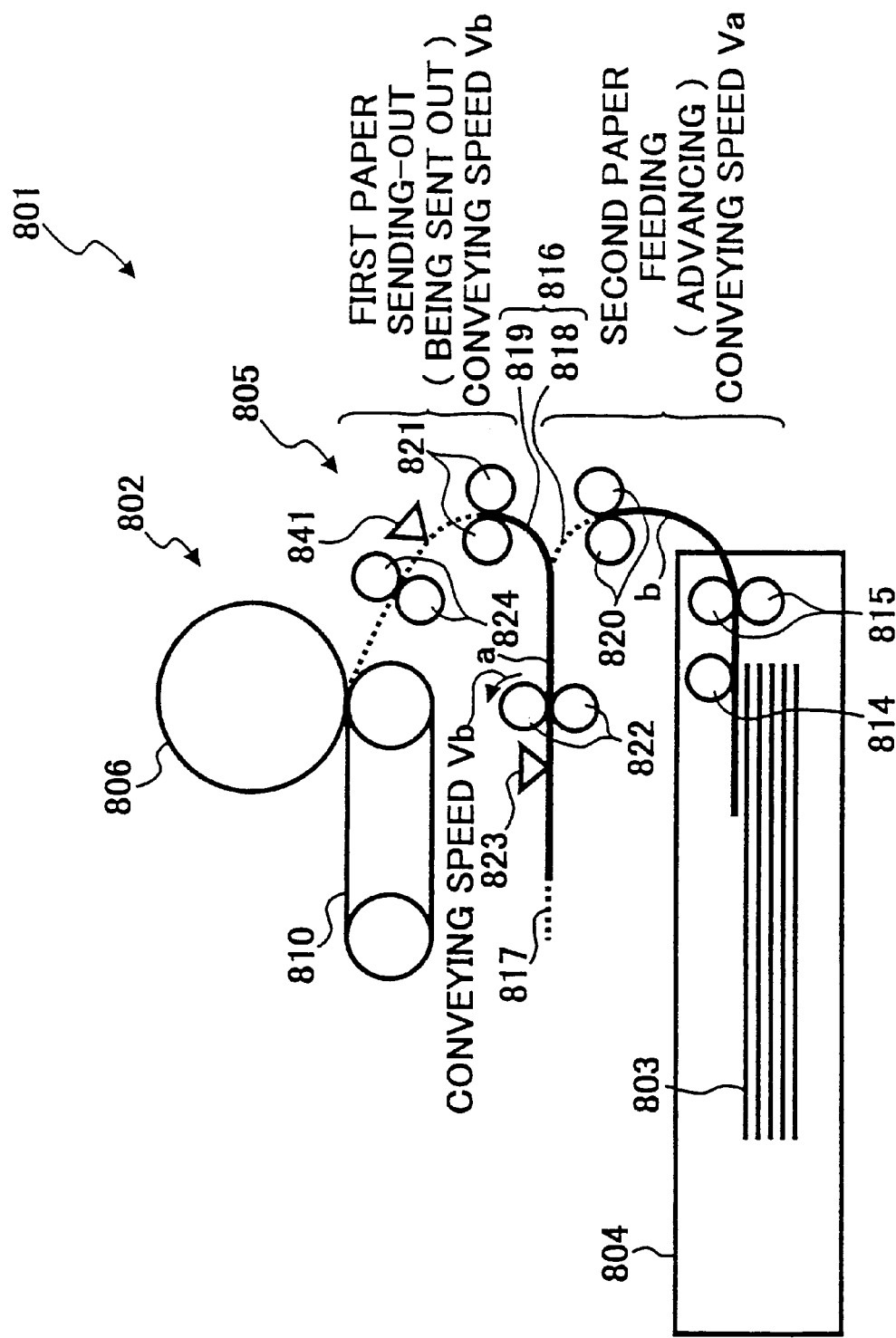
FIG. 53 is an explanatory diagram illustrating the time-elapsing paper conveyance state in the image forming apparatus of the embodiment.

Both of FIGS. 51 and 52 illustrate cases of conveying the recording paper c employing two couples of the rollers pairs a and b in either one of which a torque limiter is provided. In FIGS. 51 and 52, the conveying speed of roller A and that of roller B are respectively set to Va and Vb. In FIG. 51, a torque limiter is provided on the roller pair constructing the roller a at the upstream side in the paper conveying direction and no torque limiter is provided on that constructing the roller b at the downstream side therein. On the contrary, in FIG. 52, the torque limiter is provided on the roller pair constructing the roller b at the downstream side in the paper conveying direction and no torque limiter is provided on that constructing the roller a at the upstream side therein. On both occasions, the structure thereof is shown in FIGS. 51A and 52A, and the property thereof is shown in FIGS. 51B and 52B. In the structure of FIG. 51, the paper is conveyed with the conveying speed Vb at the time point when the front tip end of the paper c arrives at the roller b. In the structure of FIG. 52, the paper is conveyed with the conveying speed Vb at the time point when the rear tip end of the paper c passes through the roller a.

Moreover, in the example shown in FIG. 51, a one-way clutch can also be used instead of the torque limiter. However, in the case of decreasing the conveying speed, since the bending or flexion occurs on the paper c, the speed conversion by use of such a simple structure cannot be realized. It is necessary to change the speed by use of the motor or to provide the structure capable of tolerating the bending or flexion of the paper c.

By using the device as mentioned heretofore, the conveying rollers 874 through 877 can individually set the conveying speed of the paper 803 even though the single motor 882 drives the respective rollers 874 through 877. Needless to mention, specially used motors can individually drive the rollers, respectively.

Next, the paper feeding device 805 is explained hereinafter.

Figure 57:
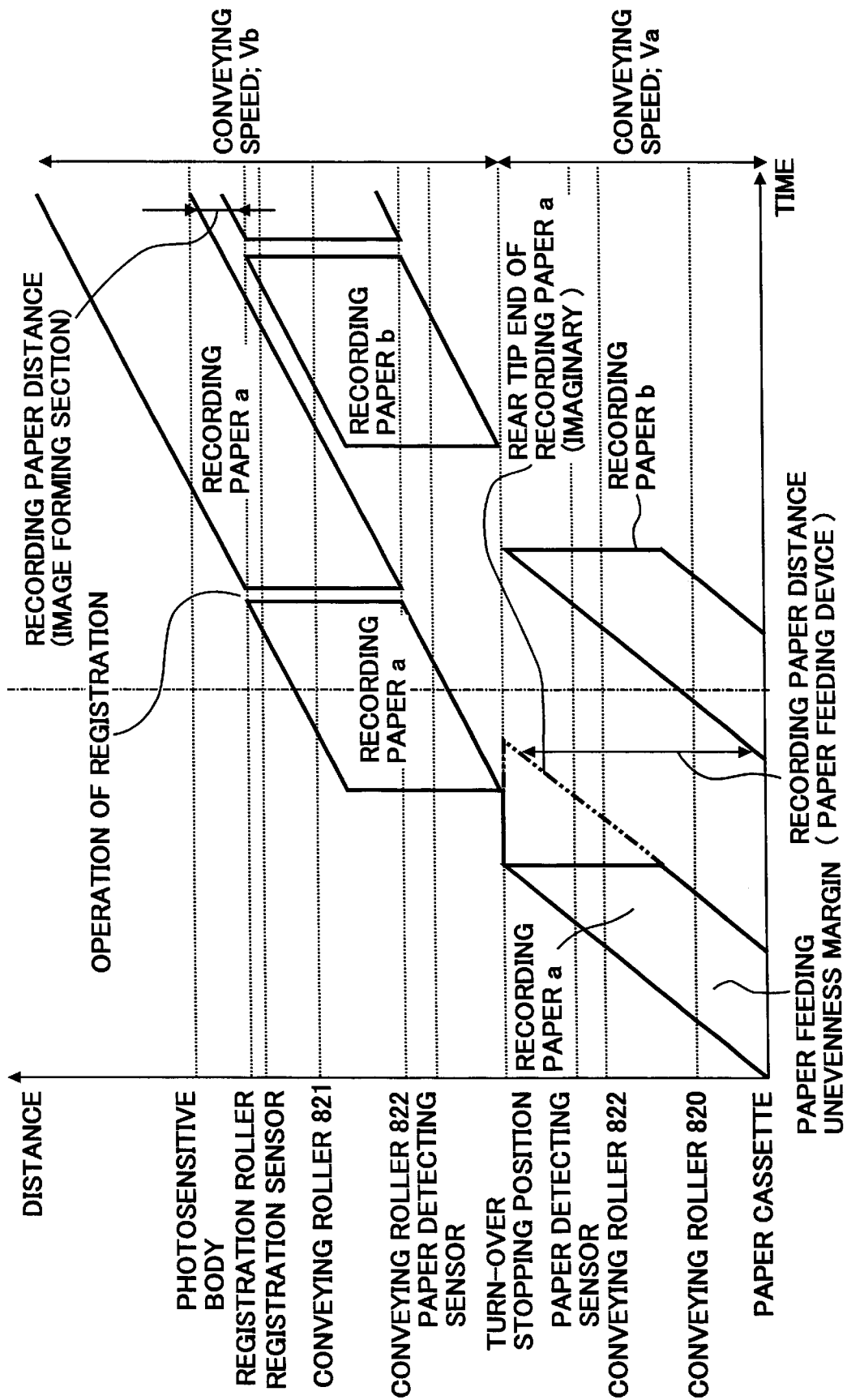
FIG. 57 is a diagram illustrating the paper conveyance in the image forming apparatus.

FIGS. 53 through 56 illustrate the states of conveying the paper 803 by use of the paper feeding device 805 in the order of the FIG. numbers following the time elapsing. FIG. 57 is a diagram illustrating the conveyance of the paper 803. In FIG. 57, since the front tip end of the paper 803 in the advancing direction is described as the front tip end of the paper 803, the position of the front tip end of the paper 803 is expressed so as to apparently move by the entire length of the paper 803, accompanying the conversion of the advancing direction of the paper 803, before and after the switch-back of the paper 803 in the switch-back path 817. Furthermore, since there exists a common section of the switch-back path 817 before and behind the stopping position (hereinafter referred to as the "turning-over stop position") of the paper 803 in the switch-back path 817, FIG. 57 expresses the paper conveyance such that same paper detecting sensor 823 and the same conveying roller 822 respectively appear twice.

In this example, the paper feeding unevenness is eliminated during the time period when the paper 803 stops on the paper turning-over/stopping position. Since the paper conveying unevenness becomes small on the position subsequent to (behind) the paper turning-over/stopping position, the time of the registration operation can be completed for a very short time.

Figure 54:
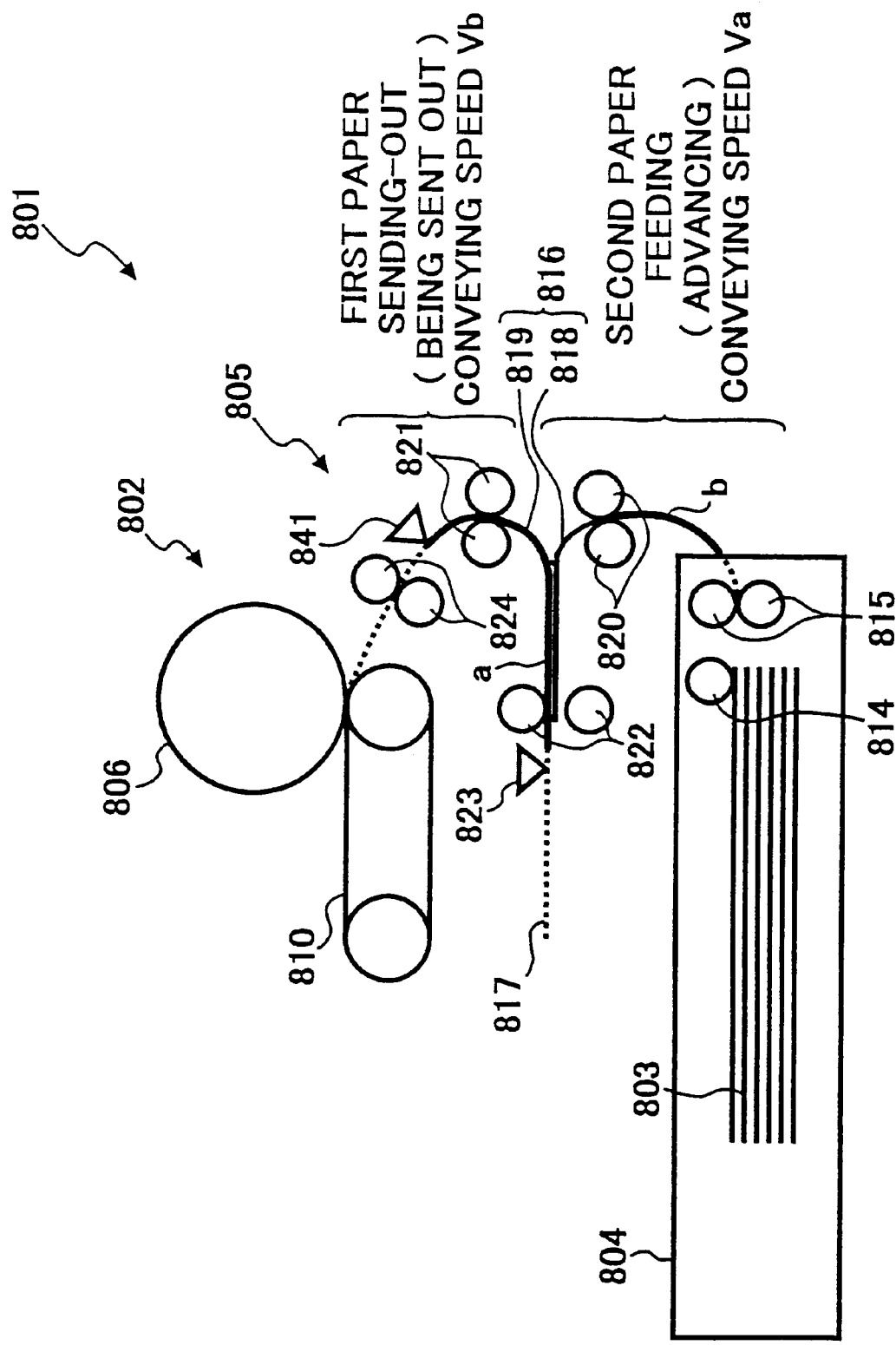
FIG. 54 is another explanatory diagram illustrating the time-elapsing paper conveyance state in the image forming apparatus of the embodiment.

As shown in FIG. 54, hereinafter, among the recording papers 803 successively conveyed to the printer engine 2 from the paper feeding device 805, the leading paper is referred to as "paper a", the paper just subsequent to the paper a is referred to as "paper b", and the paper further just subsequent to the paper b is referred to as "paper c".

In FIG. 54, assuming that the paper a is conveyed as it is without being switched back, the distance between the recording papers 803, 803 at the separation roller 815 may become very wide. In the eleventh embodiment, the distance therebetween at the engine 802 at the time of successively conveying the paper 803 can be necessarily converted to a very narrow distance. Consequently, the productivity of the image formation can be further improved.

As shown in FIGS. 53 through 56 with the time elapsing, in the present embodiment, the conveying rollers 820 through 822, the paper feeding roller 814, and the separation roller 815 are respectively controlled, and the timing of the start of sending-out of the preceding paper a from the switch-back path 817 toward the printer engine 802 with the start of sending-out of the just subsequent paper b from the paper cassette 804 toward the switch-back path 817 is taken in order to realize the first control device. Thereby, the preceding paper a and the just subsequent paper b following the paper a and accommodated in the switch-back path 817 are at least partially superposed on each other in the switch-back path 817, as shown in FIG. 54.

Figure 55:
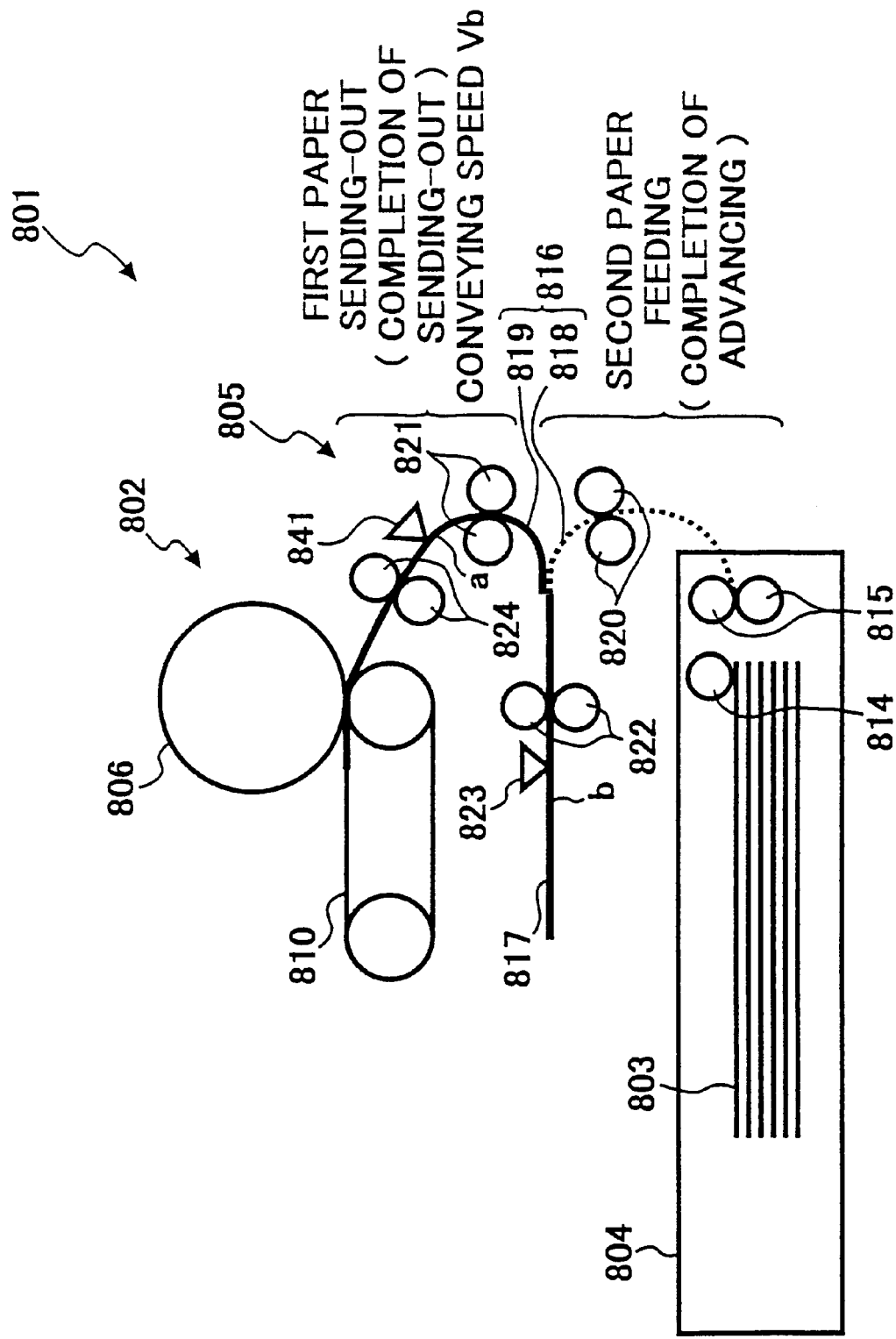
FIG. 55 is still another explanatory diagram illustrating the time-elapsing paper conveyance state in the image forming apparatus of the embodiment.
Figure 56:
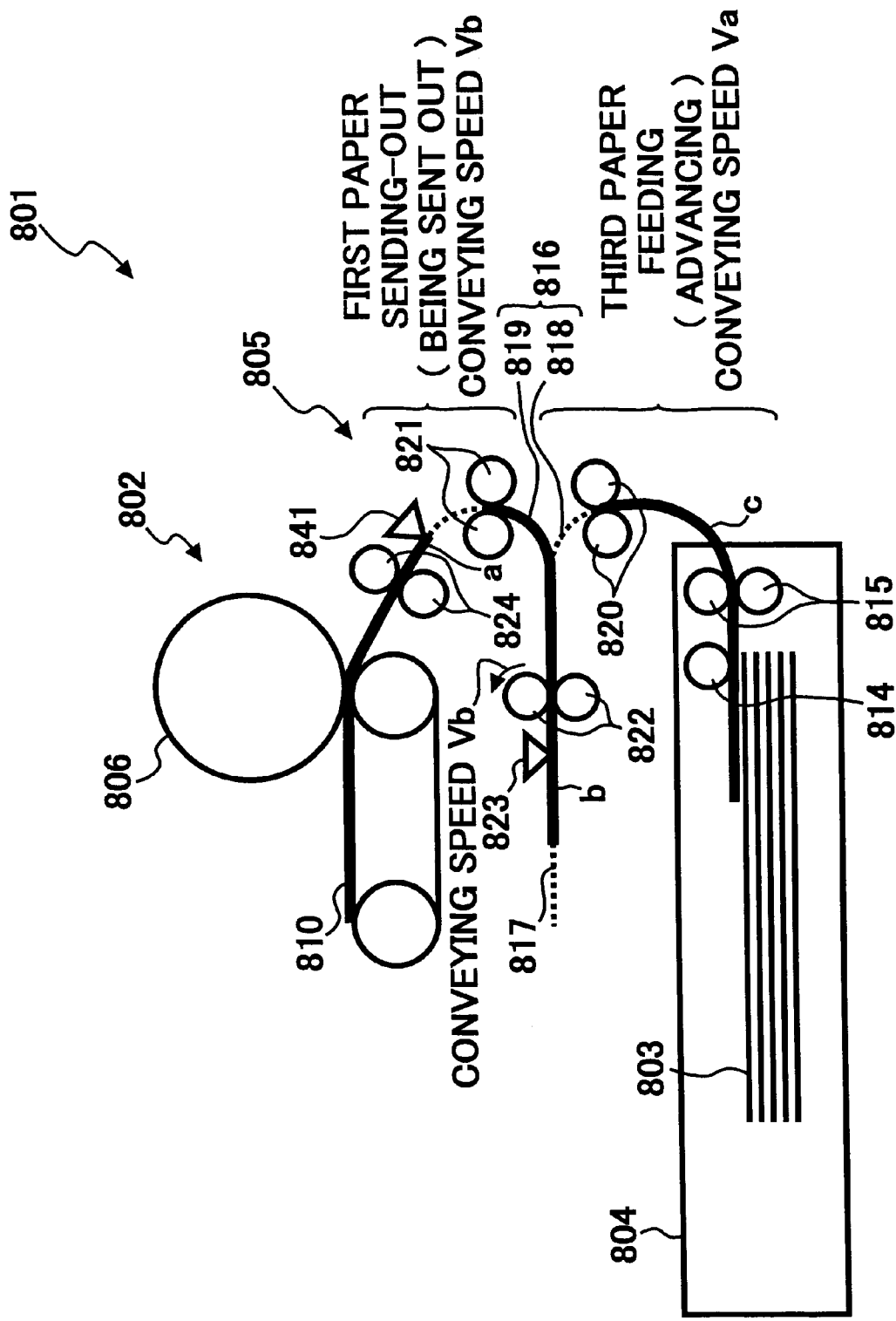
FIG. 56 is still another explanatory diagram illustrating the time-elapsing paper conveyance state in the image forming apparatus of the embodiment.

On this occasion, the nipping state of the conveying roller 822 is released with the timing of superposing the paper a being sent out and the paper b starting to advance into the switch-back path 817 on each other such that the papers a and b can be intersecting with each other, as shown in FIG. 54. Thereafter, the conveying roller 822 is closed with the timing of completing the sending-out of the paper a. At this time, the accommodation of the paper b into the switch-back path 817 is completed, as shown in FIG. 55.

As shown in FIGS. 54, it is desirable to perform the superposition of the papers a and b, so as to superpose the rear tip end side of the preceding paper a in the conveying direction and the front tip end side of the just subsequent paper b in the same conveying direction on each other. Owing to the superposition of the papers a and b, the distance between the preceding paper a and the just subsequent paper b can be largely shortened, compared with the care before the occurrence of the superposition; see the comparison of FIG. 54 with FIG. 56, and refer to FIG. 57.

The preceding paper a and the just subsequent paper b are superposed on each other, by performing the control operation as mentioned heretofore. Consequently, the distance between the paper a and b can be sufficiently shortened, and thereby the high-speed successive paper feeding can be intended to realize.

On this occasion, as shown in FIG. 54, if the rear tip end side of the paper a and the front tip end side of the paper b are superposed on each other, the just subsequent paper b advancing into the switch-back path 817 is guided so as to go along the paper surface of the preceding paper a. Therefore, it is not necessary to specially prepare the device for prescribing the movement path of the preceding paper a and the just subsequent paper b intersecting with the paper a in the switch-back path 817. Consequently, the apparatus can be simplified and small-sized and thereby, the manufacturing cost can be reduced.

Figure 58:
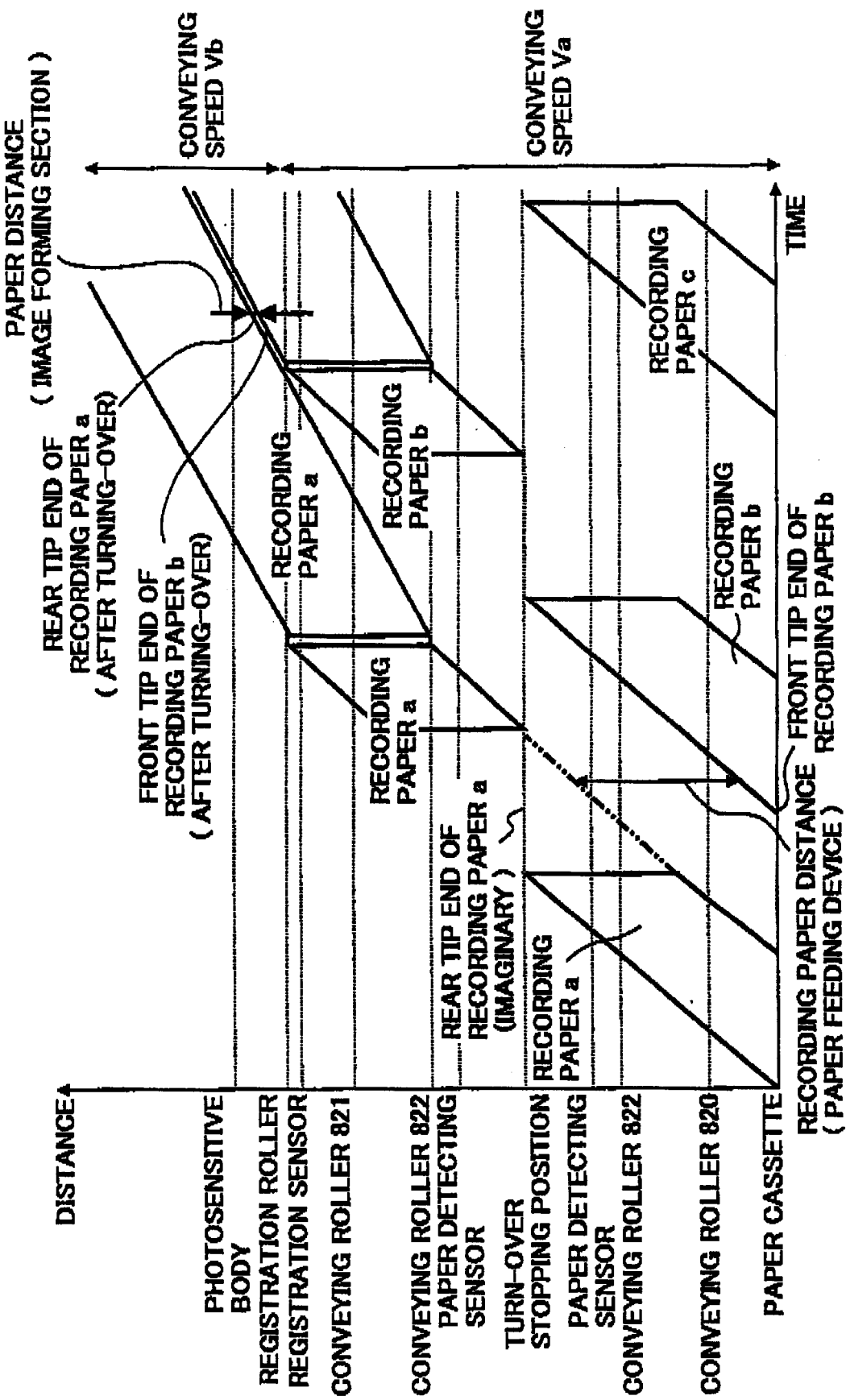
FIG. 58 is another diagram illustrating the paper conveyance.

Furthermore, it may be allowed that, as shown in the diagram illustrating the conveyance of the paper 803 in FIG. 58, the paper 803 after being sent out from the switch-back path 817 is further conveyed also with the conveying speed Va until arriving at the registration roller 824, and after passing through the registration roller 824 the paper 803 is conveyed with the conveying speed Vb lower than the conveying speed Va. Consequently, the paper distance in the area from the switch-back path 817 to the registration roller 824 can be enlarged. Thereby, the stabilization of the paper conveyance such as the detection of the paper jamming can be intended to realize.

Next, the operation of the return conveying device 870 is described hereinafter.

Figure 59:
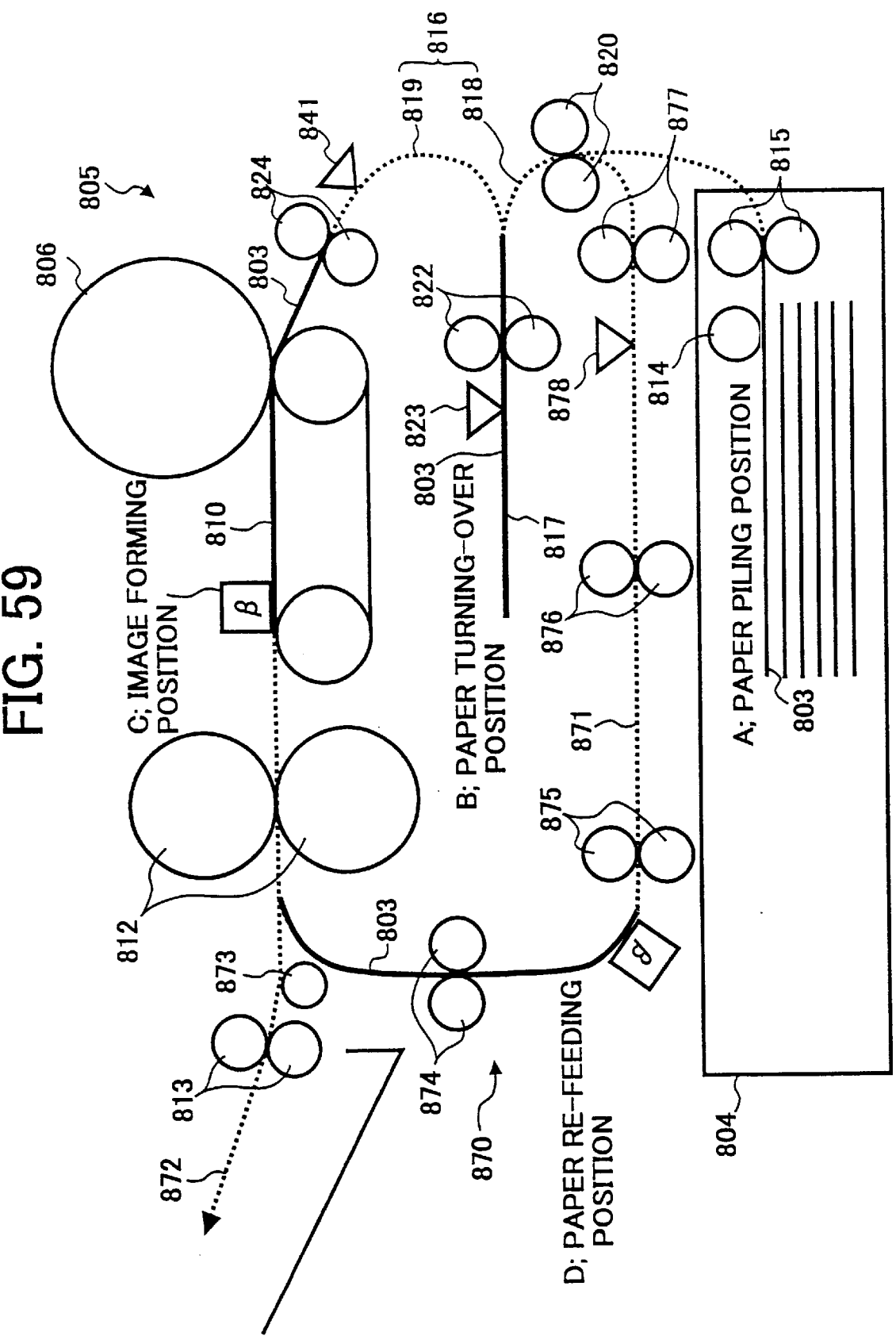
FIG. 59 is explanatory diagram illustrating the first half portion of the paper conveying process at the time of performing the both-surfaces printing in the image forming apparatus.
Figure 60:
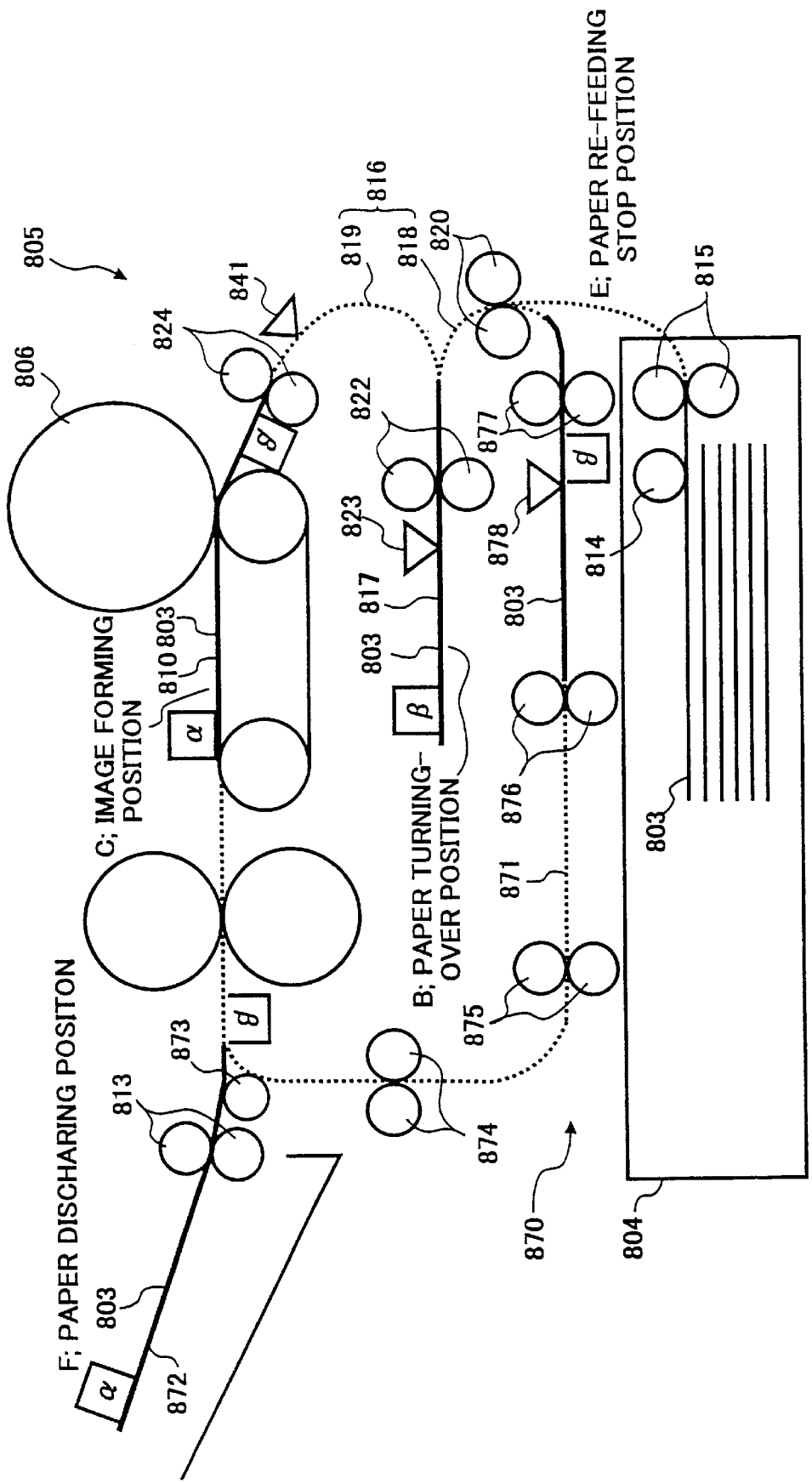
FIG. 60 is an explanatory diagram illustrating the second half portion thereof.

FIGS. 59 and 60 are explanatory diagrams for illustrating the operation at the time of forming the image on the both surfaces of one sheet of the paper 803. In FIGS. 59 and 60, the symbols "'" and "$" respectively represent the front surface and the rear surface of the paper 803. Namely, as shown in FIGS. 59 and 60, the paper 803 follows up the paths in the order of ABCDEBCF. The symbols A–F represent the positions respectively as mentioned below. The paper 803 is conveyed through the above paths, and the image is formed on the both surfaces of the paper 803 as follows:

A: Position of piling the Recording Paper;
B: Position of turning over the Recording Paper;
C: Position of forming the Image;
D: Position of re-feeding the Paper;
E: Position of stopping the Paper Re-feeding;
F: Position of discharging the Paper.

Namely, the recording paper 803 guided from the paper piling position A of the paper cassette 804 to the conveying roller 820 temporarily stops on the paper turning-over position B in the switch-back path 817. Thereafter, the paper 803 is switched back therefrom and sent out toward the printer engine 802 by the conveying roller 822. The roller 822 temporarily stops the conveyance of the paper 803 on the position brought into direct contact with the registration sensor 841, and takes the timing with the position of the toner image visualized on the photosensitive body 806 and sends out the paper 803 with the above timing.

The recording paper 803 having the image formed on the one-side surface (rear surface) by the printer engine 802 is directed to the conveying path 871 (re-feeding position D) by the path changing-over device 873 and stopped on the re-feeding stop position E. Thereafter, the timing with the next (subsequent) paper 803 is adjusted and thereafter the former (preceding) paper 803 is sent out again to the switch-back path 817. The same (preceding) paper 803 is sent out onto the image forming position C through the paper turning-over position B and the image is formed once again on the image forming position C at the other side of the paper surface (front surface). The paper 803 thus image-formed on the both surfaces thereof is discharged to the side of the paper discharging position F by the path changing-over device 873.

Figure 61:
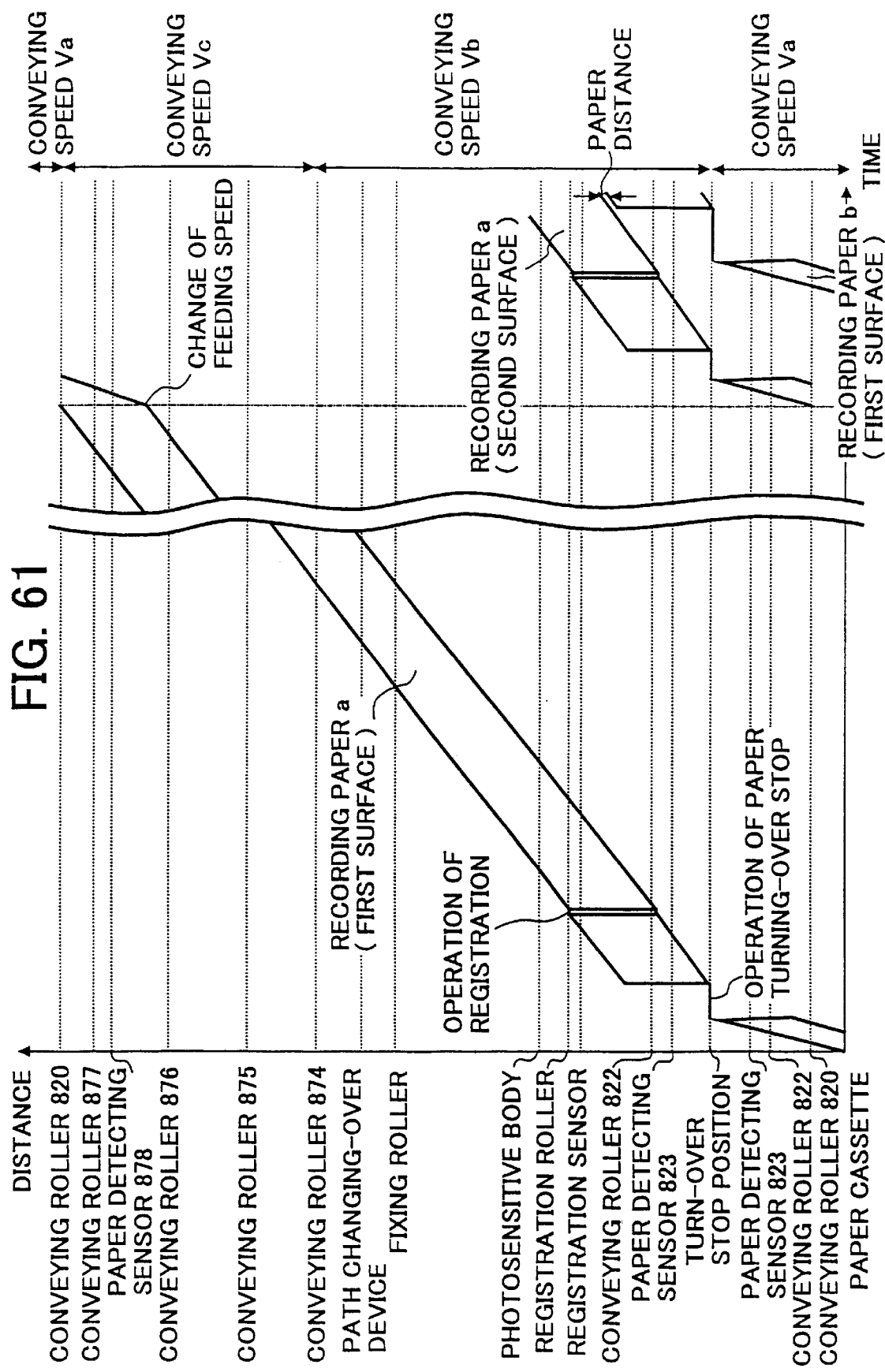
FIG. 61 is a diagram illustrating the paper conveyance in the image forming apparatus.

FIG. 61 is a diagram illustrating the conveyance of the paper 803 in the case of performing the both-surfaces printing for the single paper 803. Only by providing the return conveying device of the simple structure in the image forming apparatus 801 having the paper feeding apparatus 805, the switch-back path 817 provided in the paper feeding device 805 in order to shorten the paper distance between the preceding paper 803 and the subsequent paper 803 can be commonly used as the paper turning-over section for performing the both-surfaces printing. Consequently, the apparatus for performing the both-surfaces image formation can be intended to small-size, and the manufacturing cost can be also reduced.

Furthermore, the paper conveyance timing in the paper feeding device 805 is the one same as the timing mentioned before referring to the FIGS. 53 through 58. Therefore, the paper distance between the preceding paper a and the just subsequent paper b can be sufficiently shortened.

Figure 62:
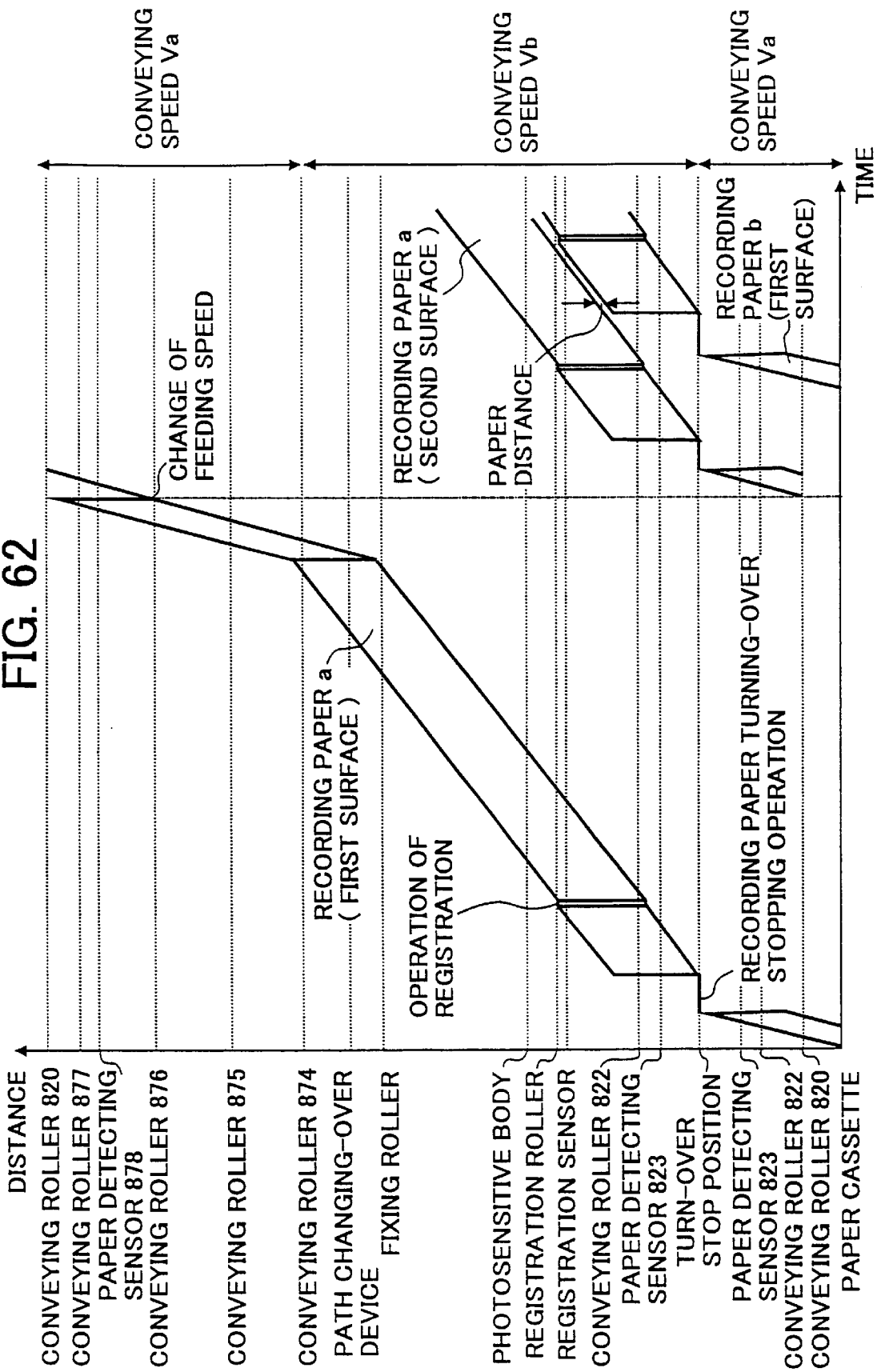
FIG. 62 is another diagram illustrating the paper conveyance in the image forming apparatus.

According to the both-surfaces printing as shown in FIG. 61, the image forming apparatus is capable of forming the both-surfaces image with a small structure and at low cost. However, the productivity thereof is not as high as possible. In such a situation, if the productivity at the time of forming the both-surfaces image is intended to raise, for instance, as shown in the diagram of FIG. 62, when the rear tip end of the paper 803 passes through the fixing roller 812 and the paper 803 can be conveyed at that time by the action of the conveying force of the conveying roller 874, the paper 803 is conveyed with the high speed Vc, and then, the paper conveying speed is lowered to the low speed Va which is the conveyance speed of the conveying roller 820 at the time point when the front tip end of the paper 803 arrives at the conveying roller 820.

As mentioned before, if the torque limiter is provided on the conveying roller 874, the change (increase/decrease) of the conveying speed can be simply done. However, in the case of lowering the speed, it is necessary to change the conveying speed of the conveying roller 877 or to realize the structure capable of preventing the occurrence of the paper jamming even though the bending or flexion occurs.

By performing such paper conveyance, the paper distance between the papers at the time of practicing the both-surfaces printing can be largely shortened, compared with the conveying method as illustrated in FIG. 61. As in the example of FIG. 61, the paper distance between the papers a and b can be sufficiently shortened.

Figure 63:
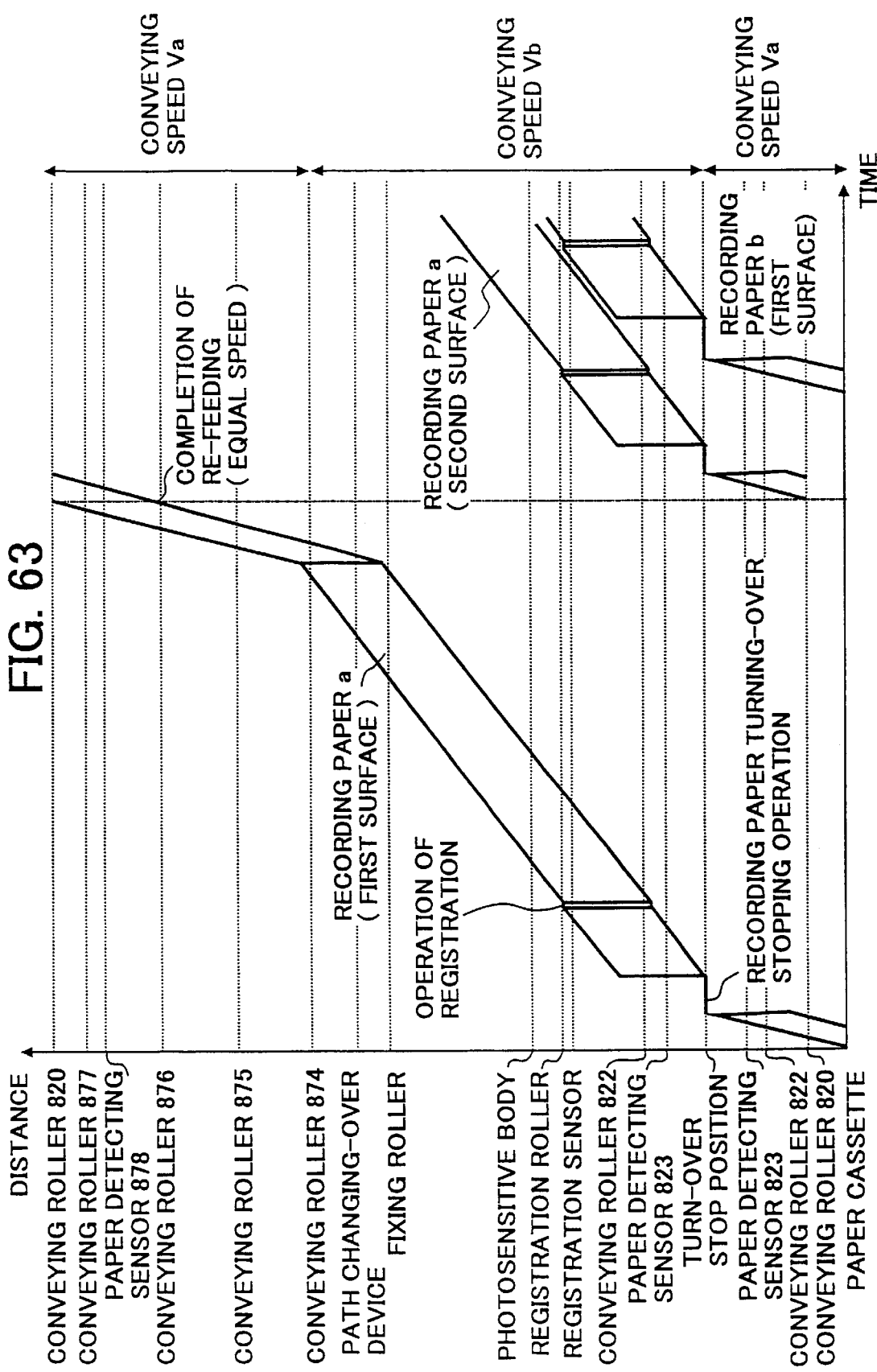
FIG. 63 is still another diagram illustrating the paper conveyance in the image forming apparatus.

In the example of FIG. 63, the paper conveying speed created by the conveying rollers 874 through 877 is almost approximated to the paper conveying speed $V_a$ created by the paper feeding device 805. Owing such approximation of the both speeds, the paper distance between the recording papers for forming the image on the both surfaces thereof can be largely shortened, compared with the case of FIG. 61. Furthermore, even in the case of intending to improve the productivity, it is not necessary to prepare the aforementioned structure employed at the time of lowering the speed. In addition, it may be possible to maintain a small-size in the apparatus and to reduce the manufacturing cost.

In the both-surfaces printing as shown in FIG. 63, since the paper conveying speed of the printer engine 802 is controlled by the action of the image forming operation, it is impossible to avoid the enlargement of the paper distance corresponding to the image forming period.

Figure 64:
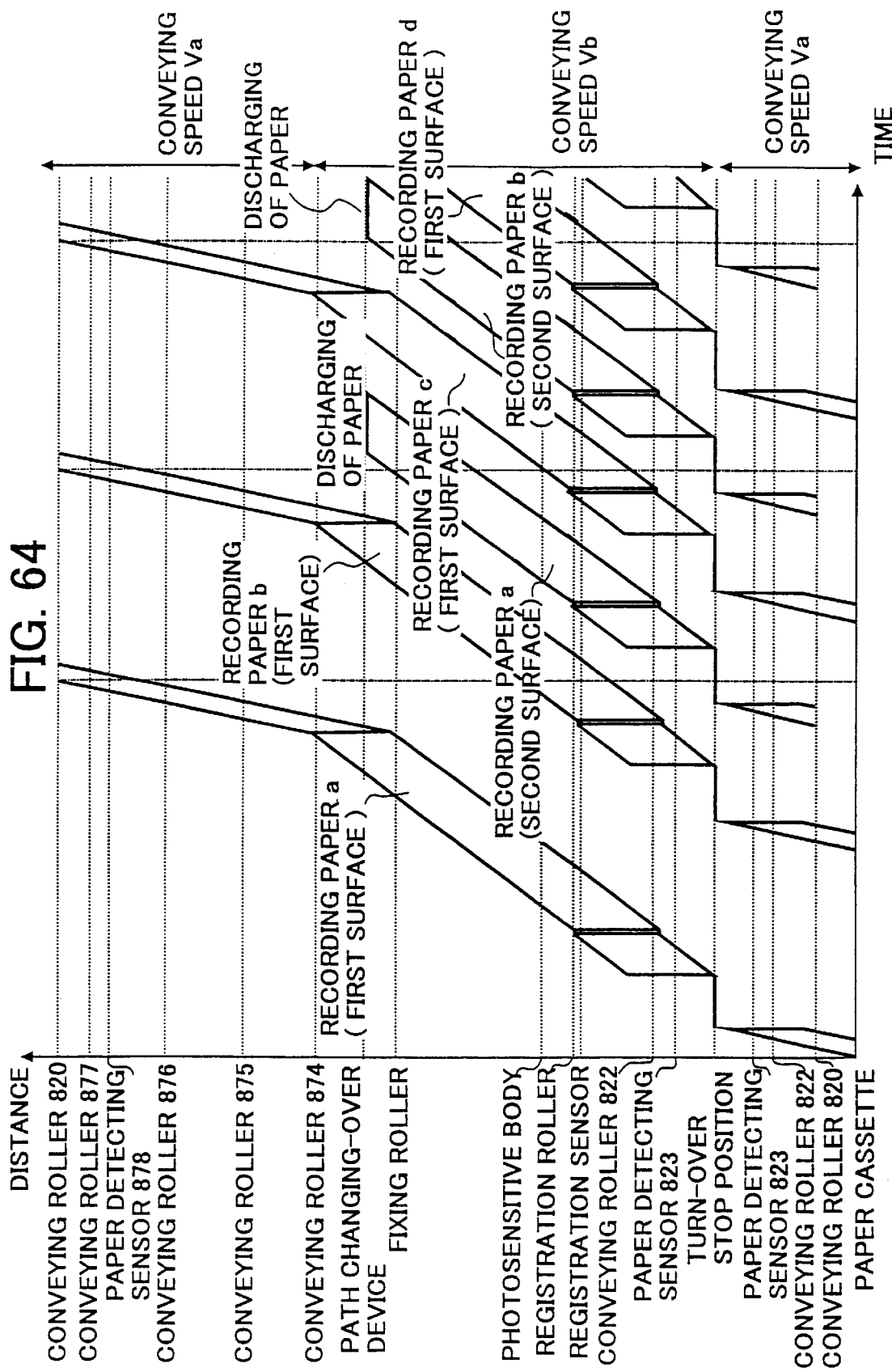
FIG. 64 is still another diagram illustrating the paper conveyance in the image forming apparatus.

FIG. 64 is a diagram illustrating the example of further shortening the both-surfaces image formation distance between the respective single paper 803 and performing the both-surfaces printing of the further superior productivity. Namely, in the example, the both-surfaces image formation distance between the respective single paper 803 is largely shortened, and after the image formation is performed on the first surface of the recording paper for the two sheets of paper a and b successively supplied from the paper cassette 804, the control is done such that the image is formed on the second surface of the preceding paper a and the image is formed on the first surface of the just subsequent paper c (which is supplied from the paper cassette 804 as the paper subsequent to the paper b). Thereafter, the image formation on the second surface and that on the first surface are alternately repeated in the same way as mentioned above. Consequently, the distance between the recording paper can be largely shortened at the time of the both-surfaces printing, and thereby the improvement of the productivity can be effectively intended.

In such a way, the second control device can be realized. In the case of performing the image formation by conveying the recording paper 803 in accordance with the diagram of FIG. 64, when the long-term timing compensation has to be done for the reason of the printer engine side 802 during the time period of successively performing the both-surfaces printing, at least two sheets of the paper 803 are on the halfway of the conveyance on the conveying path 871. However, after the paper conveyance is continued, respectively, onto the stopping position of the paper 803 after the registration operation, and onto the paper turning-over position B, the paper 803 is put in the stopping state. Consequently, any troublesome matters such as paper jamming do not occur at all.

FIG. 65 is a diagram illustrating an example of performing paper conveyance in consideration of the further superior productivity compared with the case of the diagram in FIG. 63. According to the process of the paper conveyance shown in the diagram of FIG. 65, the control operation is done such that, after the paper detecting sensor 878 detects the front tip end of the re-fed paper 803, all of the rotations of the conveying rollers 874 through 877 are stopped. Thereafter, the paper conveyance is further practiced in accordance with the diagram shown in FIG. 63.

Namely, to state more concretely, after successively practicing the image formation on the first surface of the paper 803 by the successive three pages (papers a, b, and c), the papers 803 are alternately supplied to the printer engine 802 in the order as shown below.

First Paper a (Second Surface), Paper d [Paper subsequent to Paper c] (First Surface) Paper b (Second Surface) Paper e [Paper subsequent to Paper d] (First Surface) Paper c (Second Surface) Paper f [Paper subsequent to Paper e, not shown in FIG. 65] (First Surface) Paper d (Second Surface)

For this reason, after the image forming operation on the first surface of the paper c, the both-surfaces printing can be done with very short paper distance to the same extent as that of the one-surface printing. Consequently, the improvement of the productivity can be sufficiently realized in the case of the both-surfaces printing.

Moreover, when the long-term timing compensation as mentioned before occurs, at maximum three sheets of the papers 803 are put on the halfway of the paper conveyance. However, since there is provided the re-feeding stop position E in addition to the aforementioned paper stopping position, troublesome matters do not occur at all. The stop of the paper conveyance on the re-feeding stop position E realizes the third control device.

Furthermore, although the example of successively performing the image formation on the first surface of the successive three pages in the beginning is illustrated in the example of FIG. 65, it may be possible to prepare the image forming apparatuses for more than four pages and the stop positions of the number corresponding to the pages number in order to obtain the same functional effect. Furthermore, it may be also possible to construct the apparatus such that, corresponding to the change of the paper size, the sheet number of the paper for firstly forming the image on the first surface thereof, the paper conveying speed, and the number of the stop position are respectively made variable, and thereby the optimum productivity can be realized.

In such a situation, since a line printer such as the ink jet printer, etc. can easily stop the image formation corresponding to the distance of the paper, there is no fear that the printer engine is deteriorated. However, in the electrophotographic-type image forming apparatus, for instance, such as the page printer, e.g., the laser beam printer, the image formation cannot be temporarily stopped corresponding to the paper distance. As a result, the photosensitive body inevitably rotates idly.

For this reason, although the optical writing of the electrostatic latent image is not performed, the overall operation is successively performed and not stopped. Therefore, after all, the life span of the printer engine is gradually deteriorated as in the case of the image formation. Namely, regardless of the image formation, the accumulation of the operating time turns out to exert an influence to the life span of the printer engine as it is.

Furthermore, at present, the technology of the high-speed printer is mainly constructed with the digital electric photographic method. However, for instance, in the image forming apparatus performing the digital optical writing such as the laser beam printer, since the upper limit of the image forming speed is determined by the factor represented by the rotations number of the polygon motor, it is difficult to intend to perform the improvement of the paper conveying speed.

However, in the present embodiment, since the paper distance can be largely shortened not only for the one-surface printing but for the both-surfaces printing, an idly-running period of the apparatus for the recording paper distance can be also largely shortened, and thereby deterioration of the life span of the printer engine 802 at the time of performing the printing operation can be avoided or reduced.

Furthermore, by largely shortening the idly-running period for the paper distance at the time of performing the both-surfaces printing, it is possible to improve the speed of the both-surfaces successive printing keeping the same paper conveying speed. Furthermore, in the small-sized image forming apparatus provided with the paper feeding device 5 from the beginning, only by further adding the return conveying device 870 to the apparatus, it may be possible to lengthen the life span of the apparatus and improve the paper conveying speed. Consequently, it turns out to be possible to provide the both-surfaces image forming apparatus of low manufacturing cost and superior productivity.

Furthermore, according to the other aspect of the invention, since the preceding recording paper and the other recording paper just subsequent thereto are superposed on each other in the temporary paper accommodating section, the distance between the preceding paper and the just subsequent paper can be sufficiently shortened, and thereby the further high-speed successive paper feeding can be realized, compared with the case in which the preceding paper is switched back and sent toward the printer engine and thereafter the just subsequent paper is sent to the temporary paper accommodating section. Moreover, by switching back the recording paper in the temporary paper accommodating section, various treatments and processing can be performed for the image formation on the recording paper, compared with the case of directly feeding the paper to the printer engine without such a switch-back operation.

Furthermore, since the image forming apparatus is constructed such that the paper feeding apparatus and the return conveying apparatus for performing the both-surfaces image formation are commonly employed as the temporary paper accommodating section, the manufacturing cost can be intended to reduce owing to the small-sizing of the apparatus and the parts number reduction. In addition, since the just subsequent paper advancing to the temporary paper accommodating section is guided so as to go along the preceding paper, it is not necessary to specially provide the device for prescribing the movement path of the just subsequent paper intersecting with the preceding paper in the temporary paper accommodating section.

Or otherwise, in the case of nullifying the distance between the rear tip end of the preceding paper and that of the just subsequent paper (coinciding the former with the latter), the functional effects similar to the above case can be also expected.

The preferred embodiments of the present invention have been described heretofore. However, numerous additional modifications and variations of the present invention are possible in light of the above teachings. It is therefore to be understood that, within the scope of the appended claims, the present invention may be practiced otherwise than as specifically described herein. For instance, although the control device performs the control operation such that the preceding paper and the just subsequent paper are at least partially superposed on each other in temporary paper accommodating section, it may be allowable that the control device performs the control operation such that the distance between the preceding paper and the just subsequent paper is nullified.

What is claimed as new and is desired to be secured by Letter Patent United States is:

1. An image forming apparatus comprising:
   a paper feeding section configured to separate and feed piled recording paper;
   an image forming section configured to form images in order on said fed recording paper;
   a paper turning-over section configured to switch back said recording paper on a paper conveying path extending from said paper feeding section to said image forming section and to turn over a front tip end of said recording paper and a rear tip end of said recording paper;
   a paper re-feeding section configured to re-feed said recording paper having the image formed on a first side surface thereof by said image forming section to said image forming section; and
   wherein said recording paper is turned over from said paper re-feeding section to said image forming section and is fed again to said image forming section, and
   wherein, after formation of images on plural pages of said first surface of said recording paper, said recording paper re-fed from said paper re-feeding section and said recording paper fed from said paper feeding section are set so as to alternately advance to said paper turing-over section.

2. The image forming apparatus as defined in claim 1, wherein a conveying speed of said paper re-feeding section is higher than a conveying speed of said image forming section.

3. The image forming apparatus as defined in claim 1, wherein a paper conveying speed of said paper re-feeding section is substantially equal to a conveying speed of said paper feeding section.

4. The image forming apparatus as defined in claim 1, wherein a paper re-feed stopping position is provided to temporarily stop re-feeding of said recording paper to said paper re-feeding section; and
   wherein a timing is controlled so as to cause said recording paper to advance to said paper turning-over section from the paper re-feeding path.

5. The image forming apparatus as defined in claim 1, wherein said image forming section comprises an electrophotographic image forming section.

6. The image forming apparatus as defined in claim 1, wherein said image forming section comprises a digital electrophotograph image forming section provided with a digital writing-in section.

7. An image forming apparatus comprising:
   paper feeding means for separating and feeding piled recording paper;
   image forming means for forming images in order on said fed recording paper;
   paper turning-over means for switching back said recording paper on a paper conveying path extending from said paper feeding means to said image forming means and turning over a front tip end of said recording paper and a rear tip end of said recording paper;

paper re-feeding means for re-feeding said recording paper having the image formed on a first side surface thereof by said image forming means to said image forming means; and wherein said recording paper is turned over from said paper re-feeding means to said image forming means and is fed again to said image forming means, and wherein, after formation of images on plural pages of said first surface of said recording paper, said recording paper re-fed from said paper re-feeding means and said recording paper fed from said paper feeding means are set so as to alternately advance to said paper turning-over section.

8. The image forming apparatus as defined in claim 7, wherein a conveying speed of said paper re-feeding means is higher than a conveying speed of said image forming means.

9. The image forming apparatus as defined in claim 7, wherein a paper conveying speed of said paper re-feeding means is substantially equal to a conveying speed of said paper feeding means.

10. The image forming apparatus as defined in claim 7, wherein a paper re-feed stopping position is provided for temporarily stopping re-feeding of said recording paper to said paper re-feeding means; and wherein a timing is controlled for causing said recording paper to advance to said paper turning-over means from the paper re-feeding path.

11. The image forming apparatus as defined in claim 7, wherein said image forming means comprises an electrophotographic image forming means.

12. The image forming apparatus as defined in claim 7, wherein said image forming means comprises a digital electrophotographic image forming means provided with a digital writing-in means.

13. A method of forming an image in an image forming apparatus comprising the steps of:

separating and feeding piled recording paper by use of a paper feeding section;

forming images in order on said fed recording paper by use of an image forming section;

switching back said recording paper on a paper conveying path extending from said paper feeding section to said image forming section;

turning over a front tip end of said recording paper and a rear tip end of said recording paper; and re-feeding said recording paper having the image formed on a first side surface thereof by said image forming section to said image forming section, wherein said recording paper is turned over from said paper re-feeding section to said image forming section and is fed again to said image forming section, and wherein, after formation of images on plural pages of said first surface of said recording paper, said recording paper re-fed from said paper re-feeding section and said recording paper fed from said paper feeding section are set so as to alternately advance to said paper turning-over section.

14. The method of forming the image as defined in claim 13, wherein a conveying speed of said paper re-feeding section is higher than a conveying speed of said image forming section.

15. The method of forming the image as defined in claims 13, wherein a paper conveying speed of said paper re-feeding section is substantially equal to a conveying speed of said paper feeding section.

16. The method of forming the image as defined in claim 13, wherein a paper re-feed stopping position is provided to temporarily stop re-feeding of said recording paper to said paper re-feeding section; and wherein a timing is controlled so as to cause said recording paper to advance to said paper turning-over section from the paper re-feeding path.

17. An image forming apparatus comprising:

a printer engine configured to form an image on recording paper;

a paper piling and accommodating section configured to pile and accommodate said recording paper;

a paper feeding device configured to separate said piled recording paper sheet by sheet and to convey said separated recording paper to said printer engine through a paper conveying path for conveying said recording paper;

a temporary paper accommodating section provided on said paper conveying path and configured to temporarily accommodate said recording paper taken out from said paper piling and accommodating section;

a paper sending-back path configured to send back said recording paper having the image formed thereon by said printer engine to said temporary paper accommodating section; and a paper turning-over device configured to cause said temporary paper accommodating section to accommodate said recording paper conveyed from said paper piling and accommodating section and said recording paper conveyed through said paper sending-back path from a front tip end of said recording paper and to switch back said recording paper toward said printer engine such that a rear tip end of said recording paper accommodated in said temporary paper accommodating section becomes the front tip end thereof.

18. The image forming apparatus as defined in claim 17, further comprising:

a lateral registration compensating device configured to perform lateral registration compensation of said recording paper in said temporary paper accommodating section.

19. The image forming apparatus as defined in claim 18, further comprising:

a skew compensating device configured to perform skew compensation of said recording paper in said temporary paper accommodating section.

20. The image forming apparatus as defined in claim 17, further comprising:

a skew compensating device configured to perform skew compensation of said recording paper in said temporary paper accommodating section.

21. The image forming apparatus as defined in claim 17, wherein said printer engine performs said image formation with an electrophotographic method.

22. The image forming apparatus as defined in claim 21, wherein said printer engine performs said image formation with a digital electrophotographic method in which a digital optical writing apparatus is used for optical writing of an electrostatic latent image onto a photosensitive body.

23. A printer comprising:

an image forming apparatus as defined in claim 17;

input terminal configured to receive input of image data; and a control section configured to control said image forming apparatus and to cause said image forming apparatus to perform image formation based on said input image data on a recording paper.

24. A copying machine comprising:

an image reading-out apparatus configured to read out image data of an original document;

an image forming apparatus as defined in claim 17;

a control section configured to control said image reading-out apparatus and said image forming apparatus, and to cause said image forming apparatus to perform image formation based on said image data of said original document read out by said image reading-out apparatus on a recording paper.

25. A facsimile device set comprising:

an image reading-out apparatus configured to read out image data of an original document;

an image forming apparatus as defined in claim 17;

a transmitting/receiving apparatus configured to transmit/receive image data through a network between said facsimile device set and an external apparatus; and a control section configured to control said image reading-out apparatus, said image forming apparatus, and said transmitting/receiving apparatus, to transmit said image data of said original document read out by said image reading-out apparatus to said external apparatus through said network by use of said transmitting/receiving apparatus, and to cause said image forming apparatus to perform image formation based on said image data received from said external apparatus through said network by use of said transmitting/receiving apparatus on a recording paper.

26. A complex machine comprising:

an image reading-out apparatus configured to read out image data of an original document;

an image forming apparatus as defined in claim 17;

a transmitting/receiving apparatus configured to transmit/receive image data through a network between said complex machine and an external apparatus;

an input terminal configured to receive said image data;

an output terminal configured to output said image data; and a control section configured to control said image reading-out apparatus, said, image forming apparatus, and said transmitting/receiving apparatus, to cause said image forming apparatus to selectively perform image formation based on said image data received at said input terminal, to output said image data of said original document read out by said image reading-out apparatus to said external apparatus through said output terminal, and to transmit said image data of said original document read out by said image reading-out apparatus to said external apparatus through said network by use of said transmitting/receiving apparatus or to cause said image forming apparatus to perform image formation on said recording paper based on said image data received from said external apparatus through said network by use of said transmitting/receiving apparatus on a recording paper based on said image data received from said external apparatus through said network by use of said transmitting/receiving apparatus on a recording paper.

27. An image forming apparatus comprising:

printer engine means for forming an image on recording paper;

paper piling and accommodating means for piling and accommodating said recording paper;

paper feeding means for separating said piled recording paper sheet by sheet and conveying said separated recording paper to said printer engine means through a paper conveying path for conveying said recording paper;

temporary paper accommodating means provided on said paper conveying path for temporarily accommodating therein said recording paper taken out from said paper piling and accommodating means;

paper sending-back path means for sending back said recording paper having an image formed thereon by said printer engine means to said temporary paper accommodating means; and paper turning-over means for causing said temporary paper accommodating means to accommodate said recording paper conveyed from said paper piling and accommodating means and said recording paper conveyed through said paper sending-back path means from a front tip end of said recording paper and for switching back said recording paper toward said printer engine means such that a rear tip end of said recording paper accommodated in said temporary paper accommodating means becomes the front tip end thereof.

28. The image forming apparatus as defined in claim 27, further comprising:

lateral registration compensating means for performing lateral registration compensation of said recording paper in said temporary paper accommodating means.

29. The image forming apparatus as defined in claim 28, further comprising:

skew compensating means for performing skew compensation of said recording paper in said temporary paper accommodating means.

30. The image forming apparatus as defined in claim 27, further comprising:

skew compensating means for performing skew compensation of said recording paper in said temporary paper accommodating means.

31. An image forming method comprising the steps of:

forming an image on recording paper with a printer engine;

piling and accommodating said recording paper in a paper piling and accommodating section;

separating said piled recording paper sheet by sheet and conveying said separated recording paper to said printer engine through a paper conveying path for conveying said recording paper;

temporarily accommodating said recording paper taken out from said paper piling and accommodating section in a temporary paper accommodating section on said paper conveying path;

sending back said recording paper having an image formed thereon by said printer engine to said temporary paper accommodating section by use of a paper sending-back path;

causing said temporary paper accommodating section to accommodate said recording paper conveyed from said paper piling and accommodating section and said recording paper conveyed through said paper sending-back path from a front tip end of said recording paper; and switching back said recording paper toward said printer engine such that a rear tip end of said recording paper accommodated in said temporary paper accommodating section becomes the front tip end thereof by use of a paper turning-over device.

32. The image forming method as defined in claim 31, further comprising the step of:

performing lateral registration compensation of said recording paper in said temporary paper accommodating section, by use of a lateral registration compensating device.

33. The image forming method as defined in claim 32, further comprising the step of:

performing skew compensation of said recording paper in said temporary paper accommodating section, by use of a skew compensating device.

34. The image forming method as defined in claim 31, further comprising the step of:

performing skew compensation of said recording paper in said temporary paper accommodating section, by use of a skew compensating device.

35. An image forming apparatus comprising:

a printer engine configured to form an image on recording paper;

a paper piling and accommodating section configured to pile and accommodate said recording paper;

a paper feeding device configured to separate said piled recording paper sheet by sheet and to convey said separated recording paper to said printer engine through a paper conveying path for conveying said recording paper;

a temporary paper accommodating section provided on said paper conveying path and configured to temporarily accommodate said recording paper taken out from said paper piling and accommodating section;

a paper turning-over device configured to cause said temporary paper accommodating section to accommodate said recording paper conveyed from said paper piling and accommodating section from a front tip end of said recording paper and to switch back said recording paper and send out said recording paper toward said printer engine such that a rear tip end of said recording paper accommodated in said temporary paper accommodating section becomes the front tip end thereof;

a control device configured to control said paper feeding device and said paper turning-over device such that a preceding recording paper sent out toward said printer engine and a subsequent recording paper just subsequent to said preceding recording paper are at least partially superposed on each other; and a processing device provided in said temporary paper accommodating section and configured to perform an operation.

36. The image forming apparatus as defined in claim 35, wherein said control device controls said paper feeding device and said paper turning-over device so as to superpose the rear tip end of said preceding recording paper in the conveying direction on the front tip end of said subsequent recording paper in the conveying direction.

37. The image forming apparatus as defined in claim 35, wherein said control device performs said control operation such that a distance between said preceding recording paper and said subsequent recording paper being at least partially superposed on each other is made shorter than the distance therebetween before being at least partially superposed on each other.

38. The image forming apparatus as defined in claim 35, wherein, when said recording paper in said temporary paper accommodating section is released, said paper turning-over device is a lateral registration device configured to perform lateral registration of said recording paper; and wherein said temporary paper accommodating section can accommodate an entire length of said recording paper.

39. The image forming apparatus as defined in claim 35, further comprising:

a registration roller provided at a position in front of said printer engine upstream of said temporary paper accommodating section on said conveying path and configured to perform a registration operation of said recording paper; and wherein a distance from said lateral registration device in said conveying path to said registration roller is shorter than a length of said recording paper.

40. The image forming apparatus as defined in claim 35, wherein said processing device is a stamping device provided in said temporary paper accommodating section and is configured to perform a stamping operation on a surface of said recording paper by moving in a direction perpendicular to said recording paper in said temporary paper accommodating section; and wherein said temporary paper accommodating section is in a state of a linear straight line.

41. The image forming apparatus as defined in claim 35, wherein said processing device is provided at an inlet/outlet portion of said temporary paper accommodating section and is configured to perform said operation at times of accommodating and sending out said recording paper.

42. The image forming apparatus as defined in claim 41, wherein said processing device is a compensation device configured to compensate for curling of said recording paper as said operation.

43. The image forming apparatus as defined in claim 41, wherein said processing device is a temperature adjusting device configured to adjust a temperature of said recording paper as said operation.

44. The image forming apparatus as defined in claim 43, wherein said temperature adjusting device is a heat pipe.

45. The image forming apparatus as defined in claim 41, wherein said processing device is a cleaning device configured to remove dust or dirt attached to said recording paper as said operation.

46. The image forming apparatus as defined in claim 41, wherein said processing device is a metal roller configured to press said recording paper as said operation.

47. The image forming apparatus as defined in claim 41, wherein said processing device is a painting device configured to paint a predetermined coating material on a surface of said recording paper as said operation.

48. The image forming apparatus as defined in claim 35, further comprising:

a return conveying device configured to return said recording paper having an image formed by the printer engine to said temporary paper accommodating section so as to accommodate said recording paper from the front tip end of said recording paper in said temporary paper accommodating section.

49. The image forming apparatus as defined in claim 48, wherein said processing device is a lateral registration compensating device configured to perform lateral registration compensation for said recording paper in said temporary paper accommodating section.

50. The image forming apparatus as defined in claim 48, wherein said processing device is a skew compensating device configured to perform skew compensation for said recording paper in said temporary paper accommodating section.

51. The image forming apparatus as defined in claim 35, wherein said printer engine performs said image formation with an electrophotographic method.

52. The image forming apparatus as defined in claim 51, wherein said printer engine performs an operation of optically writing an electrostatic latent image on a photosensitive body at a time of image formation by use of a digital optically-writing device with a digital electrophotographic method.

53. A printer comprising:
an image forming apparatus as defined in claim 35, wherein said control device is a first control device,
an input terminal configured to receive an input of image data; and
a second control device configured to control said image forming apparatus and to perform image formation on said recording paper based on said input image data.

54. A copying machine comprising:
an image reading apparatus configured to read out image data of an original document;
an image forming apparatus as defined in claim 35, wherein said control device is a first control device,
a second control device configured to control said image reading apparatus and said image forming apparatus and to perform image formation on said recording paper by use of said image forming apparatus based on said image data of the original document read out by said image reading apparatus.

55. A facsimile device set comprising:
an image reading apparatus configured to read out image data of an original document;
an image forming apparatus as defined in claim 35, wherein said control device is a first control device,
a transmitting/receiving apparatus configured to transmit/receive said image data through a network between said facsimile device set and an external apparatus; and
a second control device configured to control said image reading-out apparatus, said image forming apparatus and said transmitting/receiving apparatus, to transmit said image data of said original document read out by said image reading-out apparatus to said external apparatus through said network by use of said transmitting/receiving apparatus, and to cause said image forming apparatus to perform image formation based on said image data received from said external apparatus through said network by use of said transmitting/receiving apparatus on a recording paper.

56. A complex machine comprising:
an image reading apparatus configured to read out image data of an original document;
an image forming apparatus as defined in claim 35, wherein said control device is a first control device,
a transmitting/receiving apparatus configured to transmit/receive said image data through a network between said complex machine and an external apparatus;
an input terminal configured to receive an input of said image data;
an output terminal configured to output said image data; and
a second control section configured to control said image reading-out apparatus, said image forming apparatus, and said transmitting/receiving apparatus, to cause said image forming apparatus to selectively perform image formation based on said image data received at said input terminal, to output said image data of said original document read out by said image reading-out apparatus to said external apparatus through said output terminal, and to transmit said image data of said original document read out by said image reading-out apparatus to said external apparatus through said network by use of said transmitting/receiving apparatus or to cause said image forming apparatus to perform the image formation on said recording paper based on said image data received from said external apparatus through said network by use of said transmitting/receiving apparatus on said recording paper.

57. An image forming apparatus comprising:
printer engine means for performing image formation on recording paper;
paper piling and accommodating means for piling and accommodating said recording paper;
paper feeding means for separating said piled recording paper sheet by sheet and conveying said separated recording paper to said printer engine means through a paper conveying path for conveying said recording paper;
temporary paper accommodating means provided on said paper conveying path for temporarily accommodating said recording paper taken out from said paper piling and accommodating means;
paper turning-over means for causing said temporary paper accommodating means to accommodate said recording paper conveyed from said paper piling and accommodating means from a front tip end of said recording paper and for switching back said recording paper and sending out said recording paper toward said printer engine means such that a rear tip end of said recording paper accommodated in said temporary paper accommodating means becomes the front tip end thereof;
control means for controlling said paper feeding means and said paper turning-over means such that a preceding recording paper sent out toward said printer engine means and a subsequent recording paper just subsequent to said preceding recording paper are at least partially superposed on each other; and
processing means provided in said temporary paper accommodating means for performing an operation.

58. A method of forming an image comprising the steps of:
performing image formation on recording paper by use of a printer engine;
piling and accommodating said recording paper in a paper piling and accommodating section;
separating said piled recording paper sheet by sheet by use of a paper feeding device;
conveying said separated recording paper to said printer engine through a paper conveying path for conveying said recording paper;

temporarily accommodating said recording paper taken out from said paper piling and accommodating section in a temporary paper accommodating section on said paper conveying path;

causing said temporary paper accommodating section to accommodate said recording paper conveyed from said paper piling and accommodating section from a front tip end of said recording paper and for switching back said recording paper and sending out said recording paper toward said printer engine such that a rear tip end of said recording paper accommodated in said temporary paper accommodating section becomes the front tip end thereof, by use of a paper turning-over device;

controlling said paper feeding device and said paper turning-over device such that a preceding recording paper sent out toward said printer engine and a subsequent recording paper just subsequent to said preceding recording paper are at least partially superposed on each other, by use of a control device;

providing a processing device in said temporary paper accommodating section; and performing an operation by use of said processing device.

59. An image forming apparatus comprising:

a printer engine configured to form an image on recording paper;

a paper piling and accommodating section configured to pile and accommodate said recording paper;

a paper feeding device configured to separate said piled recording paper sheet by sheet and to convey said separated recording paper to said printer engine through a paper conveying path for conveying said recording paper;

a temporary paper accommodating section provided on said paper conveying path and configured to temporarily accommodate said recording paper taken out from said paper piling and accommodating section;

a paper turning-over device configured to cause said temporary paper accommodating section to accommodate said recording paper conveyed from said paper piling and accommodating section from a front tip end of said recording paper and to switch back said recording paper and send out said recording paper toward said printer engine such that a rear tip end of said recording paper accommodated in said temporary paper accommodating section becomes the front tip end thereof;

a control device configured to control said paper feeding device and said paper turning-over device such that a preceding recording paper sent out toward said printer engine and a subsequent recording paper just subsequent to said preceding recording paper are at least partially superposed on each other; and a return conveying device configured to return said recording paper after finishing image formation at said printer engine to said temporary paper accommodating section so as to enable said recording paper to accommodate into said temporary paper accommodating section from the front tip end of said recording paper.

60. The image forming apparatus as defined in claim 59, wherein said control device is further configured to control said paper feeding device and said paper turning-over device so as to superpose the rear tip end side of said preceding recording paper in the conveying direction on the front tip end side of said subsequent recording paper in the conveying direction.

61. The image forming apparatus as defined in claim 59, wherein said control device performs said control operation such that a distance between said preceding recording paper and said subsequent recording paper at a time of said superposition is made shorter than a distance therebetween before an occurrence of said superposition.

62. The image forming apparatus as defined in claim 59, wherein a speed of conveying said recording paper with said return conveying device is higher than a speed of conveying said recording paper with said paper feeding device.

63. The image forming apparatus as defined in claim 59, wherein a speed of conveying said recording paper with said return conveying device is substantially equal to a speed of conveying said recording paper with said paper feeding device.

64. The image forming apparatus as defined in claim 59, wherein said control device is a first control device, and further comprising:

a second control device configured to control said return conveying device and said paper feeding device such that, after practicing image formation on plural pages of a first surface of said recording paper, said recording paper re-fed from said return conveying device and said recording paper fed from said paper feeding device are set so as to alternately advance to said temporary paper accommodating section.

65. The image forming apparatus as defined in claim 59, wherein said control device is a first control device, and further comprising:

a second control device configured to control said return conveying device such that the returning recording paper is temporarily stopped, and thereby taking a timing of causing said recording paper to advance from said return conveying device to said temporary paper accommodating section.

66. The image forming apparatus as defined in claim 59, wherein said printer engine performs image formation with an electrophotographic method.

67. The image forming apparatus as defined in claim 59, wherein said printer engine performs an operation of optically writing an electrostatic latent image on a photosensitive body for the image formation by use of a digital optically-writing device with a digital electrophotographic method.

68. An image forming apparatus comprising:

printer engine means for performing image formation on recording paper;

paper piling and accommodating means for piling and accommodating said recording paper;

paper feeding means for separating said piled recording paper sheet by sheet and conveying said separated recording paper to said printer engine means through a paper conveying path for conveying said recording paper;

temporary paper accommodating means provided on said paper conveying path for temporarily accommodating said recording paper taken out from said paper piling and accommodating means;

paper turning-over means for causing said temporary paper accommodating means to accommodate said recording paper conveyed from said paper piling and accommodating means from a front tip end of said recording paper and for switching back said recording paper and sending out said recording paper toward said printer engine means such that a rear tip end of said recording paper accommodated in said temporary paper accommodating means becomes the front tip end thereof;

control means for controlling said paper feeding means and said paper turning-over means such that a preceding recording paper sent out toward said printer engine means and a subsequent recording paper just subsequent to said preceding recording paper are at least partially superposed on each other; and return conveying means for returning said recording paper after finishing image formation at said printer engine means to said temporary paper accommodating means so as to enable said recording paper to accommodate into said temporary paper accommodating means from the front tip end of said recording paper.

69. The image forming apparatus as defined in claim 68, wherein said control means is a first control means, and further comprising:

second control means for controlling said return conveying means and said paper feeding means such that, after practicing image formation on plural pages of a first surface of said recording paper, said recording paper re-fed from said return conveying means and said recording paper fed from said paper feeding means are set so as to alternately advance to said temporary paper accommodating means.

70. The image forming apparatus as defined in claim 68, wherein said control means is a first control means, and further comprising:

second control means for controlling said return conveying means such that the returning recording paper is temporarily stopped, and thereby taking a timing of causing said recording paper to advance from said return conveying means to said temporary paper accommodating means.

71. A method of forming an image comprising the steps of:

performing image formation on recording paper by use of a printer engine;

piling and accommodating said recording paper in a paper piling and accommodating section;

separating said piled recording paper sheet by sheet by use of a paper feeding device;

conveying said separated recording paper to said printer engine through a paper conveying path for conveying said recording paper;

temporarily accommodating said recording paper taken out from said paper piling and accommodating section in a temporary paper accommodating section on said paper conveying path;

causing said temporary paper accommodating section to accommodate said recording paper conveyed from said paper piling and accommodating section from a front tip end of said recording paper and for switching back said recording paper and sending out said recording paper toward said printer engine such that a rear tip end of said recording paper accommodated in said temporary paper accommodating section becomes the front tip end thereof, by use of a paper turning-over device;

controlling said paper feeding device and said paper turning-over device such that a preceding recording paper sent out toward said printer engine and a subsequent recording paper just subsequent to said preceding recording paper are at least partially superposed on each other, by use of a control device; and returning said recording paper after finishing image formation at said printer engine to said temporary paper accommodating section so as to enable said recording paper to accommodate into said temporary paper accommodating section from the front tip end of said recording paper, by use of a return conveying device.

72. The method of forming an image as defined in claim 71, wherein said control device is a first control device, and further comprising the step of:

controlling said return conveying device and said paper feeding device such that, after practicing image formation on plural pages of a first surface of said recording paper, said recording paper re-fed from said return conveying device and said recording paper fed from said paper feeding device are set so as to alternately advance to said temporary paper accommodating section, by use of a second control device.

73. The method of forming an image as defined in claim 71, wherein the control device is a first control device, and further comprising the step of:

controlling said return conveying device such that returning recording paper is temporarily stopped, and thereby taking a timing of causing said recording paper to advance from said return conveying device to said temporary paper accommodating section, by use of a second control device.

74. An image forming apparatus comprising:

a printer engine configured to form an image on a recording paper;

a paper pilling and accommodating section configured to pile and accommodate said recording papers;

a paper feeding device configured to separate said piled recording paper sheet by sheet and to convey said separated recording paper to said printer engine through a paper conveying path for conveying said recording paper;

a temporary paper accommodating section provided on said paper conveying path and configured to temporarily accommodate said recording paper taken out from said paper pilling and accommodating section;

a paper turning-over device configured to cause said temporary paper accommodating section to accommodate said recording paper conveyed from said paper pilling and accommodating section from a front tip end of said recording paper and to switch back said recording paper and send out said recording paper toward said printer engine such that a rear tip end of said recording paper accommodated in said temporary paper accommodating section becomes the front tip end thereof;

a control device configured to control said paper feeding device and said paper turning-over device such that a distance between a preceding recording paper sent out toward said printer engine and a subsequent recording paper just subsequent to said preceding recording paper are nullified; and a processing device provided in said temporary paper accommodating section and configured to perform an operation.

75. The image forming apparatus as defined in claim 74, wherein said control device controls said paper feeding device and said paper turning-over device so as to nullify the distance between the rear tip end side of said preceding recording paper in the conveying direction and the front tip end side of said just subsequent recording paper in the conveying direction.

76. An image forming apparatus comprising:

a printer engine configured to form an image on recording paper;

a paper piling and accommodating section configured to pile and accommodate said recording paper;

a paper feeding device configured to separate said piled recording paper sheet by sheet and to convey said separated recording paper to said printer engine through a paper conveying path for conveying said recording paper;

a temporary paper accommodating section provided on said paper conveying path and configured to temporarily accommodate said recording paper taken out from said paper piling and accommodating section;

a paper turning-over device configured to cause said temporary paper accommodating section to accommodate said recording paper conveyed from said paper piling and accommodating section from a front tip end of said recording paper and to switch back said recording paper and send out said recording paper toward said printer engine such that a rear tip end of said recording paper accommodated in said temporary paper accommodating section becomes the front tip end thereof;

a control device configured to control said paper feeding device and said paper turning-over device such that a distance between a preceding recording paper sent out toward said printer engine and a subsequent recording paper just subsequent to said preceding recording paper are nullified; and a return conveying device configured to return said recording paper after finishing image formation at said printer engine to said temporary paper accommodating section so as to enable said recording paper to be accommodated into said temporary paper accommodating section from the front tip end of said recording paper.

77. The image forming apparatus as defined in claim 76, wherein said control device controls said paper feeding device and said paper turning-over device so as to nullify a distance between the rear tip end side of said preceding recording paper in the conveying direction and the front tip end side of said subsequent recording paper in the conveying direction.

78. The image forming apparatus as defined in claim 76, wherein said control device performs said control operation such that the distance between said preceding recording paper and said subsequent recording paper being at least partially superposed on each other is made shorter than the distance therebetween before being at least partially superposed on each other.

79. The image forming apparatus as defined in claim 76, wherein said control device is a first control device, and wherein said image forming apparatus further comprises a second control device configured to control said return conveying device and said paper feeding device such that, after practicing image formation on plural pages of a first surface of said recording paper, said recording paper re-fed from said return conveying device and said recording paper fed from said paper feeding device are set so as to alternately advance to said temporary paper accommodating section.

80. The image forming apparatus as defined in claim 76, wherein said control device is a first control device, and wherein said image forming apparatus further comprises a second control device configured to control said return conveying device such that the returning recording paper is temporarily stopped, and thereby taking a timing of causing said recording paper to advance from said return conveying device to said temporary paper accommodating section.

* * * * *